US011221463B2

(12) United States Patent
Shomura

(10) Patent No.: US 11,221,463 B2
(45) Date of Patent: Jan. 11, 2022

(54) ZOOM LENS AND IMAGE PICKUP APPARATUS USING THE SAME

(71) Applicant: OLYMPUS CORPORATION, Hachioji (JP)

(72) Inventor: Izumi Shomura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 104 days.

(21) Appl. No.: 16/366,855

(22) Filed: Mar. 27, 2019

(65) Prior Publication Data
US 2019/0302409 A1 Oct. 3, 2019

(30) Foreign Application Priority Data

Mar. 29, 2018 (JP) .............................. JP2018-064668

(51) Int. Cl.
*G02B 9/34* (2006.01)
*G02B 7/04* (2021.01)
*H04N 5/232* (2006.01)
*G02B 13/02* (2006.01)

(52) U.S. Cl.
CPC .................. *G02B 9/34* (2013.01); *G02B 7/04* (2013.01); *G02B 13/02* (2013.01); *H04N 5/23296* (2013.01)

(58) Field of Classification Search
CPC .... G02B 15/144; G02B 15/15; G02B 15/163; G02B 15/177; G02B 15/144515; G02B 9/34
See application file for complete search history.

(56) References Cited

U.S. PATENT DOCUMENTS

| 5,991,091 | A | * | 11/1999 | Hayakawa | ........... | G02B 15/177 |
| | | | | | | 359/557 |
| 8,085,475 | B2 | | 12/2011 | Miyazaki et al. | | |
| 9,958,656 | B2 | | 5/2018 | Kawamura et al. | | |
| 2017/0293124 | A1 | * | 10/2017 | Kawamura | .......... | G02B 15/177 |

FOREIGN PATENT DOCUMENTS

| JP | 2010176098 A | 8/2010 |
| JP | 2013050674 A | 3/2013 |
| JP | 2017122743 A | 7/2017 |

* cited by examiner

*Primary Examiner* — Alicia M Harrington
(74) *Attorney, Agent, or Firm* — Holtz, Holtz & Volek PC

(57) ABSTRACT

A zoom lens includes in order from an object side, a first lens unit having a negative refractive power, a second lens unit having a positive refractive power, a third lens unit having a positive refractive power, and a fourth lens unit having a positive refractive power. The first lens unit includes at least two negative lens components. The number of lenses in the third lens unit is larger than the number of lenses in the second lens unit. At the time of zooming from a wide angle end to a telephoto end, distances between lens units change, and the first lens unit, after moving toward an image side, moves toward the object side. In zooming in a state of being focused to an object at infinity, a distance between the second lens unit and the third lens unit becomes the widest at the wide angle end.

33 Claims, 30 Drawing Sheets

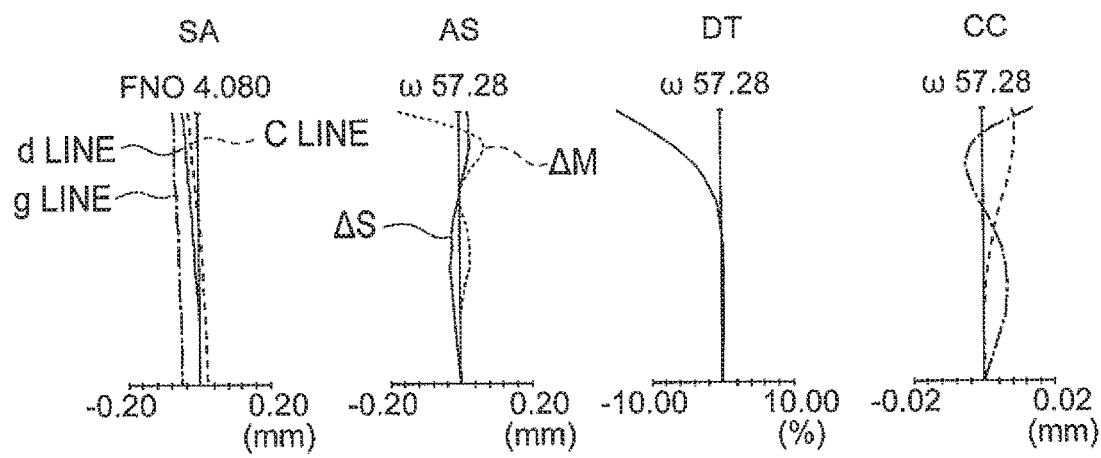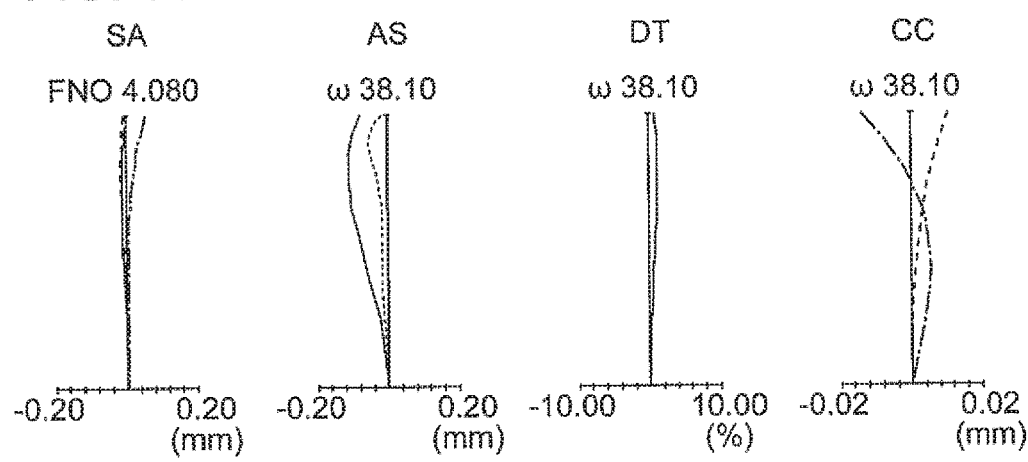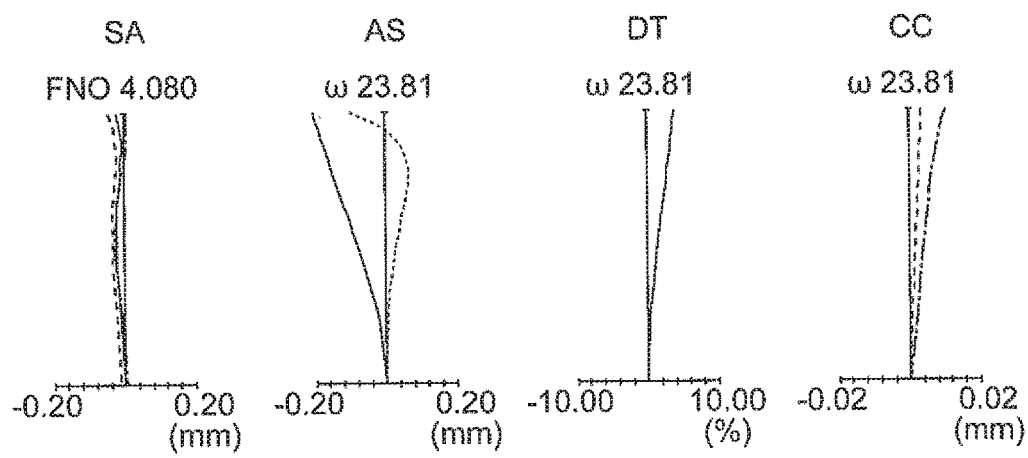

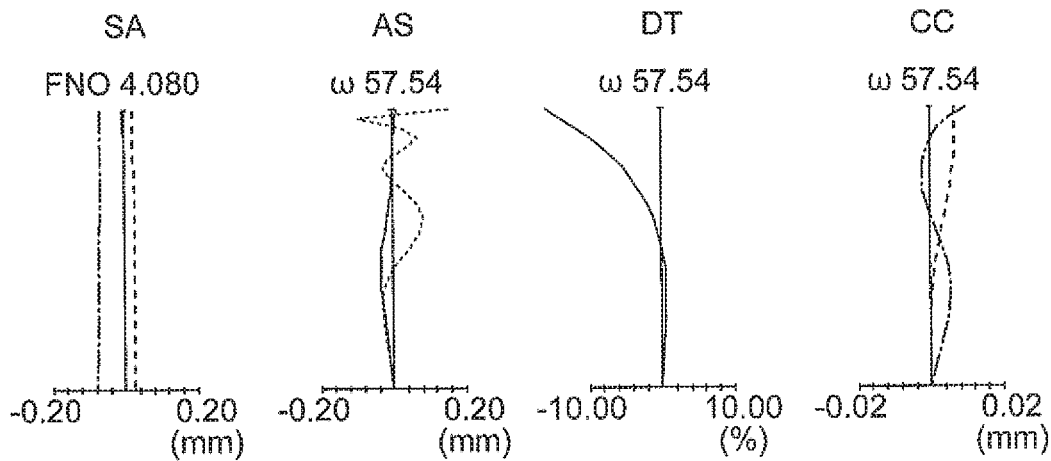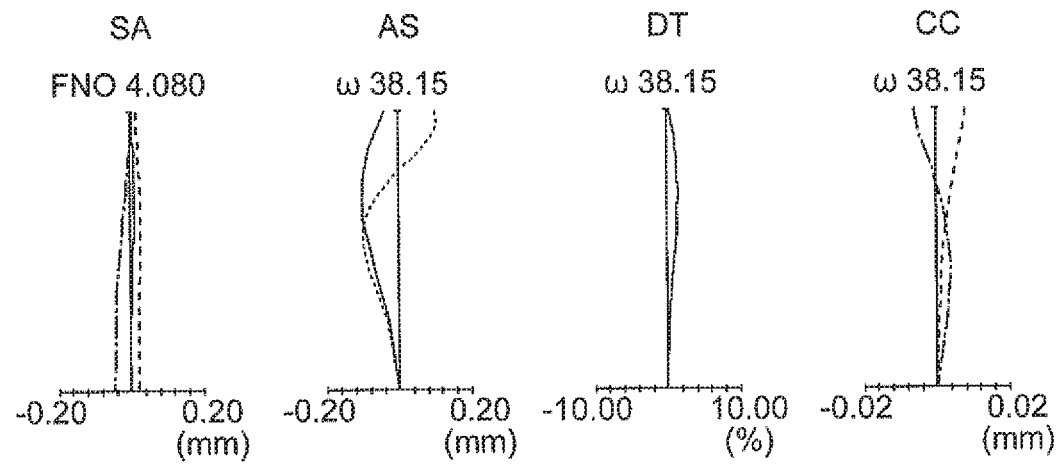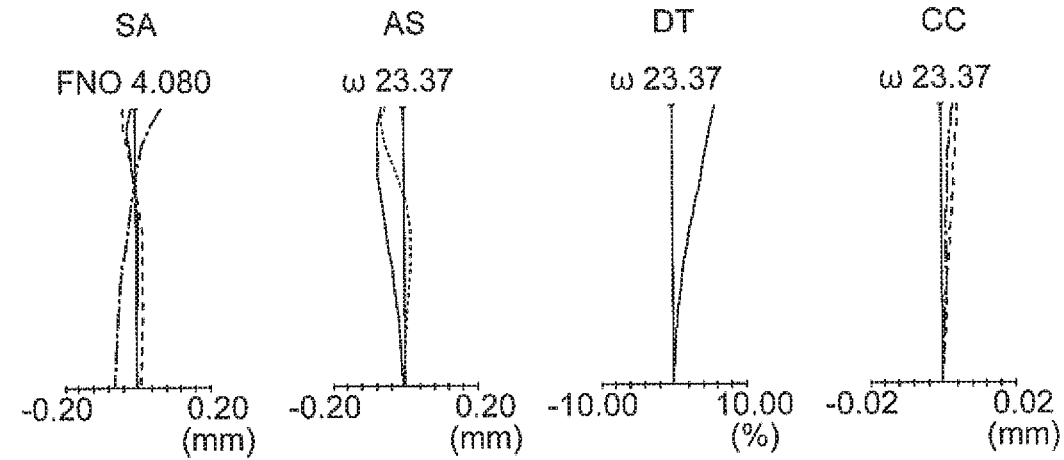

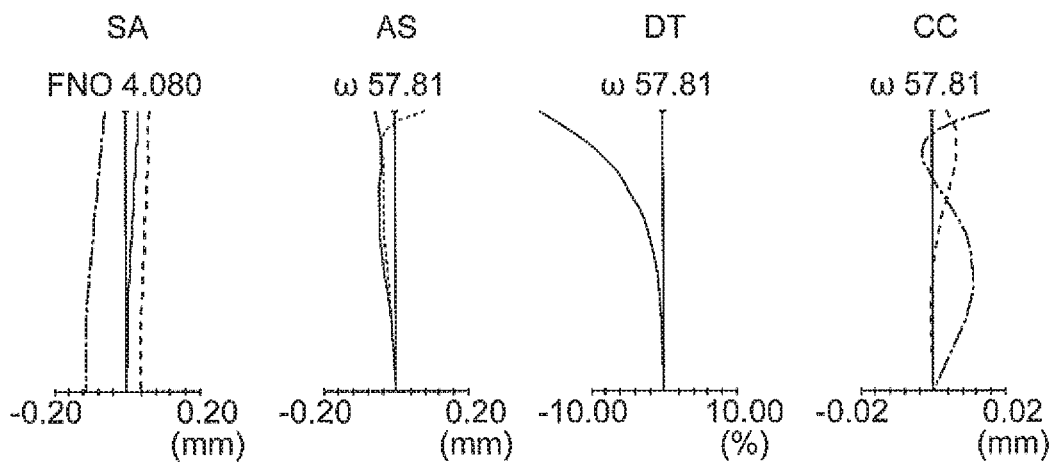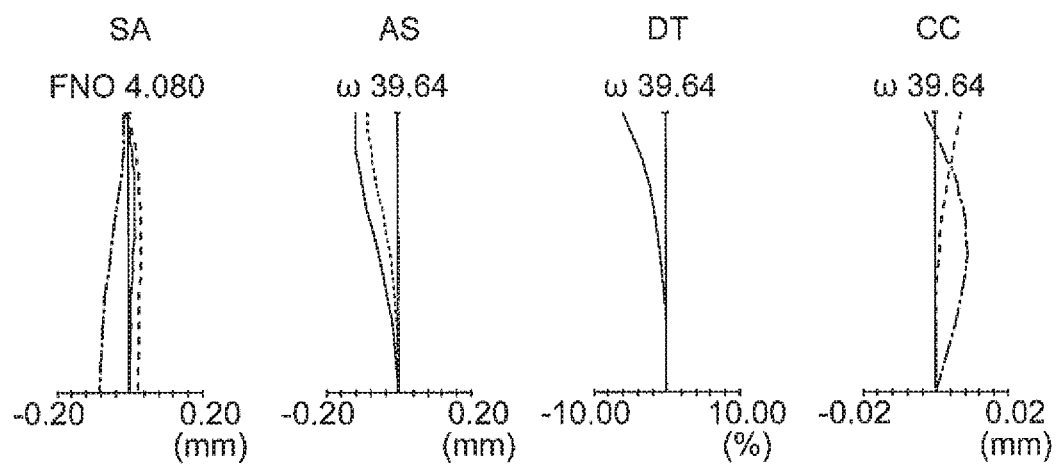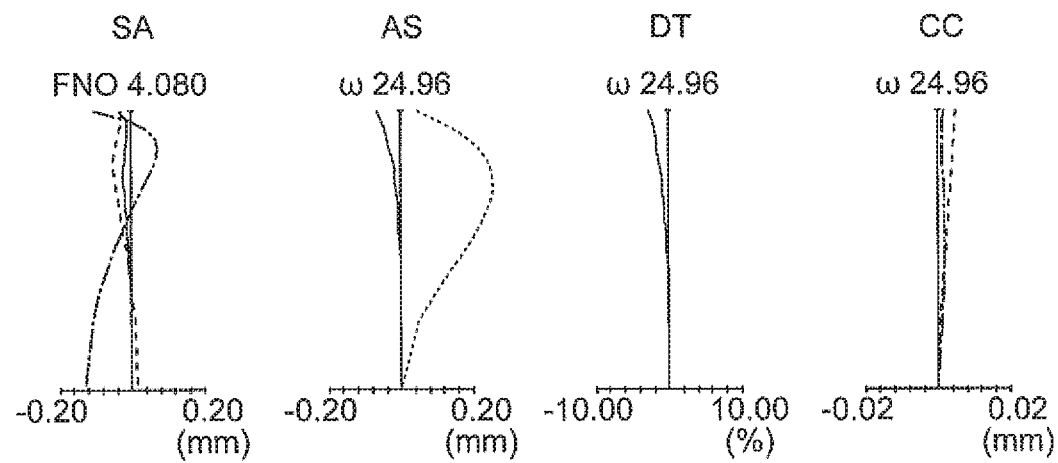

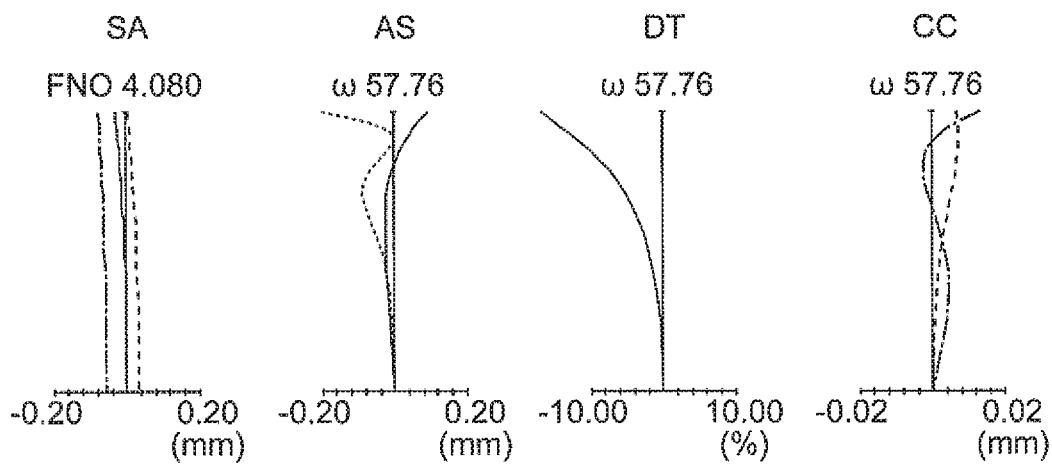
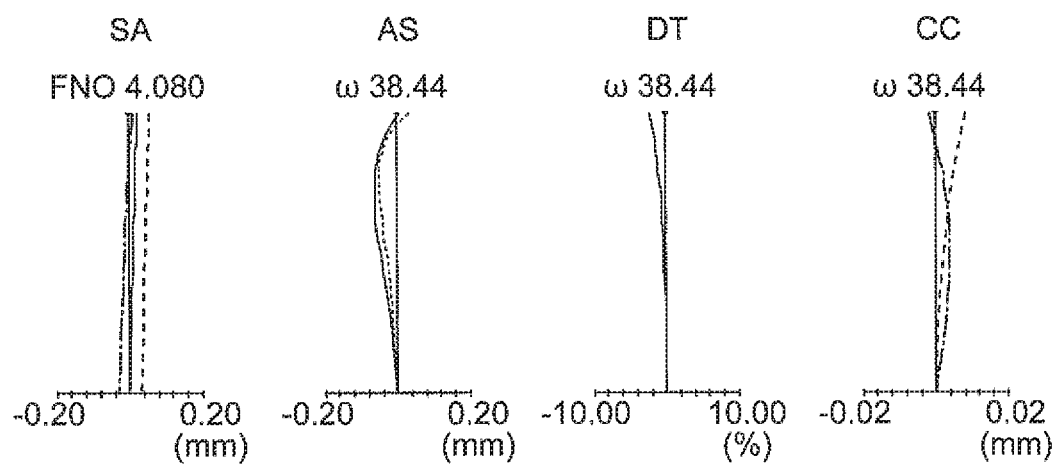
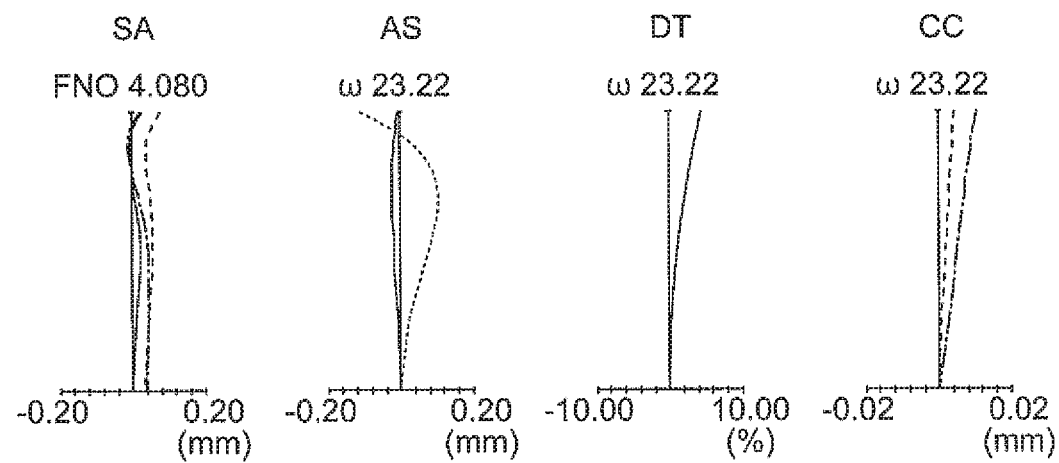

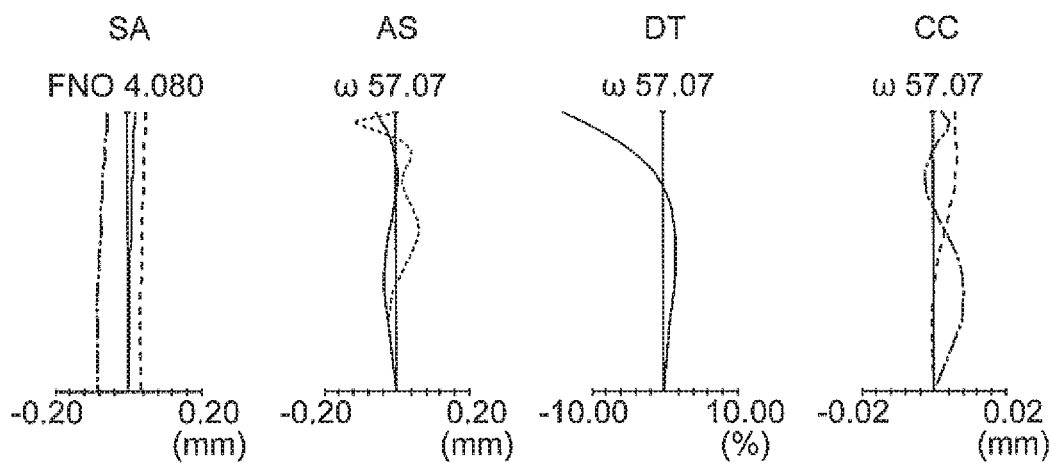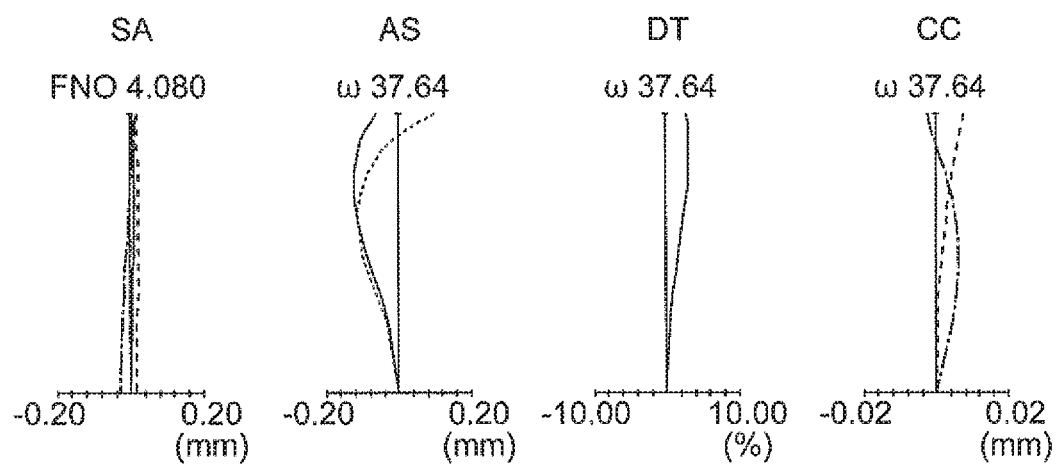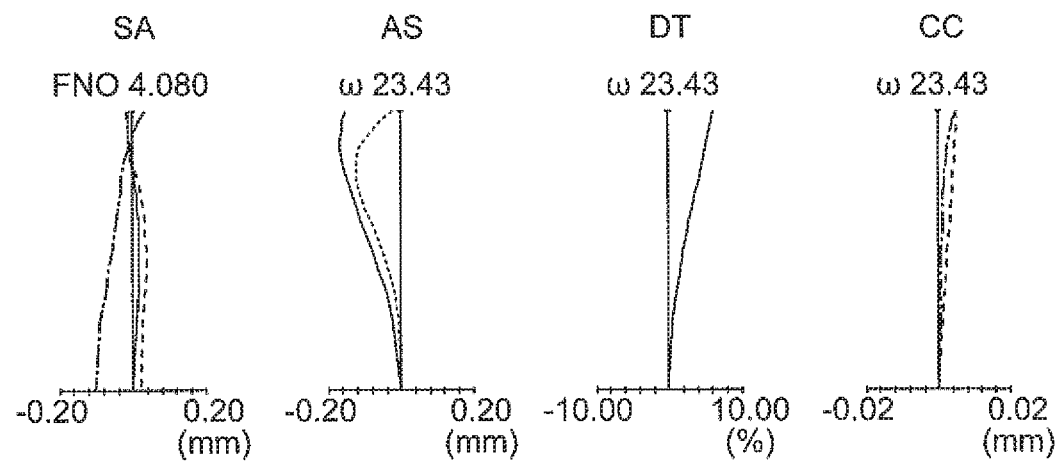

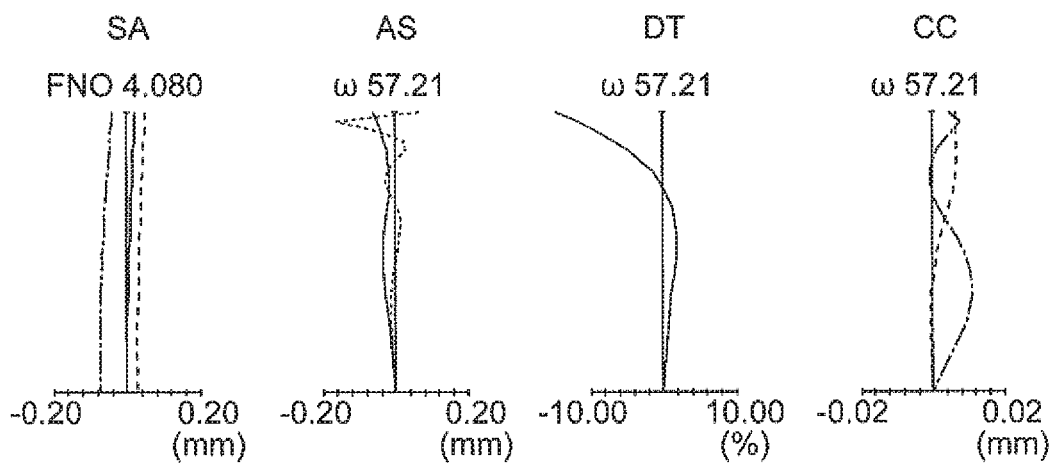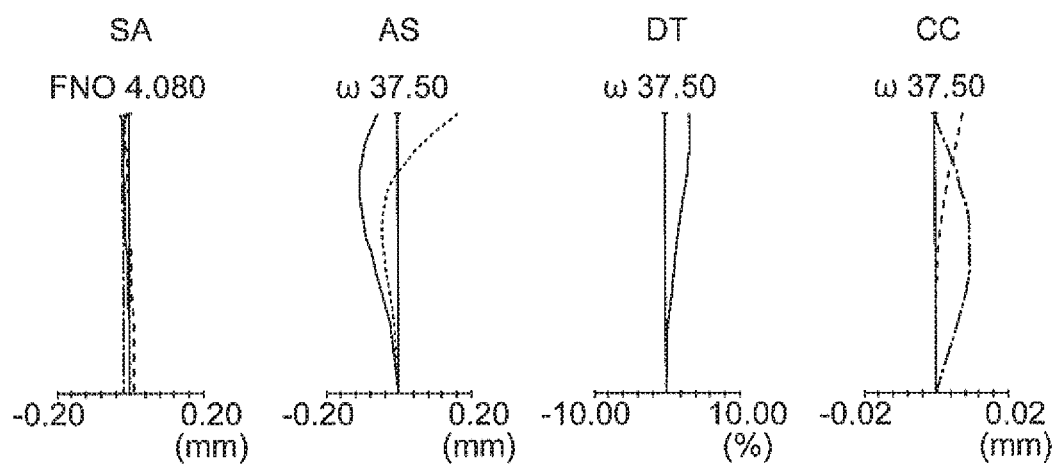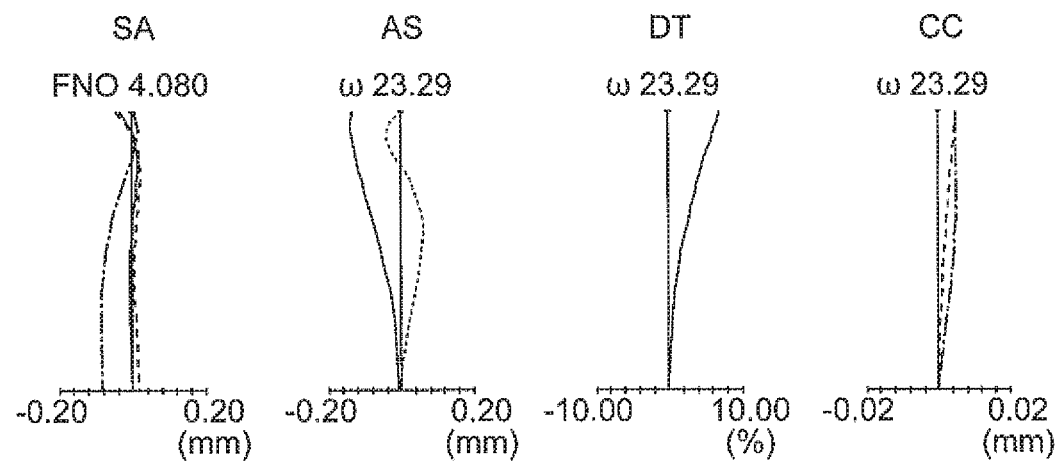

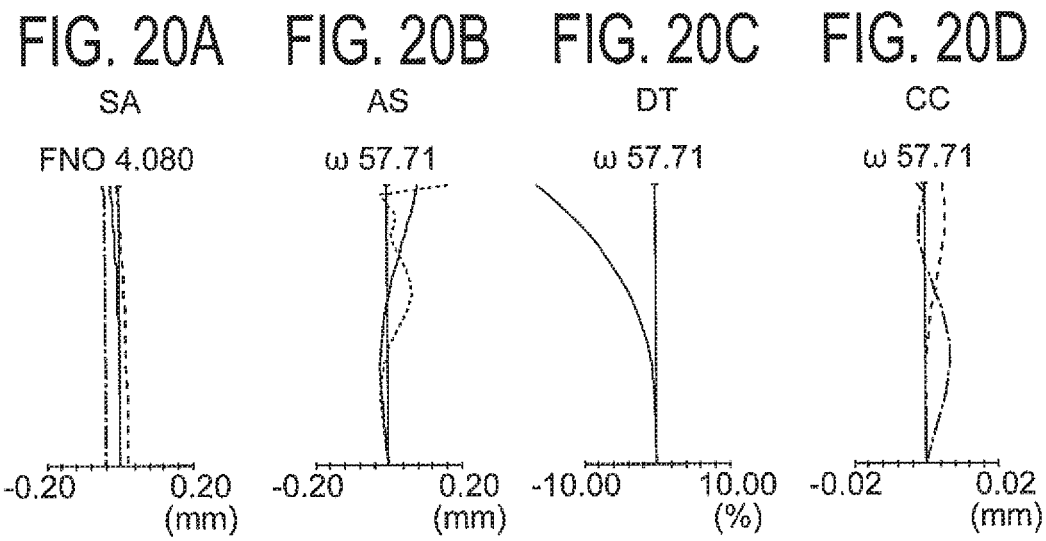

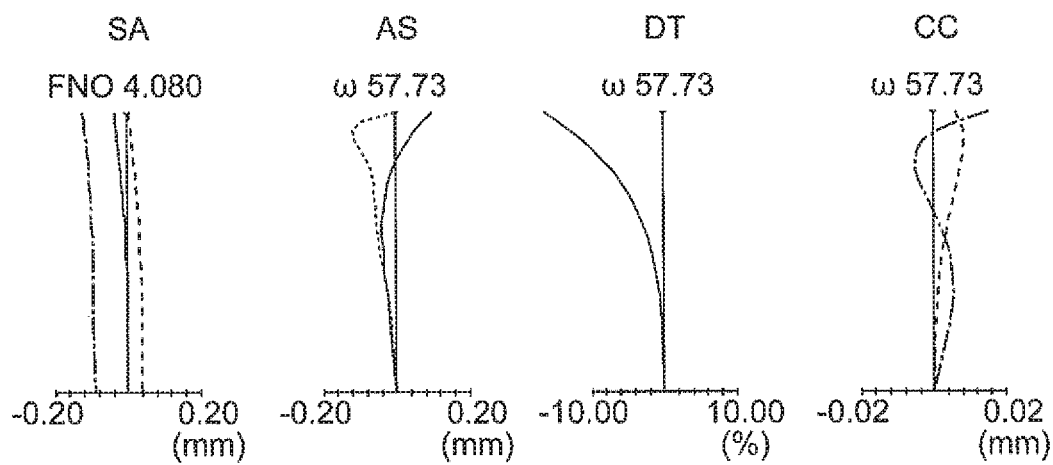
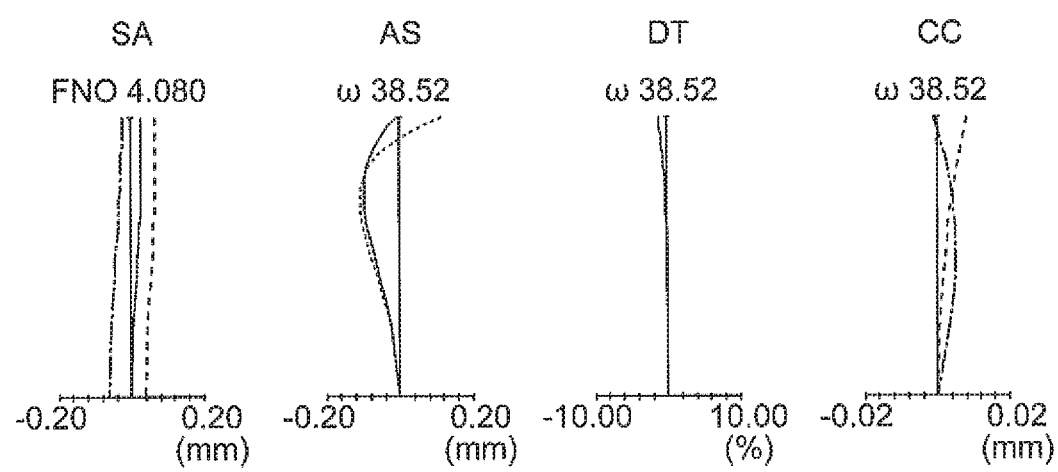
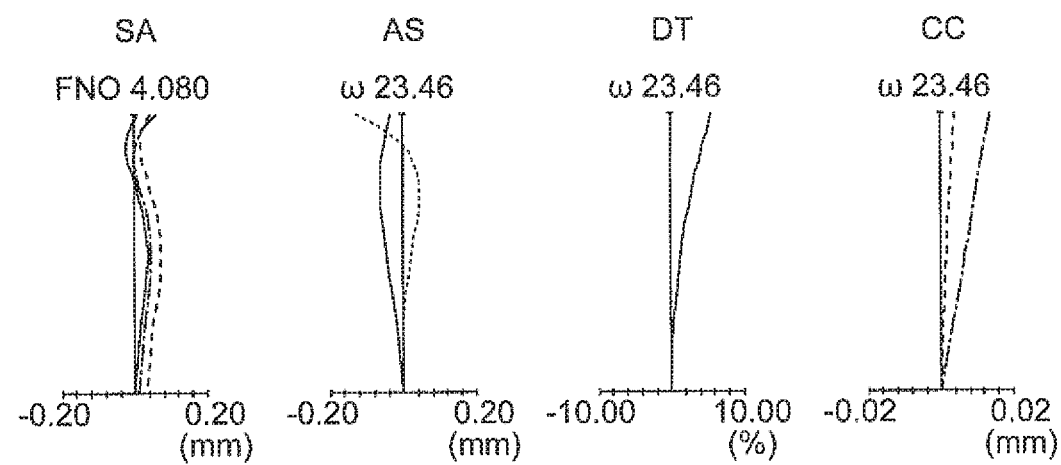

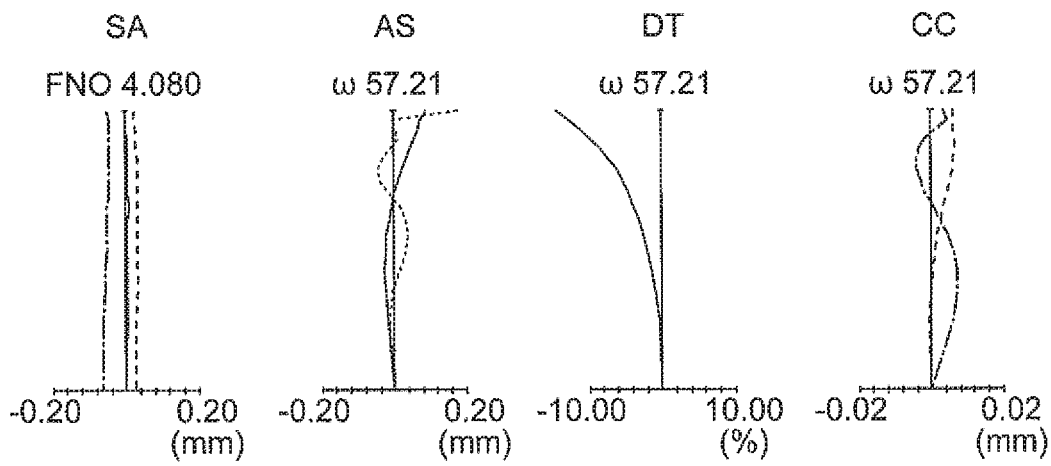
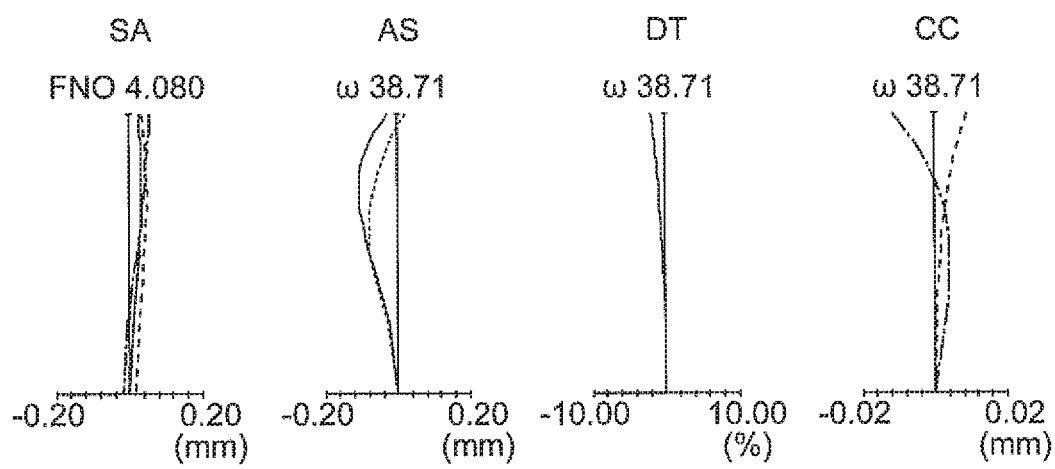
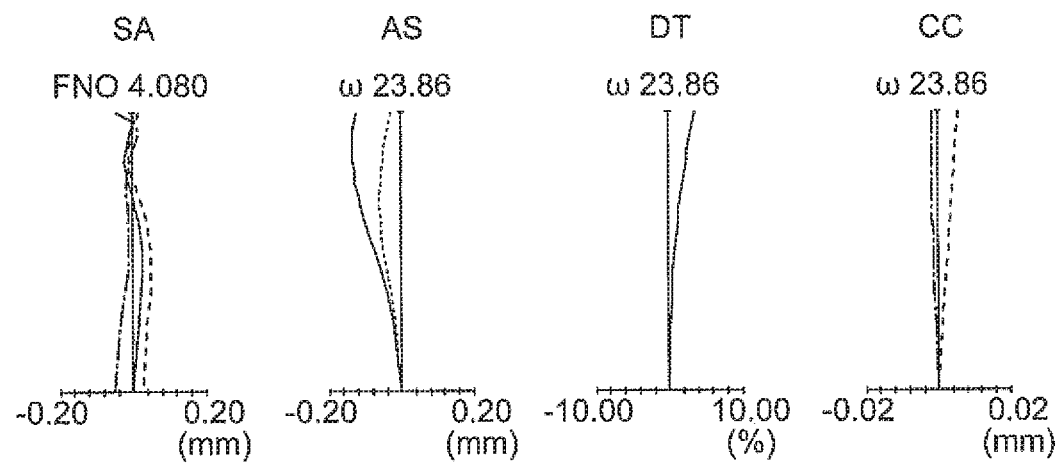

SA
FNO 4.080
-0.20  0.20
(mm)

AS
ω 57.33
-0.20  0.20
(mm)

DT
ω 57.33
-10.00  10.00
(%)

CC
ω 57.33
-0.02  0.02
(mm)

SA
FNO 4.080
-0.20  0.20
(mm)

AS
ω 39.09
-0.20  0.20
(mm)

DT
ω 39.09
-10.00  10.00
(%)

CC
ω 39.09
-0.02  0.02
(mm)

SA
FNO 4.080
-0.20  0.20
(mm)

AS
ω 24.56
-0.20  0.20
(mm)

DT
ω 24.56
-10.00  10.00
(%)

CC
ω 24.56
-0.02  0.02
(mm)

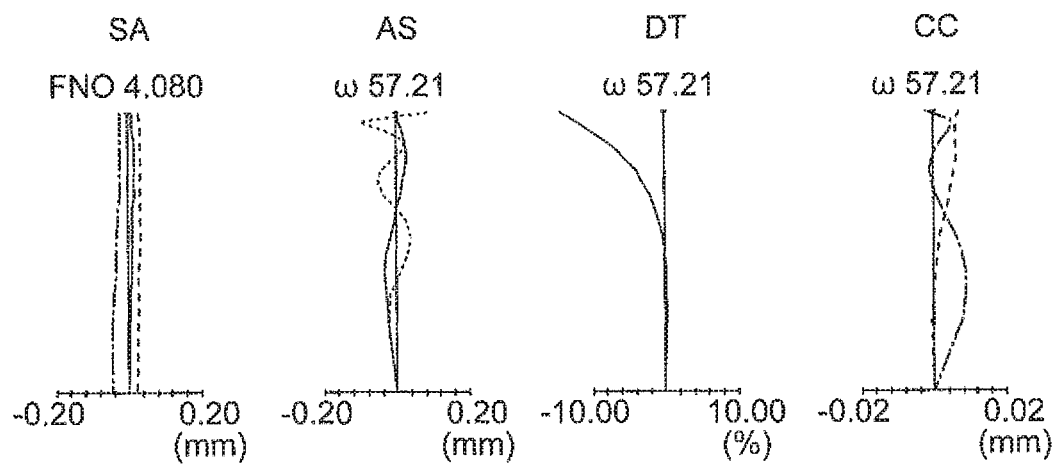
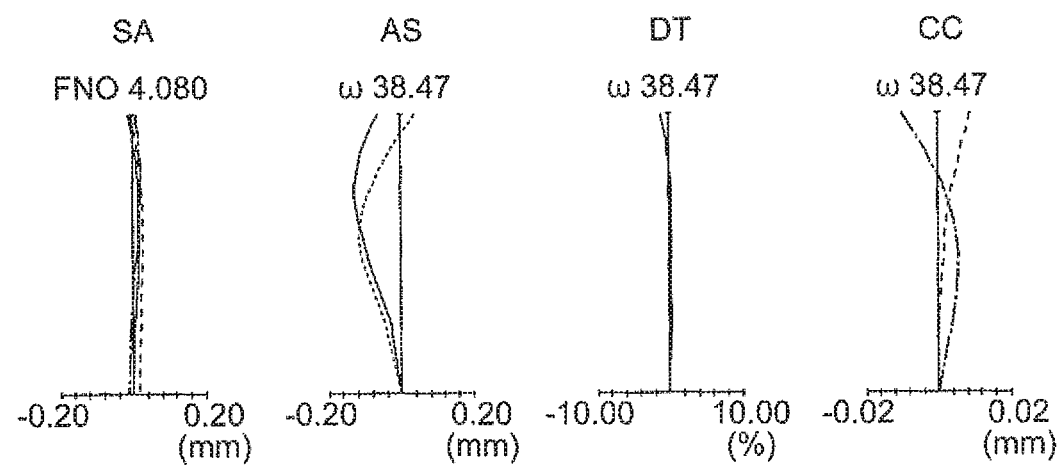
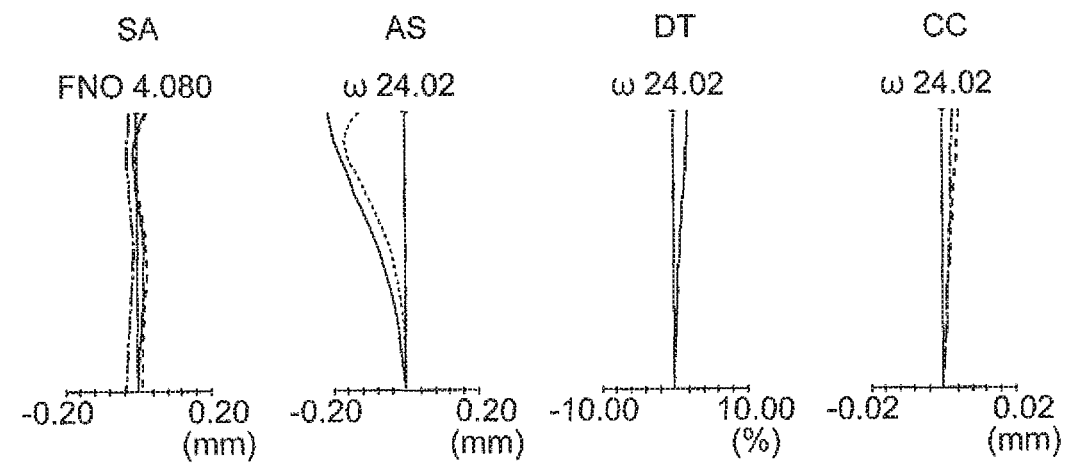

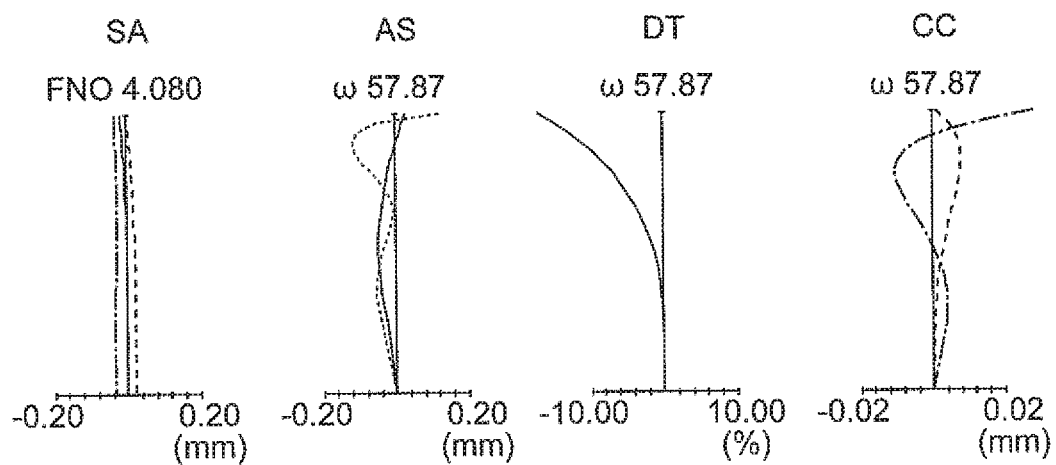
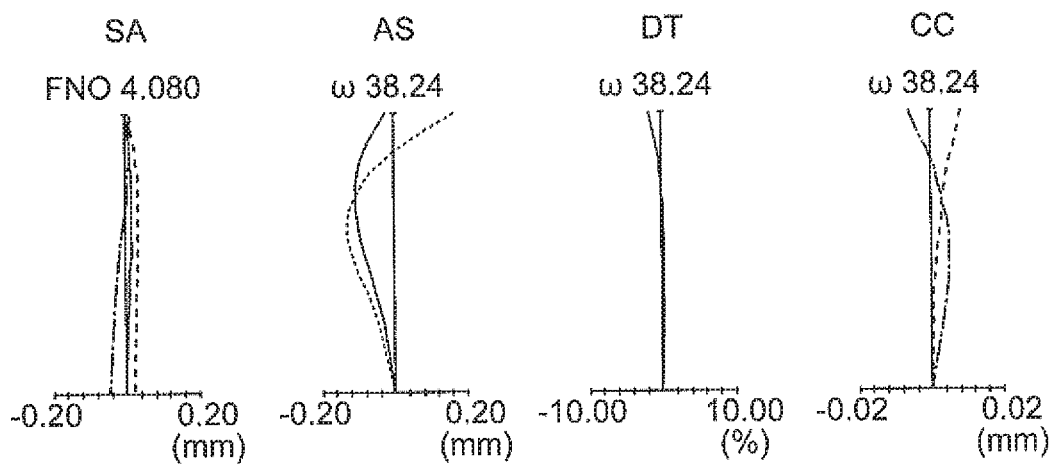
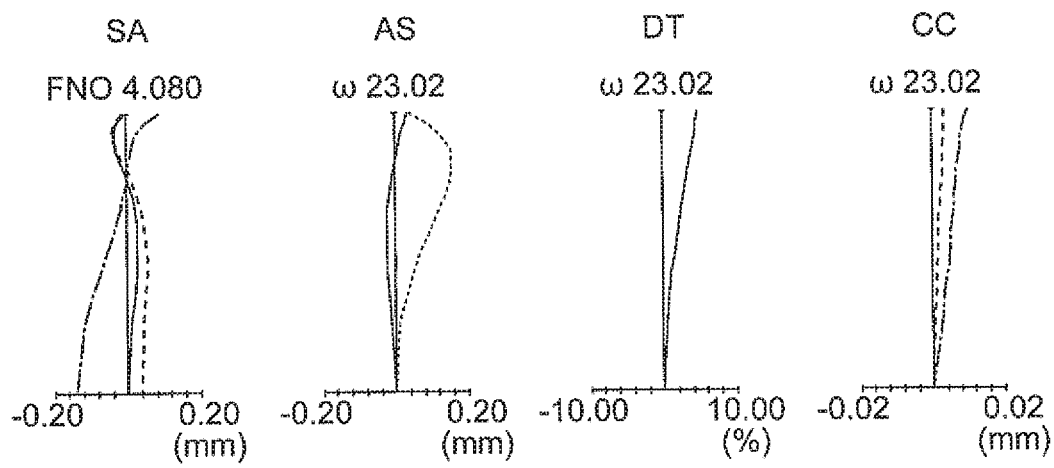

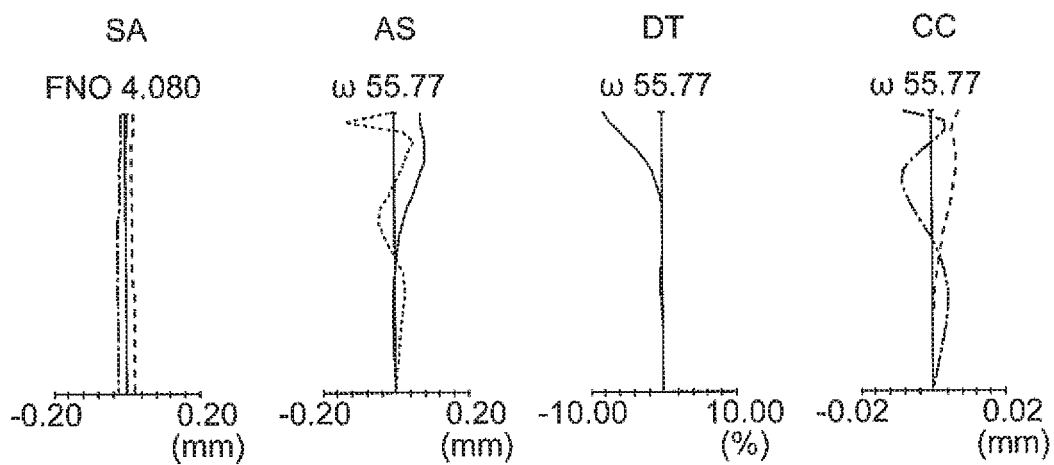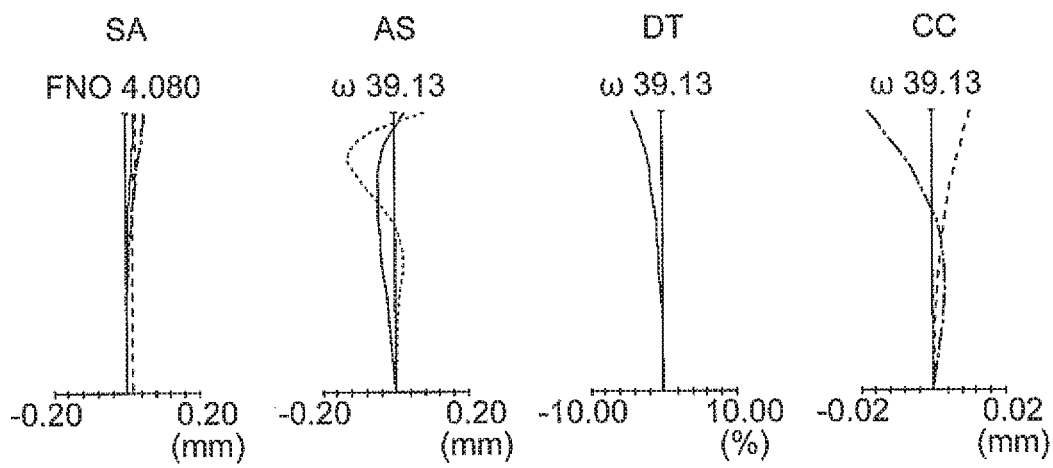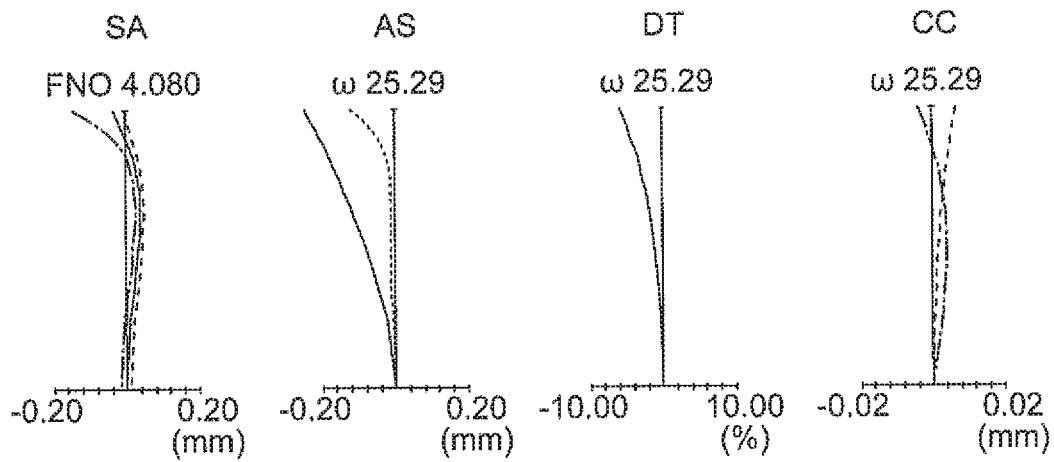

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2018-064668 filed on Mar. 29, 2018; the entire contents of which are incorporated herein by reference.

BACKGROUND OF THE INVENTION

Field of the Invention

The present invention relates to a zoom lens and an image pickup apparatus using the zoom lens.

Description of the Related Art

As image pickup apparatuses in which an electronic image pickup element is used, digital cameras such as, a digital single-lens reflex camera and a mirrorless single-lens camera, have been known. The mirrorless single-lens camera, similar to the digital single-lens reflex camera, is a camera in which the lens can be interchanged. However, the mirrorless single-lens camera, unlike the digital single-lens reflex camera, does not have a quick-return mirror. In recent years, the mirrorless single-lens cameras have become popular rapidly.

In the mirrorless single-lens camera, lenses of various types are used. A zoom lens is one of those. The zoom lens is sought to have a high zoom ratio and to be small-sized and light-weight, in addition to have a high optical performance.

Particularly, a wide-angle zoom lens has a merit of a capability of capturing over a wider range and a merit of an effect of a capability to emphasize a perspective. For this, in a wide-angle zoom lens, it is desirable that an angle of view at a wide angle end is wider.

As a wide-angle zoom lens suitable for small-sizing, a zoom lens of a negative-lead type has been known. In the negative-lead type zoom lens, a lens unit having a negative refractive power is disposed nearest to an image. In Japanese Patent Application Laid-open Publication No. 2010-176098, Japanese Patent Application Laid-open Publication No. 2017-122743, and Japanese Patent Application Laid-open Publication No. 2013-50674, zoom lenses of the negative-lead type have been disclosed.

In Japanese Patent Application Laid-open Publication No. 2010-176098 and Japanese Patent Application Laid-open Publication No. 2017-122743, zoom lenses having four lens units have been disclosed. The zoom lenses include in order from an object side, a first lens unit having a negative refractive power, a second lens unit having a positive refractive power, a third lens unit having a positive refractive power, and a fourth lens unit having a positive refractive power. At a time of zooming, each lens unit moves. An angle of view at a wide angle end is more than 100 degrees, and the zoom ratio is about 2.

In Japanese Patent Application Laid-open Publication No. 2013-50674, a zoom lens having five lens units has been disclosed. The zoom lens includes in order from an object side, a first lens unit having a negative refractive power, a second lens unit having a positive refractive power, a third lens unit having a positive refractive power, a fourth lens unit having a negative refractive power, and a fifth lens unit having a positive refractive power. At the time of zooming, each lens unit moves. The angle of view at the wide angle end is less than 100 degrees, and the zoom ratio is about 3.

SUMMARY OF THE INVENTION

A zoom lens according to at least some embodiments of the present invention consists of in order from an object side:
a first lens unit having a negative refractive power,
a second lens unit having a positive refractive power,
a third lens unit having a positive refractive power, and
a fourth lens unit having a positive refractive power, wherein
each lens unit has a lens component,
the first lens unit includes at least two negative lens components,
the number of lenses in the third lens unit is larger than the number of lenses in the second lens unit,
at a time of zooming from a wide angle end to a telephoto end, distances between the lens units change, and the first lens unit, after moving toward an image side, moves toward the object side,
in zooming in a state of being focused to an object at infinity, a distance between the second lens unit and the third lens unit becomes widest at the wide angle end, and here
the lens component is a single lens or a cemented lens, and is a lens with two optical effective surfaces that are in contact with air.

Moreover, an image pickup apparatus according to at least some embodiments of the present invention comprises:
an optical system, and
an image pickup element which has an image pickup surface, and which converts an image formed on the image pickup surface by the optical system to an electric signal, wherein the optical system is the abovementioned zoom lens.

BRIEF DESCRIPTION OF THE DRAWINGS

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams of the zoom lens according to the example 1;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams of the zoom lens according to the example 2;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams of the zoom lens according to the example 3;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams of the zoom lens according to the example 4;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams of the zoom lens according to the example 5;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams of the zoom lens according to the example 6;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams of the zoom lens according to the example 7;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams of the zoom lens according to the example 8;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams of the zoom lens according to the example 9;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams of the zoom lens according to the example 11;

FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams of the zoom lens according to the example 12;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams of the zoom lens according to the example 13;

DETAILED DESCRIPTION OF THE INVENTION

Figure 1:
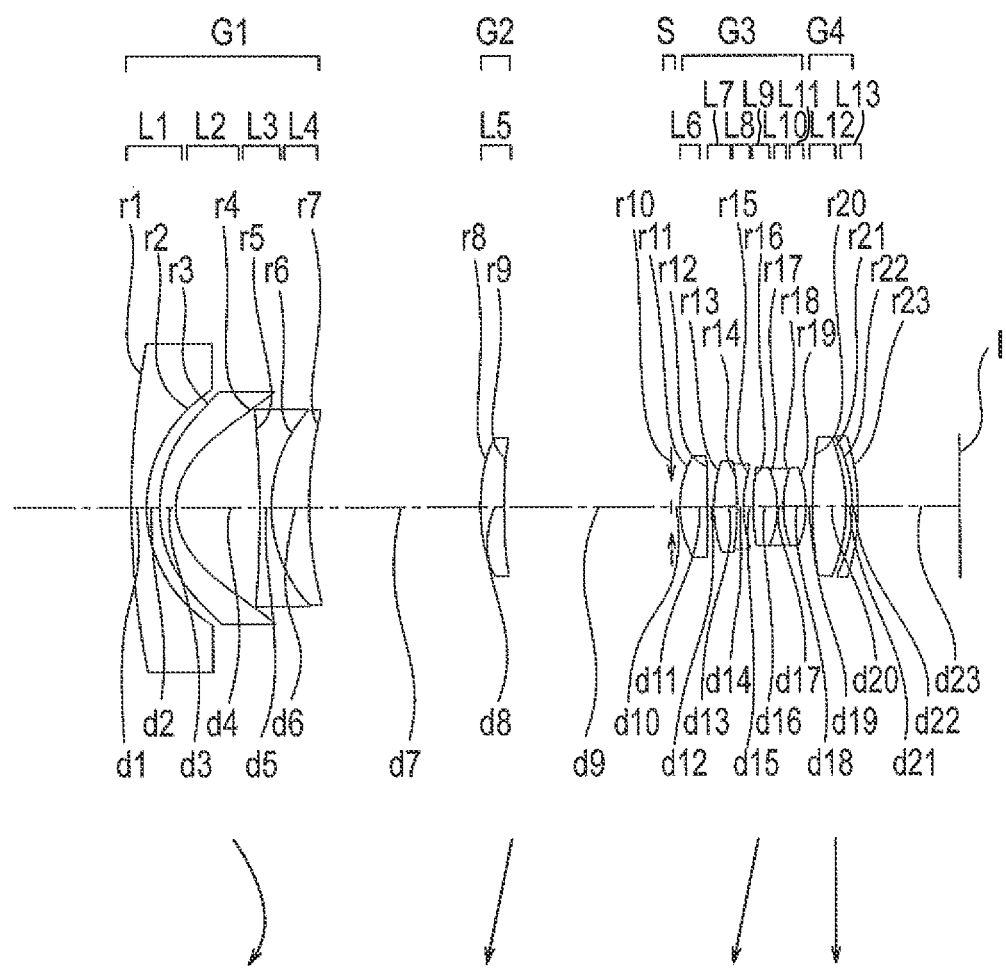
FIG. 1 is a lens cross-sectional view of a zoom lens according to an example 1.
Figure 2:
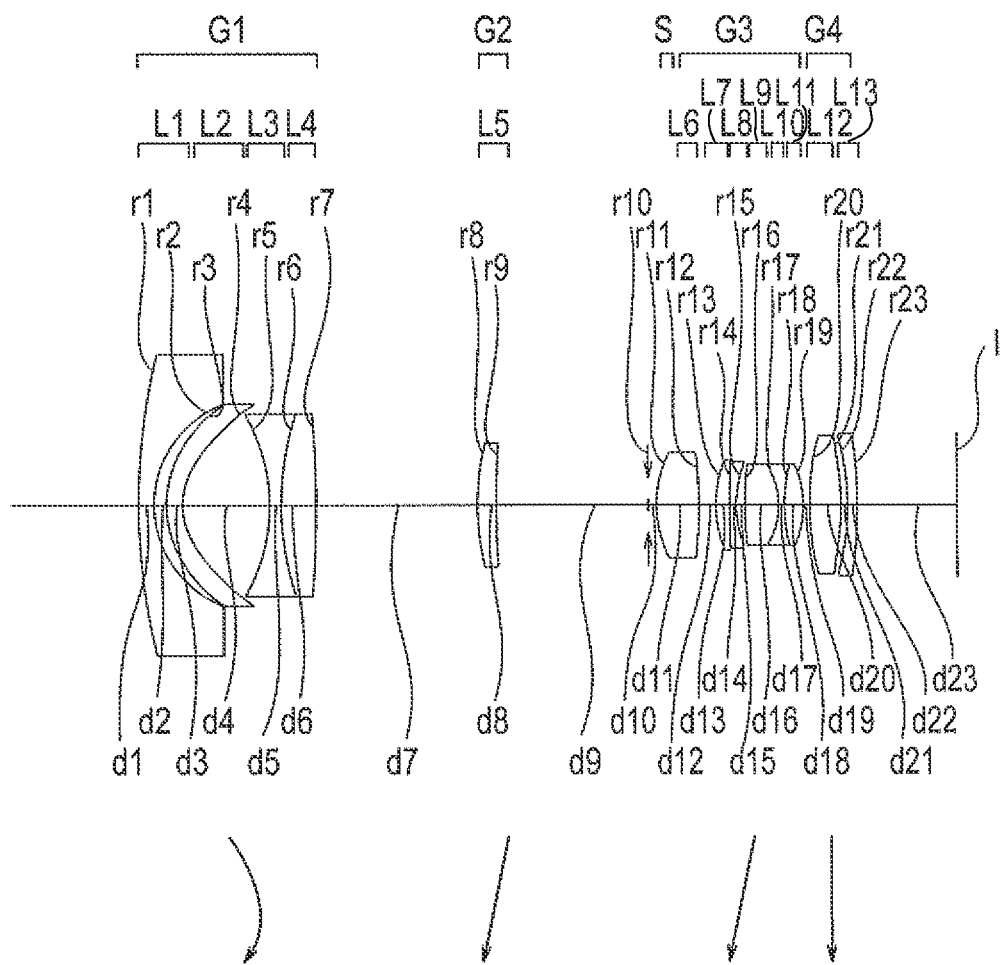
FIG. 2 is a lens cross-sectional view of a zoom lens according to an example 2.
Figure 3:
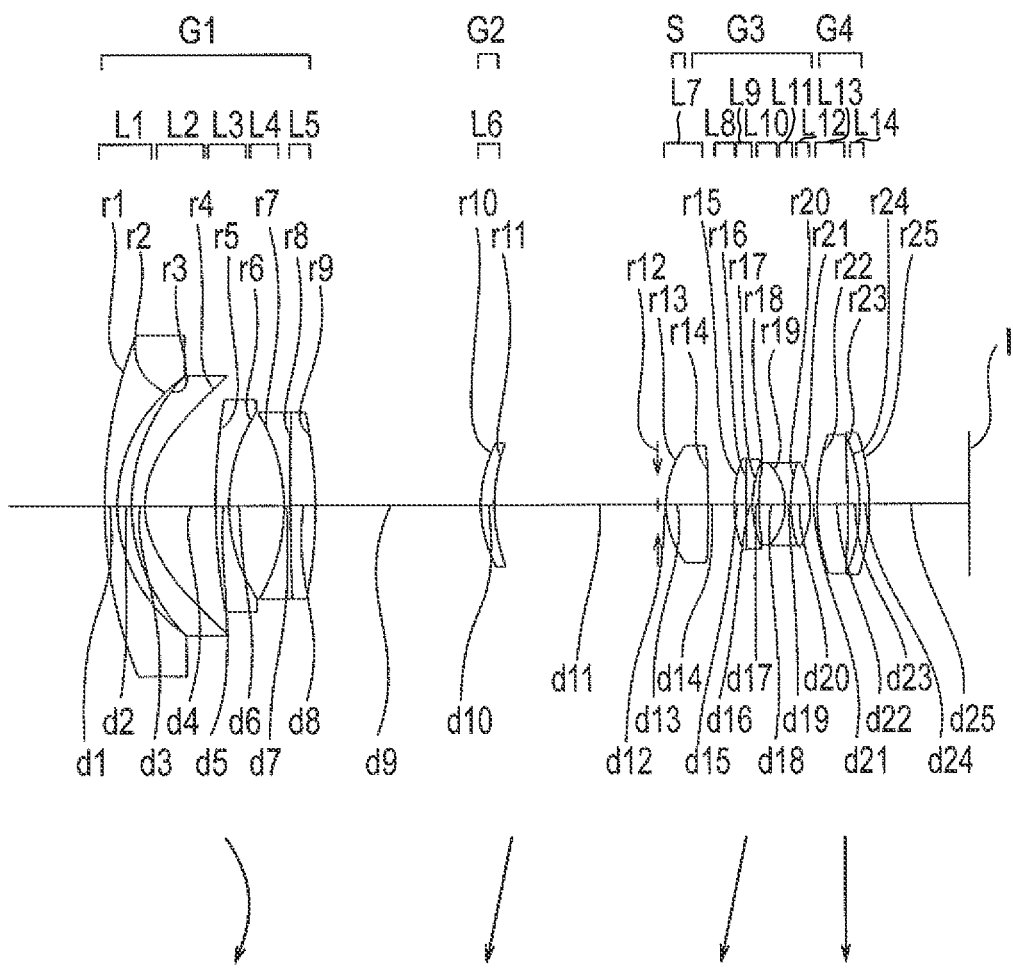
FIG. 3 is a lens cross-sectional view of a zoom lens according to an example 3.
Figure 4:
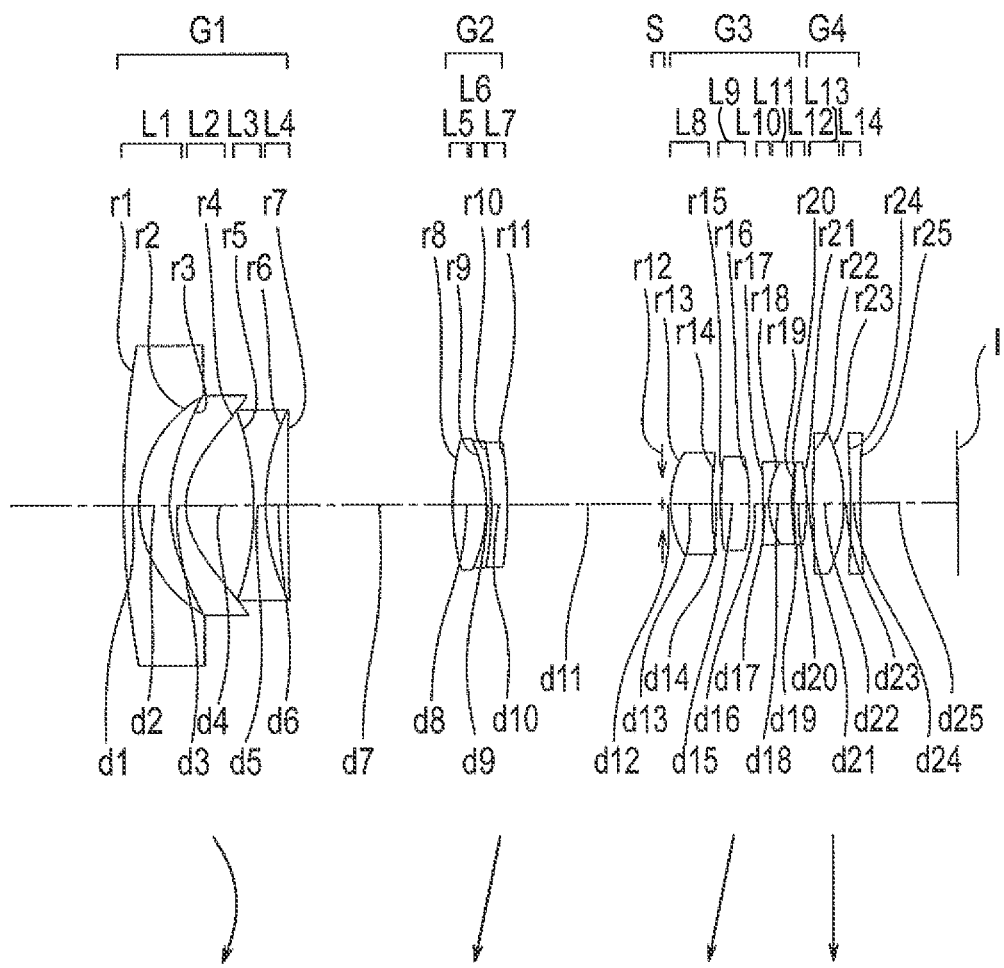
FIG. 4 is a lens cross-sectional view of a zoom lens according to an example 4.
Figure 5:
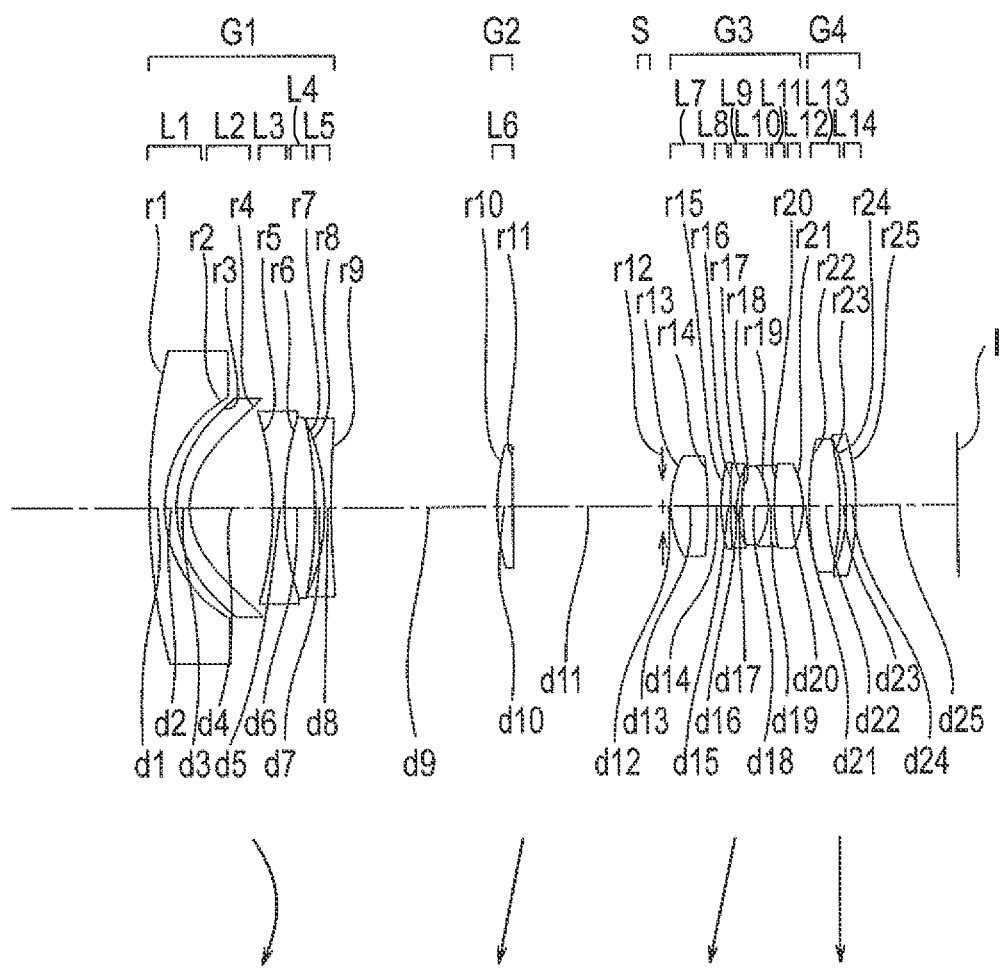
FIG. 5 is a lens cross-sectional view of a zoom lens according to an example 5.
Figure 6:
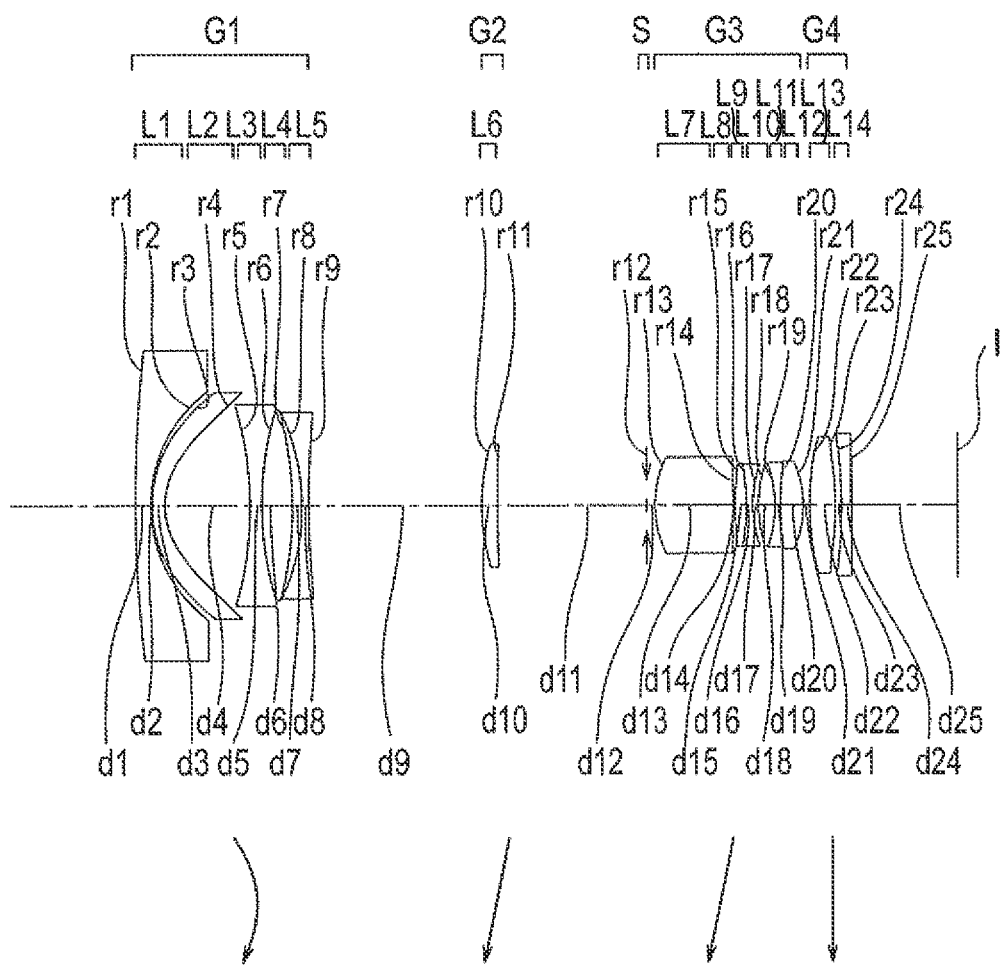
FIG. 6 is a lens cross-sectional view of a zoom lens according to an example 6.
Figure 7:
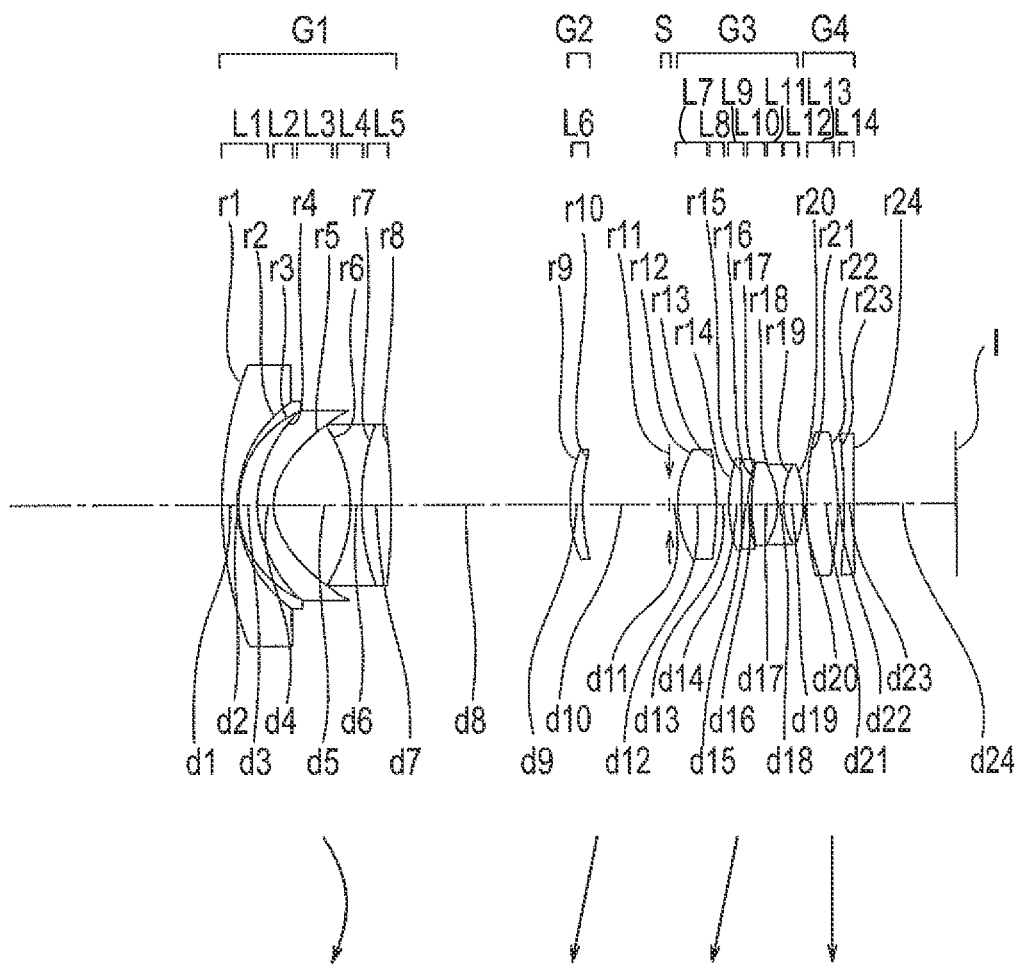
FIG. 7 is a lens cross-sectional view of a zoom lens according to an example 7.
Figure 8:
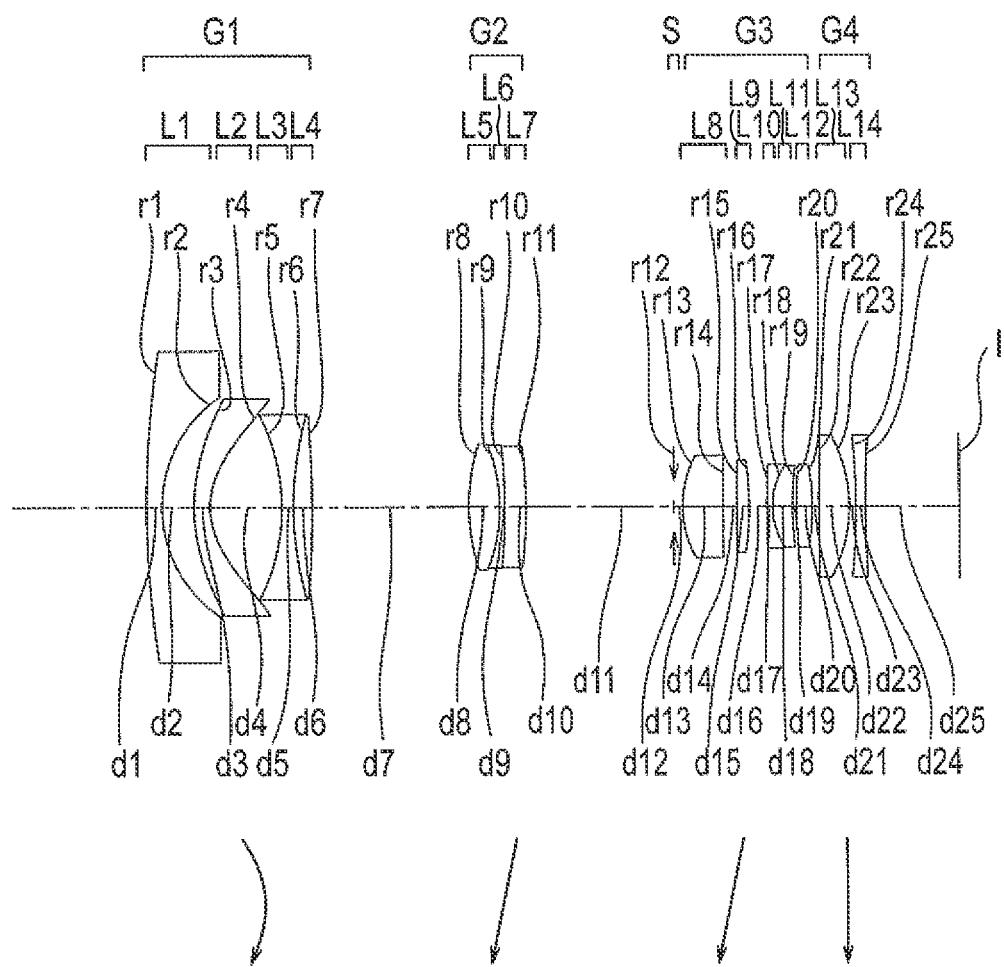
FIG. 8 is a lens cross-sectional view of a zoom lens according to an example 8.
Figure 9:
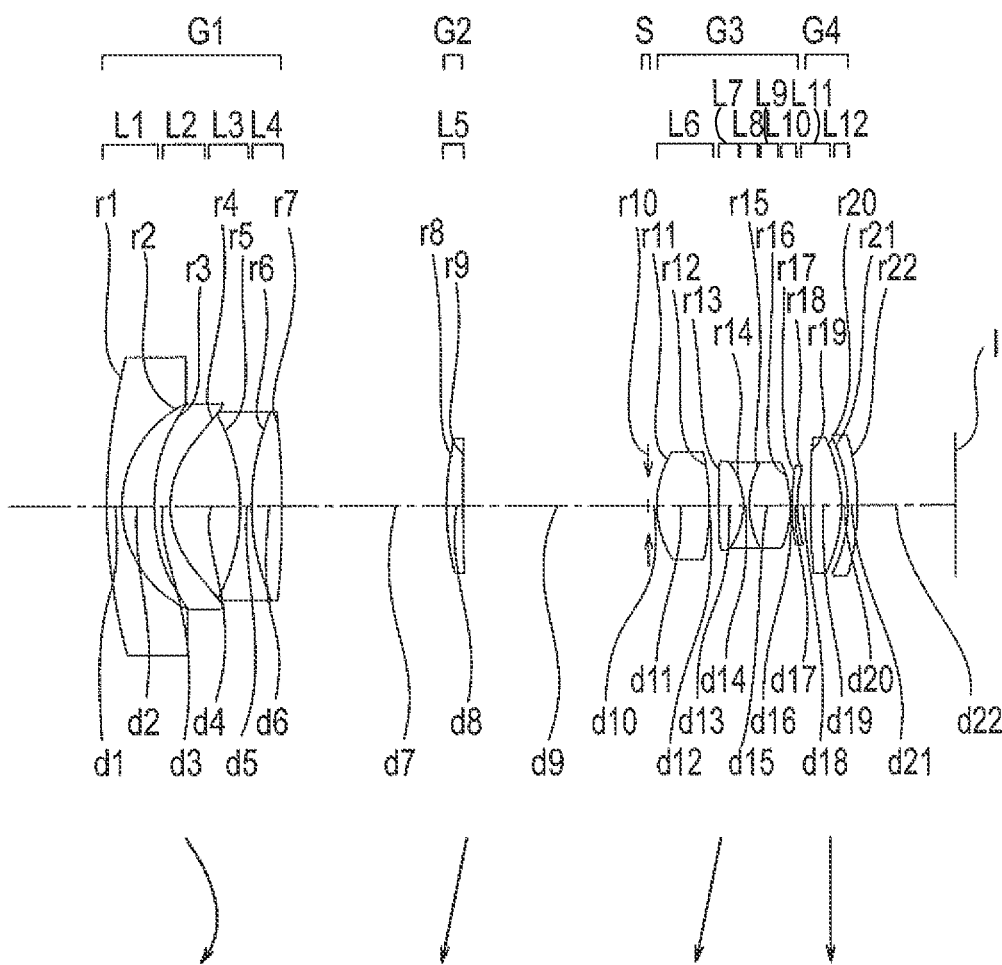
FIG. 9 is a lens cross-sectional view of a zoom lens according to an example 9.
Figure 10:
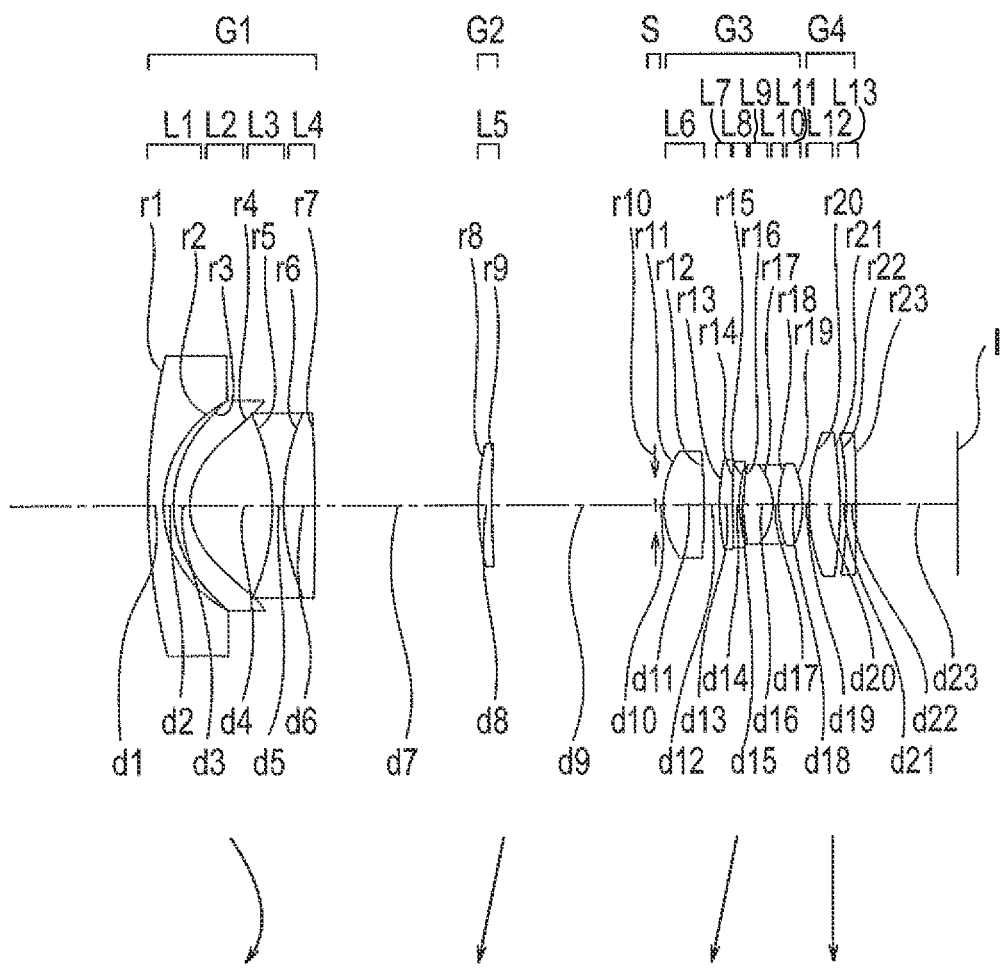
FIG. 10 is a lens cross-sectional view of a zoom lens according to an example 10.
Figure 11:
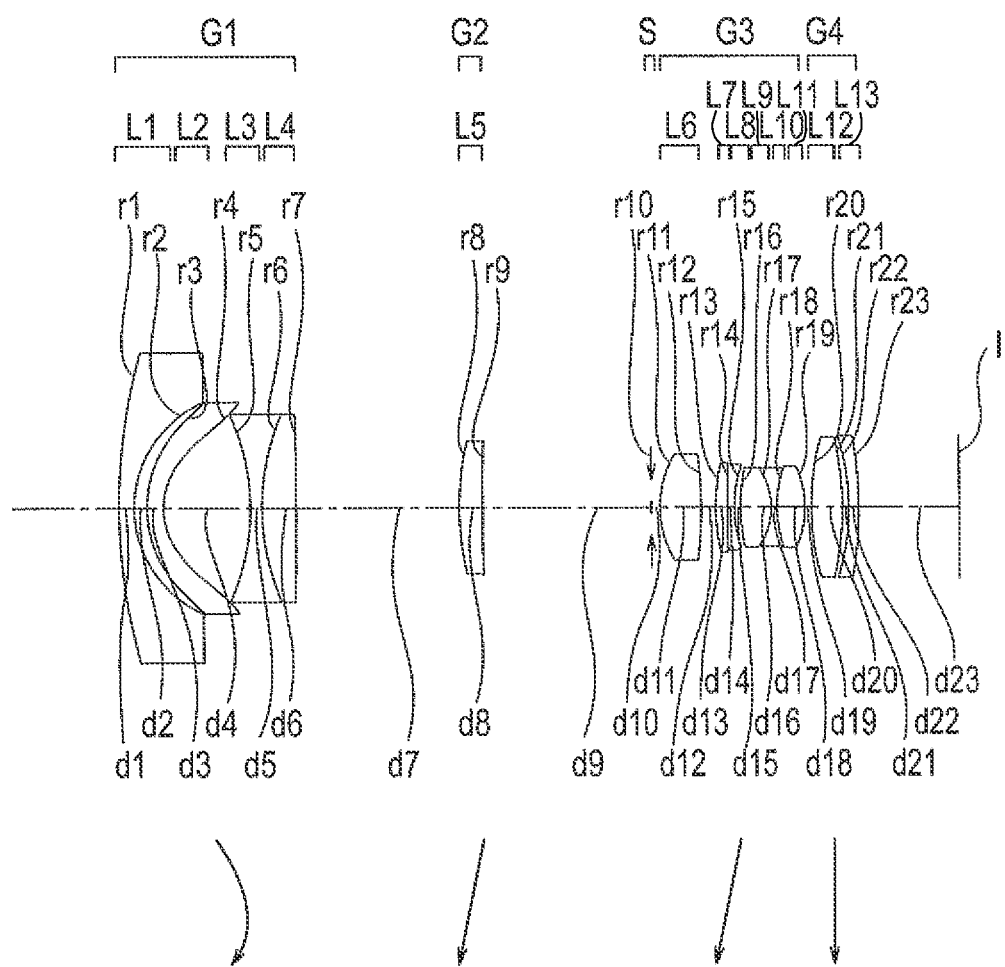
FIG. 11 is a lens cross-sectional view of a zoom lens according to an example 11.
Figure 12:
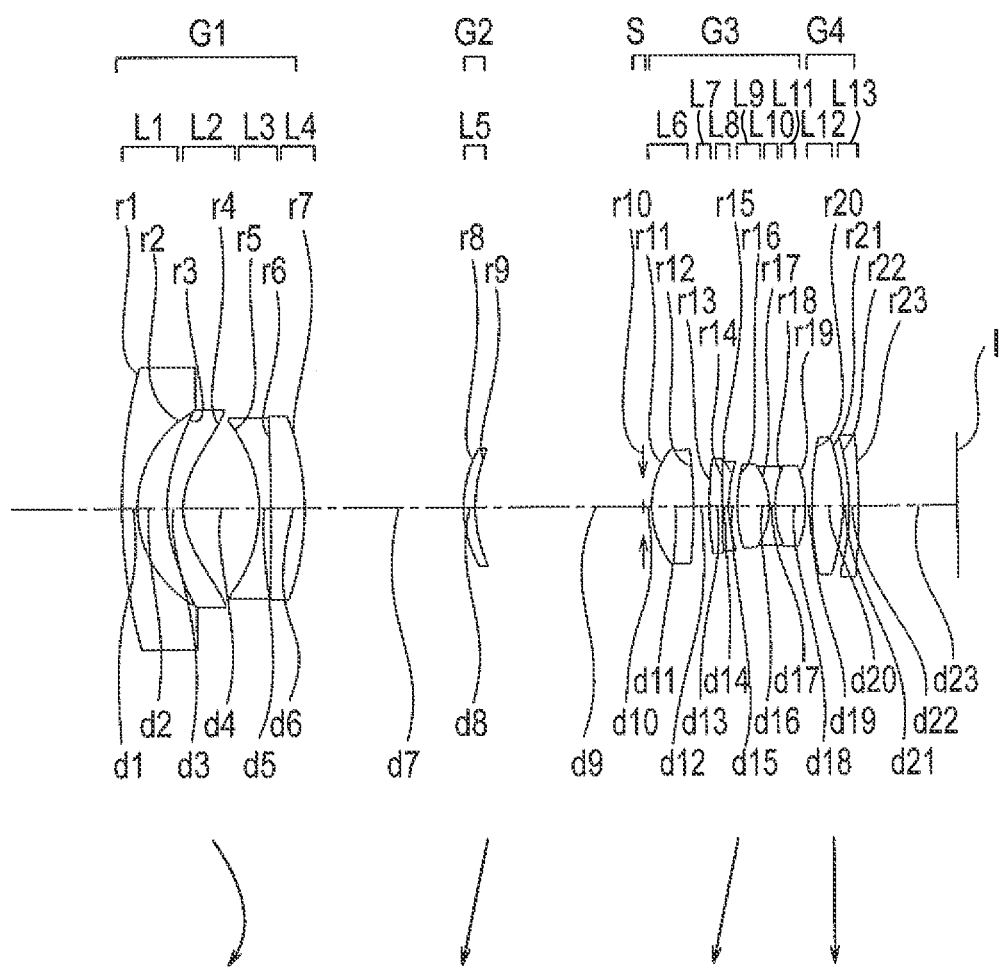
FIG. 12 is a lens cross-sectional view of a zoom lens according to an example 12.
Figure 13:
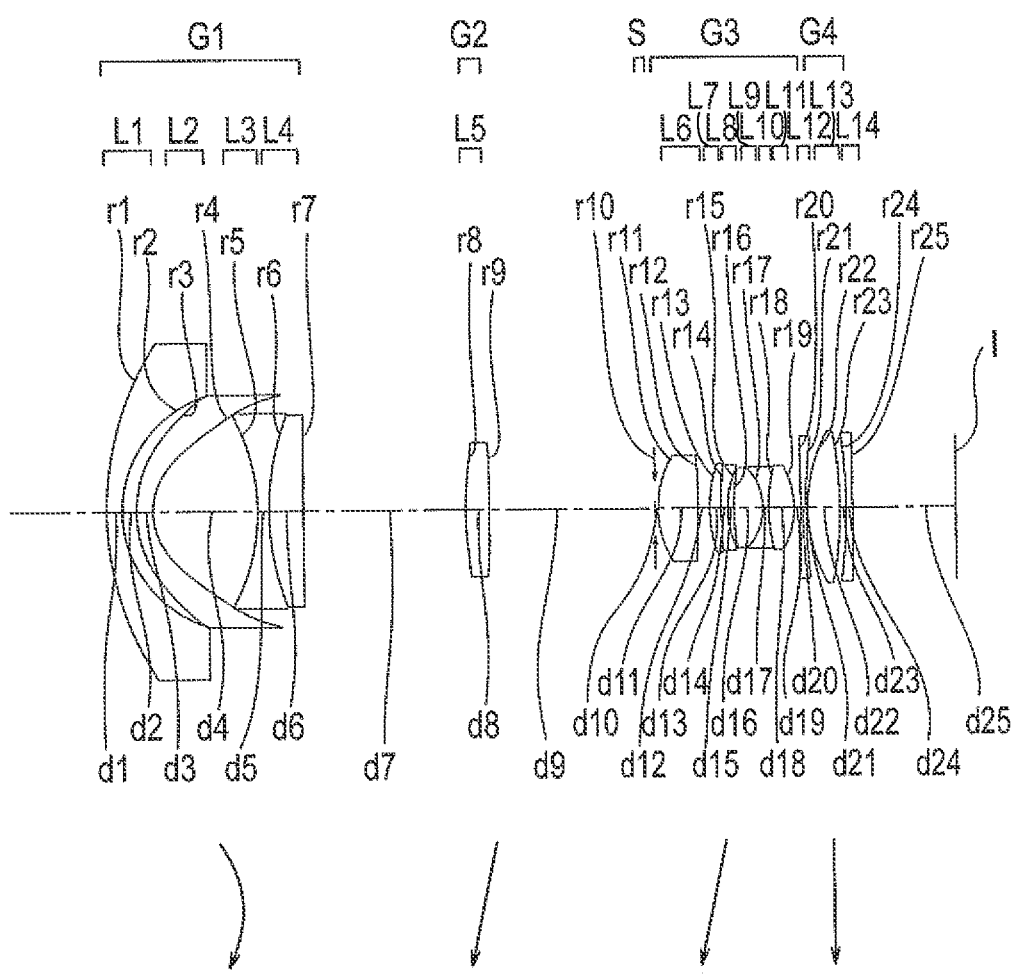
FIG. 13 is a lens cross-sectional view of a zoom lens according to an example 13.
Figure 23A:
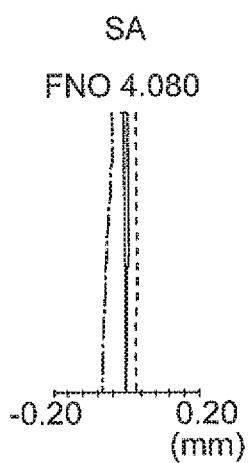
FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams of the zoom lens according to the example 10.
Figure 23B:
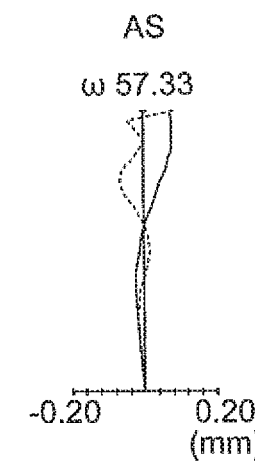
Figure 23C:
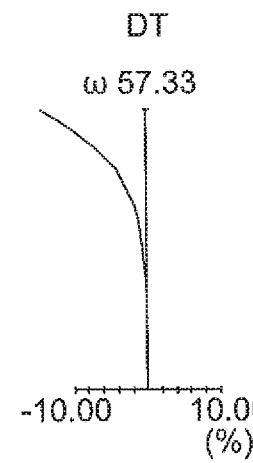
Figure 23D:
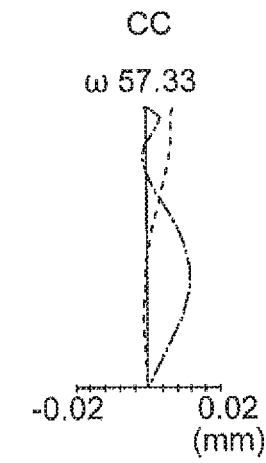
Figure 23E:
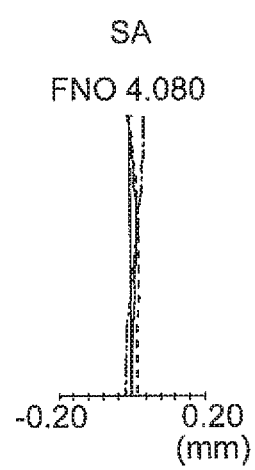
Figure 23F:
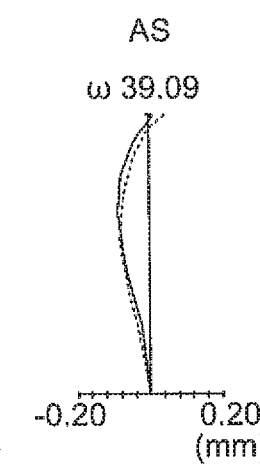
Figure 23G:
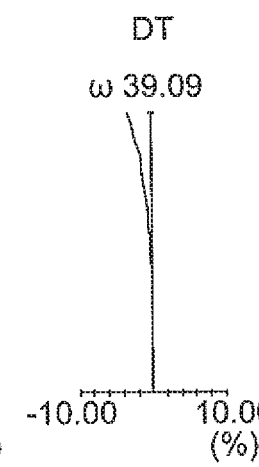
Figure 23H:
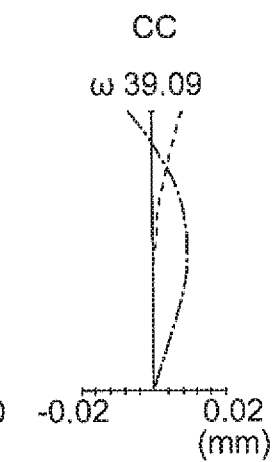
Figure 23I:
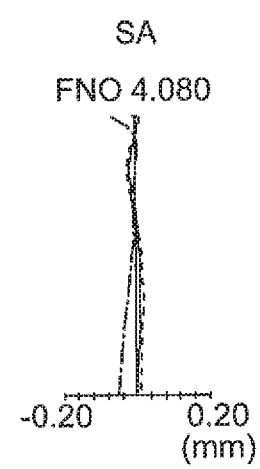
Figure 23J:
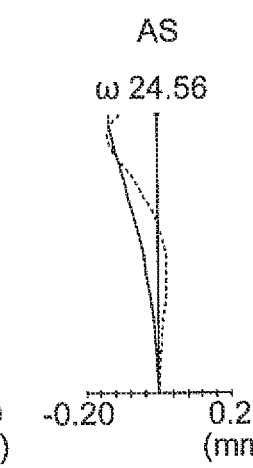
Figure 23K:
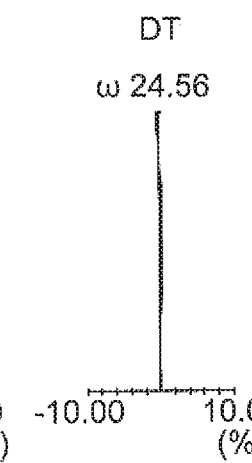
Figure 23L:
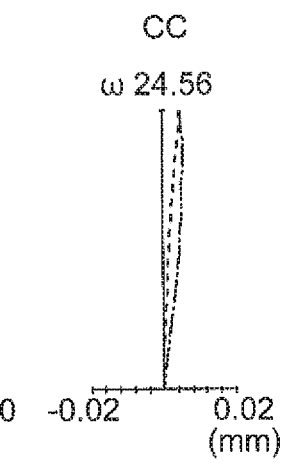

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A zoom lens of the present embodiment includes in order from an object side, a first lens unit having a negative refractive power, a second lens unit having a positive refractive power, a third lens unit having a positive refractive power, and a fourth lens unit having a positive refractive power, wherein each lens unit has a lens component, the first lens unit includes at least two negative lens components, the number of lenses in the third lens unit is larger than the number of lenses in the second lens unit, at a time of zooming from a wide angle end to a telephoto end, distances between lens units changes, and the first lens unit, after moving toward the image side, moves toward the object side, in zooming in a state of being focused to an object at infinity, a distance between the second lens unit and the third lens unit becomes the widest at the wide angle end, and here the lens component is a single lens or a cemented lens, and is a lens with two optically effective surfaces that are in contact with air.

As a conventional wide-angle zoom lens, a wide-angle zoom lens which consists of a first lens unit having a negative refractive power and a second lens unit having a positive refractive power has been known. The zoom lens of the present embodiment is a zoom lens in which two lens units having a positive refractive power is added to the conventional wide-angle zoom lens.

One of the lens units having a positive refractive power is added nearest to an image in the conventional wide-angle zoom lens. The other lens unit having a positive refractive power is added between a first lens unit and a second lens unit of the conventional wide-angle zoom lens. As a result, in the zoom lens of the present embodiment, an arrangement of refractive power is in order of a negative refractive power, a positive refractive power, a positive refractive power, and a positive refractive power from the object side.

In the zoom lens of the present embodiment, the second lens unit and the fourth lens unit correspond to the two lens units that have been added. The second lens unit, in the conventional wide-angle zoom lens, is a lens unit that has been added between the first lens unit and the second lens unit. The fourth lens unit, in the conventional wide-angle zoom lens, is a lens unit that has been added nearest to the image.

By the fourth lens unit being added, in the zoom lens of the present embodiment, it has become possible to achieve both of shortening a focal length of the overall optical system and correcting various aberrations favorably. The various aberrations here are aberrations that could not be corrected entirely in the first lens unit of the conventional wide-angle zoom lens, and specifically, are a chromatic aberration and Petzval sum.

Each of the first lens unit, the second lens unit, the third lens unit, and the fourth lens unit has a lens component. The lens component is a single lens or a cemented lens, and is a lens with two optically effective surfaces that are in contact with air.

The first lens unit includes at least two negative lens components. Accordingly, it is possible to secure a wide angle of view while suppressing an occurrence of an aberration.

The number of lenses in the third lens unit is larger than the number of lenses in the second lens unit. By making such arrangement, it becomes easy to make the positive refractive power of the third lens unit large while suppressing an occurrence of an aberration.

In a case in which the second lens unit, the third lens unit, and the fourth lens unit are deemed as one lens unit, a lens unit having a positive refractive power (hereinafter, referred to as 'predetermined lens unit') is positioned on the image side of the first lens unit. In such arrangement, a distance between a principal point of the first lens unit and a principal point of the predetermined lens unit has an effect on the focal length of the overall zoom lens system, an angle of view at the wide-angle end, and a zoom ratio.

In a case in which the number of lenses in the third lens unit is larger than the number of lenses in the second lens unit, the distance between the principal point of the first lens unit and the principal point of the predetermined lens widens. Consequently, it becomes easy to shorten the focal length of the overall zoom lens system. Moreover, it becomes easy to secure a zoom ratio and the angle of view at the wide angle end. Furthermore, since it becomes easy to improve a magnification of the predetermined lens unit, it is possible to shorten the total length of the zoom lens at the wide angle end.

At the time of zooming from the wide angle end to the telephoto end, distances between lens units change. Furthermore, the first lens unit, after moving toward the image side, moves toward the object side. When the first lens unit is made to undergo vibration movement, since a magnification of the predetermined lens unit becomes high as compared to a case in which the first lens unit moves toward the image side all the time, aberration correction becomes difficult.

However, making the first lens unit undergo the vibration movement is advantageous for shortening the total length of the zoom lens and making a diameter of the first lens unit small. The total length of the zoom lens is susceptible to become long particularly at the wide angle end. However, by making the first lens unit undergo the vibration movement, it is possible to shorten the total length of the zoom lens at the wide angle end. Furthermore, this also leads to improvement in the zoom ratio.

Moreover, since it is possible to shorten a distance from a lens surface positioned nearest to an object up to an entrance pupil, it becomes easy to widen the angle of view.

In a case in which only the fourth lens unit is added, the arrangement of the refractive power becomes a negative refractive power, a positive refractive power, and a positive refractive power. In this case, when the total length of the zoom lens is shortened, correction of various aberrations becomes difficult. Therefore, in the zoom lens of the present embodiment, the second lens unit is added, and also a relative distance between the second lens unit and the third lens unit is varied. By making such arrangement, correction of various aberrations is possible even when the total length of the zoom lens is made short.

As the zoom ratio becomes high, correction of a fluctuation in astigmatism in particular, becomes difficult. In the zoom lens of the present embodiment, at the time of zooming from the wide angle end to the telephoto end, the distance between the second lens unit and the third lens unit is set appropriately for each focal length.

More specifically, in zooming in the state of being focused to an object at infinity, the distance between the second lens unit and the third lens unit is the widest at the wide angle end. By making such arrangement, it is possible to suppress the fluctuation in astigmatism.

In the zoom lens of the present embodiment, it is preferable that the following conditional expression (1) be satisfied:

$$1.5 < D23W/D23T < 100 \tag{1}$$

where,

D23W denotes a distance between the second lens unit and the third lens unit at the wide angle end at the time of focusing to the object at infinity, and D23T denotes a distance between the second lens unit and the third lens unit at the telephoto end at the time of focusing to the object at infinity.

In a case in which a value exceeds an upper limit value of conditional expression (1), the second lens unit and the third lens unit become excessively closer at the telephoto end. As a result, a mechanical interference is susceptible to occur. Moreover, at the wide angle end, the second lens unit and the third lens unit are excessively distant. As a result, the total length of the zoom lens becomes long.

In a case in which a value falls below a lower limit value of conditional expression (1), it is not possible to secure adequately an amount of movement of the third lens unit. As a result, it is not possible to secure an adequate zoom ratio. Or, the fluctuation in astigmatism at the time of zooming cannot be entirely cancelled by the second lens unit.

In the zoom lens of the present embodiment, it is preferable that the number of lenses in the third lens unit is at least two lenses more than the number of lenses in the second lens unit.

In the zoom lens of the present embodiment, the main zooming is carried out by the first lens unit and the third lens unit. Therefore, in the second lens unit, it is possible to correct mainly the astigmatism. In this case, by making the number of lenses in the second lens unit fewer than the number of lenses in the third lens unit, the distance between the first lens unit and the third lens unit becomes narrow. As a result, it is possible to secure an adequate zoom ratio.

Moreover, when the number of lenses in the third lens unit is more than the number of lenses in the second lens unit, it becomes easy to make the refractive power of the third lens unit large while suppressing an occurrence of aberration. Consequently, it is possible to shorten the total length of the zoom lens, as well as to reduce an amount of movement of the third lens unit at the time of zooming.

Making the number of lenses of the third lens unit at least two lenses more than the number of lenses in the second lens unit is advantageous for securing the zoom ratio, for shortening the total length of the zoom lens, and for reducing the amount of movement of the third lens unit at the time of zooming.

In the zoom lens of the present embodiment, it is preferable that the first lens unit include a first lens component having a negative refractive power, a second lens component having a negative refractive power, and a third lens component, the first lens component be disposed nearest to the object, the second lens component be disposed adjacent to the first lens component, and the following conditional expression (2) be satisfied:

$$1.7 < DL23/DL12 < 100 \tag{2}$$

where,

DL12 denotes a distance between the first lens component and the second lens component, and DL23 denotes a distance between the second lens component and the third lens component.

In a case in which a value exceeds an upper limit value of conditional expression (2), it becomes difficult to secure an effective diameter in the first lens component and to secure an effective diameter in the second lens component.

Furthermore, at the wide angle end, the astigmatism is deteriorated in a peripheral portion of an image.

An astigmatic difference differs for each wavelength. For instance, an astigmatic difference for a d-line differs from an astigmatic difference for a C-line. In this case, for the d-line and the C-line, the astigmatic difference occurs. In a case in which a value exceeds the upper limit value of conditional expression (2), the difference in the astigmatic difference becomes large for different wavelengths.

In a case in which a value falls below a lower limit value of conditional expression (2), the first lens component and the second lens component become distant. In this case, since a principal point position of the first lens unit moves toward the image side, an entrance pupil moves toward the image side. Consequently, it becomes difficult to secure a wide angle of view. Or, an outer diameter of the first lens unit becomes large.

Furthermore, the astigmatism and a curvature of field in a sagittal direction are deteriorated. Regarding the astigmatism, the difference in the astigmatic difference for different wavelengths becomes large.

In the zoom lens of the present embodiment, it is preferable that the first lens unit include a first lens component having a negative refractive power, a second lens component having a negative refractive power, and a third lens component, the first lens component is disposed nearest to the object, the second lens component is disposed adjacent to the first lens component, and the third lens component consists of a cemented lens.

When such arrangement is made, two lens components having a negative refractive power are disposed on the object side. As a result, it is possible to secure a wide angle of view and an adequate back focus.

However, in a case in which two lens components having a negative refractive power are disposed on the object side, it is not possible to correct a coma adequately. Particularly, it is not possible to make adequately small a difference in the coma that occurs for different wavelengths. Therefore, the third lens component is to be disposed and a cemented lens is used for the third lens component. By making such arrangement, it is possible to make small a difference in the coma that occurs for different wavelengths.

In the zoom lens of the present embodiment, it is preferable that the third lens component consist of in order from the object side, a negative lens and a positive lens, and the following conditional expression (3) be satisfied:

$$-100<(R13a+R13b)/(R13a-R13b)<2 \qquad (3)$$

where,

R13a denotes a paraxial radius of curvature of a surface nearest to the object of the third lens component, and R13b denotes a paraxial radius of curvature of a surface nearest to the image of the third lens component.

In a case in which a value exceeds an upper limit value of conditional expression (3), a curvature of a surface nearest to the image of the third lens component becomes small. Since the third lens component is a cemented lens, a curvature of a surface on the image side of the cemented lens becomes small. In this case, since the refractive power of the positive lens becomes small, a focal length of the first lens unit becomes long.

In this case, for securing a wide angle of view, it is necessary to lower the magnification of the predetermined lens unit. However, when the magnification of the predetermined lens unit is lowered, the total length of the zoom lens at the wide angle end becomes long, as well as the diameter of the first lens unit becomes large.

In a case in which a value falls below a lower limit value of conditional expression (3), an angle of incidence of an off-axis light ray on a surface nearest to the object of the third lens component becomes large. Since the third lens component is a cemented lens, an angle of incidence of an off-axis light ray on a surface nearest to the object of the cemented lens becomes large. Consequently, the curvature of field in the sagittal direction at the wide angle end is deteriorated.

In the zoom lens of the present embodiment, it is preferable that the first lens unit include a first lens component having a negative refractive power, the first lens component is disposed nearest to the object, and the following conditional expression (4) be satisfied:

$$1<(R11a+R11b)/(R11a-R11b)<3 \qquad (4)$$

where,

R11a denotes a paraxial radius of curvature of a surface nearest to the object of the first lens component, and R11b denotes a paraxial radius of curvature of a surface nearest to the image of the first lens component.

In a case in which a value exceeds an upper limit value of conditional expression (4), a curvature of the surface nearest to the image of the first lens component becomes excessively large. Consequently, manufacturing of the first lens component becomes difficult. Moreover, in the first lens component, since a height of an off-axis light ray on a predetermined plane tends to become high, a diameter of the first lens component is susceptible to become large. The predetermined plane is a tangential plane at an apex of the surface on the object side of the first lens component.

For instance, an optical filter is disposed on the object side of the first lens component. When the diameter of the first lens component becomes large, a diameter of the optical filter becomes large. The optical filter is held by a lens barrel. Therefore, a diameter of the lens barrel is susceptible to become large.

In a case in which a value falls below a lower limit value of conditional expression (4), a curvature of the surface nearest to the object of the first lens component becomes excessively small. In this case, an angle of incidence of an off-axis light ray on the first lens component becomes large. Consequently, a fluctuation in distortion at the time of zooming becomes large.

In the zoom lens of the present embodiment, it is preferable that the number of positive lenses in the third lens unit be not more than four, and the following conditional expression (5) be satisfied:

$$0.4<D31/fw<2 \qquad (5)$$

where,

D31 denotes a thickness on an optical axis of a lens component nearest to the object in the third lens unit, and fw denotes the focal length of the zoom lens at the wide angle end at the time of focusing to the object at infinity.

In a case in which a value falls below a lower limit value of conditional expression (5), it becomes difficult to achieve both of the correction of a spherical aberration and the correction of the coma. In a case in which a value exceeds an upper limit value of conditional expression (5), the thickness of the third lens unit becomes thick. In this case, a moving mechanism for the third lens unit becomes large in size. Consequently, the total length of the zoom lens becomes long, as well as an outer shape of the optical system becomes large.

In the zoom lens of the present embodiment, it is preferable that the number of positive lenses in the third lens unit be not more than five, the third lens unit includes an object-side lens component having a positive refractive power and an image-side lens component having a positive refractive power, the object-side lens component is disposed nearest to the object, the image-side lens component is disposed adjacent to the object-side lens component, and the following conditional expression (6) be satisfied.

$$0.5 < (D31+D32)/fw < 2.5 \quad (6)$$

where,

D31 denotes the thickness on an optical axis of the object-side lens component,

D32 denotes a thickness on the optical axis of the image-side lens component, and fw denotes the focal length of the zoom lens at the wide angle end at the time of focusing to the object at infinity.

In a case in which a value falls below a lower limit value of conditional expression (6), it becomes difficult to achieve both of the correction of the spherical aberration and the correction of the coma. In a case in which a value exceeds an upper limit value of conditional expression (6), the thickness of the third lens unit becomes thick. In this case, the moving mechanism for the third lens unit becomes large in size. Consequently, the total length of the zoom lens becomes long, as well as the outer shape of the optical system becomes large.

In the zoom lens of the present embodiment, it is preferable that the fourth lens unit be fixed at the time of zooming.

By making such arrangement, it is possible to reduce the number of moving mechanisms for moving the lens units. As a result, it becomes easy to facilitate small-sizing and making light-weight the moving mechanisms as a whole. Moreover, by the number of moving mechanisms becoming lesser, it is possible to improve further a durability, a dust-proofing property, and a water-proofing property.

In the zoom lens of the present embodiment, it is preferable that the first lens unit include a first lens component having a negative refractive power and a second lens component having a negative refractive power, the first lens component is disposed nearest to the object, the second lens component is disposed adjacent to the first lens component, and the following conditional expression (7) is satisfied:

$$0 < f11/f12 < 2 \quad (7)$$

where, f11 denotes a focal length of the first lens component, and f12 denotes a focal length of the second lens component.

In a case in which a value exceeds an upper limit value of conditional expression (7), the refractive power of the first lens unit becomes small as compared to the refractive power of the second lens unit. In this case, since an entrance pupil of the zoom lens is positioned further on the image side, an outer diameter of the first lens unit becomes large.

As mentioned above, according to the requirement, the optical filter is disposed on the object side of the first lens unit. When the diameter of the first lens unit becomes large, a diameter of the optical filter becomes large. The optical filter is held by the lens barrel. Consequently, the diameter of the lens barrel is susceptible to become large.

In a case in which a value falls below a lower limit value of conditional expression (7), the negative refractive power of the first lens component becomes large. In this case, the curvature of the surface nearest to the object of the first lens unit becomes large. As a result, a peripheral portion of the first lens component and a peripheral portion of the second lens component are susceptible to interfere. To avoid the interference, a diameter of a lens is to be made small. However, when the diameter of a lens is made small, it becomes difficult to secure a necessary effective diameter.

For avoiding the interference, the first lens component and the second lens component are to be kept distant. However, when the first lens component and the second lens component are kept distant, a height of an off-axis light ray that passes through the first lens component becomes high. As a result, an outer diameter of the first lens component becomes large.

As mentioned above, according to the requirement, the optical filter is disposed on the object side of the first lens component. When the diameter of the first lens component becomes large, the diameter of the optical filter becomes large. The optical filter is held by the lens barrel. Consequently, the diameter of the lens barrel is susceptible to become large.

In the zoom lens of the present embodiment, it is preferable that the first lens unit include in order from the object side, a first lens component having a negative refractive power, a second lens component having a negative refractive power, and a third lens component, the first lens component is disposed nearest to the object, the second lens component is disposed adjacent to the first lens component, the third lens component is disposed adjacent to the second lens component, and the following conditional expression (8) is satisfied:

$$-5 < (R12b+R13a)/(R12b-R13a) < 0 \quad (8)$$

where,

R12b denotes a paraxial radius of curvature of a surface nearest to the image of the second lens component, and R13a denotes a paraxial radius of curvature of a surface nearest to the object of the third lens component.

In a case in which a value exceeds an upper limit value of conditional expression (8), a predetermined angle of incidence becomes small. In this case, the spherical aberration of the first lens unit is corrected excessively. Consequently, the spherical aberration at the telephoto end is corrected excessively. The predetermined angle of incidence is an angle at which an axial marginal light ray is incident on the surface nearest to the object of the third lens component.

In a case in which, a value falls below a lower limit value of conditional expression (8), the predetermined angle of incidence becomes large. In this case, the spherical aberration of the first lens unit increases. Particularly, the spherical aberration at the telephoto end is deteriorated.

In the zoom lens of the present embodiment, it is preferable that at the time of focusing from the object at infinity to an object at a close distance, the second lens unit moves toward the image side along an optical axis.

The number of lenses in the second lens unit is fewer than the number of lenses in the third lens unit. Therefore, in focusing by the second lens unit, the lens unit to be moved becomes light-weight as compared to a case of focusing by the third lens unit. Consequently, it becomes easy to make the focusing speed high. Moreover, when the focusing is carried out by the second lens unit, an amount of fluctuation in astigmatism at the time of focusing is suppressed.

In the zoom lens of the present embodiment, it is preferable that the following conditional expression (9) be satisfied:

$$-100 < (R2a+R2b)/(R2a-R2b) < 1 \quad (9)$$

where,

R2a denotes a paraxial radius of curvature of a surface nearest to the object of the second lens unit, and R2b denotes a paraxial radius of curvature of a surface nearest to the image of the second lens component.

In a case in which a value exceeds an upper limit value of conditional expression (9), the fluctuation in the astigmatism at the time of zooming or the fluctuation in the astigmatism at the time of focusing becomes large.

At the telephoto end, the distance between the second lens unit and the third lens unit becomes narrow. In other words, a lens surface nearest to the image of the second lens unit and a lens surface nearest to the object of the third lens unit come closer. In a case in which a value falls below a lower limit value of conditional expression (9), at the telephoto end, the two lens surfaces are susceptible to make a contact at a peripheral portion. When an attempt is made to avoid the contact, it becomes difficult to secure an effective diameter for each of the two lens surfaces.

In the zoom lens of the present embodiment, it is preferable that the following conditional expression (10) be satisfied:

$$-1 < \beta 2w \times \beta 3w < -0.5 \tag{10}$$

where, $\beta 2w$ denotes a lateral magnification of the second lens unit at the wide angle end at the time of focusing to the object at infinity, and $\beta 3w$ denotes a lateral magnification of the third lens unit at the wide angle end at the time of focusing to the object at infinity.

At the time of zooming from the wide angle end to the telephoto end, the first lens unit, after moving toward the image side, moves toward the object side. A position of the first lens unit at the wide angle end is on the object side as compared to a position at the telephoto end.

In a case in which a value exceeds an upper limit value of conditional expression (10), the position of the first lens unit at the wide angle end is more on the object side. Consequently, the total length of the zoom lens at the wide angle end becomes long, as well as the diameter of the first lens unit becomes large.

In a case in which a value falls below a lower limit value of conditional expression (10), the magnification of the second lens unit becomes high or the magnification of the third lens unit becomes high. In this case, both a load of aberration correction on the second lens unit and a load of aberration correction on the third lens unit increase. As a result, correction of various aberrations at the wide angle end, such as, correction of the spherical aberration and correction of the coma, at least, becomes difficult.

In the zoom lens of the present embodiment, it is preferable that the following conditional expression (11) be satisfied:

$$-3 < \beta 2t \times \beta 3t < -1.5 \tag{11}$$

where, $\beta 2t$ denotes a lateral magnification of the second lens unit at the telephoto end at the time of focusing to the object at infinity, and $\beta 3t$ denotes a lateral magnification of the third lens unit at the telephoto end at the time of focusing to the object at infinity.

Exceeding an upper limit value of conditional expression (11) is advantageous from a viewpoint of small-sizing of an outer shape at the telephoto end, and a favorable aberration correction. However, the zoom ratio is increased, the position of the first lens unit at the wide angle end is on the further object side. Consequently, the total length of the zoom lens at the wide angle end becomes long, as well as the diameter of the first lens unit becomes large.

Moreover, for securing a high zoom ratio, it is necessary to lower a combined magnification of the second lens unit and the third lens unit at the wide angle end. However, in this case, the total length of the zoom lens at the wide angle end becomes long.

In a case in which a value falls below a lower limit value of conditional expression (11), the magnification of the second lens unit becomes high or the magnification of the third lens unit becomes high. In this case, both the load of aberration correction on the second lens unit and the load of aberration correction on the third lens unit increase. As a result, correction of various aberrations at the telephoto end, such as correction of the spherical aberration and correction of the coma, at least, becomes difficult.

In the zoom lens of the present embodiment, it is preferable that the following conditional expression (12) be satisfied:

$$-0.4 < \beta 3w < 0 \tag{12}$$

where, $\beta 3w$ denotes a lateral magnification of the third lens unit at the wide angle at the time of focusing to the object at infinity.

In a case in which a value falls below a lower limit value of conditional expression (12), the magnification of the third lens unit becomes high. In this case, the load of aberration correction on the third lens unit increases. As a result, correction of various aberrations at the wide angle end, such as correction of the spherical aberration and the coma, at least, becomes difficult.

The magnification is mainly borne by the third lens unit. In a case in which a value exceeds an upper limit value of conditional expression (12), the magnification of the third lens unit becomes low. As a result, the position at the wide angle end is on the further object side. Consequently, the total length of the zoom lens at the wide angle end becomes long, as well as the diameter of the first lens unit becomes large.

In the zoom lens of the present embodiment, it is preferable that the following conditional expression (13) be satisfied:

$$2 < \beta 3t / \beta 3w < 20 \tag{13}$$

where, $\beta 3w$ denotes the lateral magnification of the third lens unit at the wide angle end at the time of focusing to the object at infinity, and $\beta 3t$ denotes a lateral magnification of the third lens unit at the telephoto end at the time of focusing to the object at infinity.

In a case in which a value falls below a lower limit value of conditional expression (13), a variation in the magnification by the third lens unit at the time of zooming becomes small. Consequently, it becomes difficult to secure an adequate zoom ratio.

In a case in which a value exceeds an upper limit value of conditional expression (13), the magnification by the third lens unit becomes high. Consequently, an amount of fluctuation in various aberrations at the time of zooming increases. Particularly, an amount of fluctuation in the spherical aberration and an amount of fluctuation in the coma increase.

In the zoom lens of the present embodiment, it is preferable that at least one lens unit include a cemented lens which consists of three lenses.

Each of the lens units, in many cases, includes a plurality of lenses. In the zoom lens of the present embodiment, at least one lens unit includes a cemented lens which consists of three lenses. As a result, at least in one lens unit, it is possible to suppress an increase in the overall thickness. Moreover, it is possible to suppress a lens barrel mechanism from becoming large, and an occurrence of a ghost.

The cemented lens which consists of three lenses has a superior aberration correction capability. Particularly, the cemented lens is capable of correcting the chromatic aberration favorably, and making Petzval sum small. Not only that, but for the other remained aberrations, it is possible to correct the other remained aberrations by generating that high-order component in the cemented lens.

It is possible to include four lenses in the cemented lens. However, considering the increase in the number of lenses, the capability of the aberration correction is not improved that much. Moreover, in proportion to the increase in the number of lenses, the thickness of the lens unit also increases. Accordingly, regarding the improvement in the imaging performance and small-sizing, it is not possible to achieve an effect appropriate for the increase in the number of lenses.

In the zoom lens of the present embodiment, it is preferable that the third lens unit include one predetermined cemented lens, and the predetermined cemented lens consist of in order from the object side, a positive lens, a negative lens and a positive lens.

By cementing the positive lens and the negative lens, it is possible to reduce an amount of the chromatic aberration that occurs and Petzval sum. Moreover, since the cemented lens is cemented on the image side of the negative lens, each surface of the negative lens does not make a contact with air. Consequently, the correction of the spherical aberration at the wide angle end is avoided from becoming excessive.

In a case in which the third lens unit includes not less than two lenses, the thickness of the third lens unit becomes thick. Consequently, the total length of the zoom lens at the telephoto end becomes long.

In the zoom lens of the present embodiment, it is preferable that the predetermined cemented lens include a first lens and a second lens, the first lens is positioned nearest to object, the second lens is adjacent to the first lens, and the following conditional expression (14) be satisfied:

$$0.05 < nd2 - nd1 < 1 \tag{14}$$

where, nd1 denotes a refractive index for a d-line of the first lens, and nd2 denotes a refractive index for the d-line of the second lens.

In a case in which a value exceeds an upper limit value of conditional expression (14), even when a glass material which is most advantageous for aberration correction from among the existing glass materials is used, it is not possible to correct an aberration adequately. Consequently, it is not possible to achieve an optical system which has the desired imaging performance.

In a case in which a value falls below a lower limit value of conditional expression (14), correction of an aberration which occurs in the third lens unit, such as correction of a negative spherical aberration and correction of the coma, becomes difficult. Moreover, an amount of fluctuation in aberration at the time of zooming such as an amount of fluctuation in the spherical aberration and an amount of fluctuation in the coma increases.

In the zoom lens of the present embodiment, it is preferable that the predetermined cemented lens include a second lens and a third lens, the third lens is adjacent to the second lens, and the following conditional expression (15) be satisfied:

$$0.05 < nd2 - nd3 < 1 \tag{15}$$

where, nd2 denotes the refractive index for a d-line of the second lens, and nd3 denotes a refractive index for the d-line of the third lens.

In a case in which a value exceeds an upper limit value of conditional expression (15), even when a glass material which is advantageous for aberration correction from among the existing glass materials is used, it is not possible to correct an aberration adequately. Consequently, it is not possible to achieve an optical system having the desired imaging performance.

In a case in which a value falls below a lower limit value of conditional expression (15), correction of an aberration which occurs in the third lens unit, such as the correction of the negative spherical aberration and the correction of the coma, becomes difficult. Moreover, an amount of fluctuation in aberration at the time of zooming such as an amount of fluctuation in the spherical aberration and an amount of fluctuation in the coma increases.

In the zoom lens of the present embodiment, it is preferable that the cemented lens have in order from the object side, a cemented surface on the object side and a cemented surface on the image side, and the following conditional expression (16) be satisfied:

$$-2 < fw/R3ca < 0 \tag{16}$$

where,

R3ca denotes a paraxial radius of curvature of the cemented surface on the object side, and fw denotes the focal length of the zoom lens at the wide angle end at the time of focusing to an object at infinity.

In a case in which a value exceeds an upper limit value of conditional expression (16), suppressing an occurrence of an aberration in the third lens unit, such as suppressing an occurrence of the spherical aberration and suppressing an occurrence of the coma, becomes difficult. Moreover, an amount of fluctuation in aberration at the time of zooming, such as an amount of fluctuation in the spherical aberration and an amount of fluctuation in the coma, increases.

In a case in which a value falls below a lower limit value of conditional expression (16), a paraxial curvature of a cemented surface becomes excessively large. As a result, an amount of various aberrations which occur at the cemented surface increases.

In the zoom lens of the present embodiment, it is preferable that the cemented lens have in order from the object side, a cemented surface on the object side and a cemented surface on the image side, and the following conditional expression (17) be satisfied:

$$0 < fw/R3cb < 1 \tag{17}$$

where,

R3cb denotes a paraxial radius of curvature of the cemented surface on the image side, and fw denotes the focal length of the zoom lens at the wide angle end at the time of focusing to an object at infinity.

In a case in which a value exceeds an upper limit value of conditional expression (17), the paraxial curvature of the cemented surface becomes excessively large. Consequently, amounts of various aberrations which occur at the cemented surface increase.

In a case in which a value falls below a lower limit value of conditional expression (17), suppressing an occurrence of an aberration in the third lens unit, such as suppressing an occurrence of the spherical aberration and suppressing an occurrence of the coma, becomes difficult. Moreover, an amount of fluctuation in aberration at the time of zooming, such as an amount of fluctuation in the spherical aberration and an amount of fluctuation in the coma, increases.

In the zoom lens of the present embodiment, it is preferable that the cemented lens have in order from the object side, a cemented surface on the object side and a cemented surface on the image side, and the following conditional expression (18) be satisfied:

$$-1<(R3ca+R3cb)/(R3ca-R3cb)<0.5 \quad (18)$$

where,

R3ca denotes a paraxial radius of curvature of the cemented surface on the object side, and R3cb denotes a paraxial radius of curvature of the cemented surface on the image side.

In a case in which a value falls below a lower limit value of conditional expression (18), a paraxial curvature of the cemented surface on the object side becomes large. In this case, since the thickness of the cemented lens becomes thick, the thickness of the third lens unit also becomes thick. As the thickness of the third lens unit becomes thick, the moving mechanism for the third lens unit becomes large in size. Consequently, the total length of the zoom lens becomes long, as well as the outer shape of the optical system becomes large.

In a case in which a value exceeds an upper limit value of conditional expression (18), the paraxial curvature of the cemented surface on the image side becomes excessively large. As a result, an amount of the spherical aberration that occurs at the time of zooming increases.

In the zoom lens of the present embodiment, it is preferable that the following conditional expression (19) be satisfied:

$$-100<(R4a+R4b)/(R4a-R4b)<100 \quad (19)$$

where,

R4a denotes a paraxial radius of curvature of a surface nearest to the object of the fourth lens unit, and R4b denotes a paraxial radius of curvature of a surface nearest to the image of the fourth lens unit.

In a case in which a value falls below a lower limit value of conditional expression (19), it becomes difficult to secure an effective diameter, or an amount of fluctuation in aberration increases.

In a case in which a curvature of the surface nearest to the image of the fourth lens unit becomes positive, in the lens having this surface, a peripheral portion comes closer to an image plane than an apex. Consequently, it becomes difficult to secure an effective diameter of the lens having this surface. As a result, it becomes difficult to secure the desired back focus.

In a case in which the curvature of the surface nearest to the object of the fourth lens unit becomes negative, an amount of fluctuation in the spherical aberration and an amount of fluctuation in the coma at the time of zooming increase.

In a case in which a value exceeds an upper limit value of conditional expression (19), an amount of fluctuation in the astigmatism at the time of zooming increases.

In the zoom lens of the present embodiment, it is preferable that a lens nearest to the image in the third lens unit have a positive refractive power, and the fourth lens unit include not less than two lenses.

By the lens nearest to the image of the third lens unit having a positive refractive power, it is possible to suppress the fluctuation in the spherical aberration at the time of zooming.

When the lens nearest to the image is made to be a negative lens without changing the number of negative lenses in the third lens unit, a height of an axial light ray incident on the lens nearest to the image becomes low. Consequently, the spherical aberration which occurs in the third lens unit cannot be suppressed. As a result, the fluctuation in the spherical aberration at the time of zooming is deteriorated.

When a negative lens is added for correcting the spherical aberration, the thickness of the third lens unit becomes thick. Consequently, the total length of the zoom lens becomes long, as well as the outer diameter becomes large. Moreover, the moving mechanism for the third lens unit becomes large in size.

In the fourth lens unit, an off-axis light ray passes through a position distant from an optical axis. Consequently, in the fourth lens unit, it is possible to suppress the astigmatism particularly at the wide angle end. By the fourth lens unit including not less than two lenses, it is possible to suppress the astigmatism at the wide angle end.

In the zoom lens of the present embodiment, it is preferable that the following conditional expression (20) be satisfied:

$$1.1<D12W/D12T<100 \quad (20)$$

where,

D12W denotes a distance between the first lens unit and the second lens unit at the wide angle end at the time of focusing to an object at infinity, and D12T denotes a distance between the first lens unit and the second lens unit at the telephoto end at the time of focusing to an object at infinity.

In a case in which a value exceeds an upper limit value of conditional expression (20), the distance between the first lens unit and the second lens unit at the wide angle end becomes wide. Consequently, the total length of the zoom lens at the wide angle end becomes long.

In a case in which a value falls below a lower limit value of conditional expression (20), for securing a high zoom ratio, the refractive power of the third lens unit has to be made large. However, when the refractive power of the third lens unit is made large, an amount of fluctuation in the spherical aberration and an amount of fluctuation in the coma at the time of zooming, increase.

In the zoom lens of the present embodiment, it is preferable that the first lens unit include a predetermined lens of which a concave surface is directed toward the object side, and there is one lens having a positive refractive power which be disposed on the image side of the predetermined lens.

When such arrangement is made, it is possible to suppress an increase in the thickness of the first lens unit. When not less than two lenses having a positive refractive power are disposed on the image side of the predetermined lens, the thickness of the first lens unit becomes thick. Consequently, the total length of the zoom lens at the telephoto end becomes long.

A lens having a positive refractive power may have been cemented to the predetermined lens. In a case of not cementing the lens having a positive refractive power to the predetermined lens, a difference in aberrations which occur for different wavelengths, increases. When a cemented lens is further added for avoiding the increase in the difference, the thickness of the first lens unit becomes even thicker.

In the zoom lens of the present embodiment, it is preferable that the following conditional expression (21) be satisfied:

$$1.1 < \beta 2t < 100 \tag{21}$$

where, $\beta 2t$ denotes the lateral magnification of the second lens unit at the telephoto end at the time of focusing to the object at infinity.

In a case in which a value falls below a lower limit value of conditional expression (21), the refractive power of the second lens unit becomes small. In this case, for securing a high zoom ratio, it is necessary to make the refractive power of the third lens unit large. However, when the refractive power of the third lens unit is made large, the fluctuation in the spherical aberration and the fluctuation in the coma at the time of zooming, increase.

In a case in which a value exceeds an upper limit value of conditional expression (21), the refractive power of the second lens unit becomes excessively large. Consequently, the spherical aberration and the coma at the telephoto end increase.

In the zoom lens of the present embodiment, it is preferable that the following conditional expression (22) be satisfied:

$$0.1 < (\beta 2w/(\beta 2t))/z < 1.7 \tag{22}$$

where, $\beta 2w$ denotes the lateral magnification of the second lens unit at the wide angle end at the time of focusing to the object at infinity, $\beta 2t$ denotes the lateral magnification of the second lens unit at the telephoto end at the time of focusing to the object at infinity, and z denotes a zoom ratio.

In a case in which a value exceeds an upper limit value of conditional expression (22), a zooming effect in the second lens unit becomes small. In other words, a change in the magnification of the second lens unit at the time of zooming substantially cancels the zooming effect by other lens unit. In this case, it is necessary to enhance the zooming effect in the other lens unit. However, when the zooming effect in the other lens unit is enhanced, an amount of fluctuation in various aberrations at the time of zooming increases.

In a case in which a value falls below a lower limit value of conditional expression (22), the refractive power of the second lens unit becomes small. In this case, for securing a high zoom ratio, it is necessary to make the refractive power of the third lens unit large. However, when the refractive power of the third lens unit is made large, the fluctuation in the spherical aberration and the fluctuation in the coma at the time of zooming, increase.

In the zoom lens of the present embodiment, it is preferable that the first lens unit include not less than three negative lenses.

When the number of negative lenses in the first lens unit is not more than two, the fluctuation in various aberrations at the time of zooming cannot be suppressed. Particularly, the fluctuation at the time of zooming, such as the fluctuation in distortion and the fluctuation in the astigmatism are deteriorated.

In the zoom lens of the present embodiment, it is preferable that the following conditional expression (23) be satisfied:

$$1 < Skw/fw < 3 \tag{23}$$

where,

Skw denotes a back focus of the zoom lens at the wide angle end, and fw denotes the focal length of the zoom lens at the wide angle end at the time of focusing to the object at infinity.

In a case in which a value falls below a lower limit value of conditional expression (23), a lens nearest to the image of the zoom lens comes closer to an image plane. In this case, at the wide angle end, a height of an off-axis light ray passing through the lens nearest to the image increases. Consequently, the astigmatism and the distortion at the wide angle end are deteriorated.

In a case in which a value exceeds an upper limit value of conditional expression (23), it is not possible to secure an adequate back focus unless the refractive power of each lens unit is made large. However, when the refractive power of each lens unit is made large, there is an increase in various aberrations. Particularly, the spherical aberration and the coma at the telephoto end are deteriorated.

An image pickup apparatus of the present invention includes an optical system, and an image pickup element which has an image pickup surface, and which converts an image formed on the image pickup surface by the optical system to an electric signal, and the optical system is the zoom lens of the abovementioned embodiment.

According to the image pickup apparatus of the present embodiment, it is possible to achieve a high-quality image over a wide capturing range.

Moreover, it is preferable to satisfy simultaneously a plurality of abovementioned arrangements mutually. Moreover, an arrangement may be made such that some of the arrangements are satisfied simultaneously. For instance, an arrangement may be made such that a zoom lens other than the abovementioned zoom lens is used as one of the abovementioned wide angle lenses or is used in the image pickup apparatus.

Regarding conditional expressions, each conditional expression may be let to be satisfied separately. When such an arrangement is made, it is favorable as it is easy to achieve an effect of each conditional expression.

Regarding conditional expressions, each conditional expression may be let to be satisfied separately. When such an arrangement is made, it is favorable as it is easy to achieve an effect of each conditional expression.

For conditional expression (1), it is more preferable that the lower limit value be 2.5 or 3, and it is more preferable that the upper limit value be 30 or 7.

For conditional expression (2), it is more preferable that the lower limit value be 2.5 or 3, and it is more preferable that the upper limit value be 70 or 10.

For conditional expression (3), it is more preferable that the lower limit value be −10 or −4, and it is more preferable that the upper limit value be 1 or 0.7.

For conditional expression (4), it is more preferable that the lower limit value be 1.1 or 1.2, and it is more preferable that the upper limit value be 2 or 1.6.

For conditional expression (5), it is more preferable that the lower limit value be 0.7 or 0.75, and it is more preferable that the upper limit value be 1.5 or 1.1.

For conditional expression (6), it is more preferable that the lower limit value be 0.7 or 0.8, and it is more preferable that the upper limit value be 2 or 1.8.

For conditional expression (7), it is more preferable that the lower limit value be 0.4 or 0.7, and it is more preferable that the upper limit value be 1.4 or 1.1.

For conditional expression (8), it is more preferable that the lower limit value be −1.4 or −0.8, and it is more preferable that the upper limit value be −0.1 or −0.2.

For conditional expression (9), it is more preferable that the lower limit value be −10 or −3, and it is more preferable that the upper limit value be 0 or −1.

For conditional expression (10), it is more preferable that the lower limit value be −0.75 or −0.7, and it is more preferable that the upper limit value be −0.55 or −0.63.

For conditional expression (11), it is more preferable that the lower limit value be −2.8 or −2.6, and it is more preferable that the upper limit value be −1.6 or −1.7.

For conditional expression (12), it is more preferable that the lower limit value be −0.3 or −0.2, and it is more preferable that the upper limit value be −0.05 or −0.1.

For conditional expression (13), it is more preferable that the lower limit value be 3.5 or 4, and it is more preferable that the upper limit value be 10 or 8.5.

For conditional expression (14), it is more preferable that the lower limit value be 0.15 or 0.25, and it is more preferable that the upper limit value be 0.4 or 0.35.

For conditional expression (15), it is more preferable that the lower limit value be 0.15 or 0.25, and it is more preferable that the upper limit value be 0.4 or 0.35.

For conditional expression (16), it is more preferable that the lower limit value be −1.5 or −1.3, and it is more preferable that the upper limit value be −0.05 or −0.1.

For conditional expression (17), it is more preferable that the lower limit value be 0.05 or 0.1, and it is more preferable that the upper limit value be 0.9 or 0.7.

For conditional expression (18), it is more preferable that the lower limit value be −0.8 or −0.6, and it is more preferable that the upper limit value be 0 or −0.05.

For conditional expression (19), it is more preferable that the lower limit value be −50 or −10, and it is more preferable that the upper limit value be 10 or 5.

For conditional expression (20), it is more preferable that the lower limit value be 7 or 11, and it is more preferable that the upper limit value be 15 or 13.

For conditional expression (21), it is more preferable that the lower limit value be 1.3 or 1.5, and it is more preferable that the upper limit value be 10 or 1.8.

For conditional expression (22), it is more preferable that the lower limit value be 0.3 or 0.4, and it is more preferable that the upper limit value be 1.3 or 1.

For conditional expression (23), it is more preferable that the lower limit value be 1.4 or 1.8, and it is more preferable that the upper limit value be 2.5 or 2.1.

Examples of zoom lenses will be described below in detail by referring to the accompanying diagrams. However, the present invention is not restricted to the examples described below.

FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13 show lens cross-sectional views at a wide angle end.

Aberrations of each example will be described.

FIG. 14A, FIG. 15A, FIG. 16A, FIG. 17A, FIG. 18A, FIG. 19A, FIG. 20A, FIG. 21A, FIG. 22A, FIG. 23A, FIG. 24A, FIG. 25A, and FIG. 26A show a spherical aberration (SA) at the wide angle end.

FIG. 14B, FIG. 15B, FIG. 16B, FIG. 17B, FIG. 18B, g. 19B, FIG. 20B, FIG. 21B, FIG. 22B, FIG. 23B, FIG. 24B, FIG. 25B, and FIG. 26B show an astigmatism (AS) at the wide angle end.

FIG. 14C, FIG. 15C, FIG. 16C, FIG. 17C, FIG. 18C, FIG. 19C, FIG. 20C, FIG. 21C, FIG. 22C, FIG. 23C, FIG. 24C, FIG. 25C, and FIG. 26C show a distortion (DT) at the wide angle end.

FIG. 14D, FIG. 15D, FIG. 16D, FIG. 17D, FIG. 18D, FIG. 19D, FIG. 20D, FIG. 21D, FIG. 22D, FIG. 23D, FIG. 24D, FIG. 25D, and FIG. 26D show a chromatic aberration of magnification (CC) at the wide angle end.

FIG. 14E, FIG. 15E, FIG. 16E, FIG. 17E, FIG. 18E, FIG. 19E, FIG. 20E, FIG. 21E, FIG. 22E, FIG. 23E, FIG. 24E, FIG. 25E, and FIG. 26E show a spherical aberration (SA) in an intermediate focal length state.

FIG. 14F, FIG. 15F, FIG. 16F, FIG. 17F, FIG. 18F, FIG. 19F, FIG. 20F, FIG. 21F, FIG. 22F, FIG. 23F, FIG. 24F, FIG. 25F, and FIG. 26F show an astigmatism (AS) in the intermediate focal length state.

FIG. 14G, FIG. 15G, FIG. 16G, FIG. 17G, FIG. 18G, FIG. 19G, FIG. 20G, FIG. 21G, FIG. 22G, FIG. 23G, FIG. 24G, FIG. 25G, and FIG. 26G show a distortion (DT) in the intermediate focal length state.

FIG. 14H, FIG. 15H, FIG. 16H, FIG. 17H, FIG. 18H, FIG. 19H, FIG. 20H, FIG. 21H, FIG. 22H, FIG. 23H, FIG. 24H, FIG. 25H, and FIG. 26H show a chromatic aberration of magnification (CC) in the intermediate focal length state.

FIG. 14I, FIG. 15I, FIG. 16I, FIG. 17I, FIG. 18I, FIG. 19I, FIG. 20I, FIG. 21I, FIG. 22I, FIG. 23I, FIG. 24I, FIG. 25I, and FIG. 26I show a spherical aberration (SA) at the telephoto end.

FIG. 14J, FIG. 15J, FIG. 16J, FIG. 17J, FIG. 18J, FIG. 19J, FIG. 20J, FIG. 21J, FIG. 22J, FIG. 23J, FIG. 24J, FIG. 25J, and FIG. 26J show an astigmatism (AS) at the telephoto end.

FIG. 14K, FIG. 15K, FIG. 16K, FIG. 17K, FIG. 18K, FIG. 19K, FIG. 20K, FIG. 21K, FIG. 22K, FIG. 23K, FIG. 24K, FIG. 25K, and FIG. 26K show a distortion (DT) at the telephoto end.

FIG. 14L, FIG. 15L, FIG. 16L, FIG. 17L, FIG. 18L, FIG. 19L, FIG. 20L, FIG. 21L, FIG. 22L, FIG. 23L, FIG. 24L, FIG. 25L, and FIG. 26L show a chromatic aberration of magnification (CC) at the telephoto end.

The lens cross-sectional views are lens cross-sectional views at the time of focusing to an object at infinity. The aberration diagrams are aberration diagrams at the time of focusing to an object at infinity.

A first lens unit is denoted by G1, a second lens unit is denoted by G2, a third lens unit is denoted by G3, a fourth lens unit is denoted by G4, an aperture stop is denoted by S, and an image plane (image pickup surface) is denoted by I.

A zoom lens of an example 1 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side. Here, the biconcave negative lens L3 and the positive meniscus lens L4 are cemented.

The second lens unit G2 includes a positive meniscus lens L5 having a convex surface directed toward the object side.

The third lens unit G3 includes a biconvex positive lens L6, a biconvex positive lens L7, a biconcave negative lens L8, a biconvex positive lens L9, a biconcave negative lens L10, and a biconvex positive lens L11. Here, the biconvex positive lens L7 and the biconcave negative lens L8 are cemented. The biconvex positive lens L9, the biconcave negative lens L10, and the biconvex positive lens L11 are cemented.

The fourth lens unit G4 includes a biconvex positive lens L12 and a negative meniscus lens L13 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of seven surfaces which are, both surfaces of the negative meniscus lens L2, both surfaces of the positive meniscus lens L5, an object-side surface of the biconvex positive lens L9, and both surfaces of the biconvex positive lens L12.

A zoom lens of an example 2 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a biconvex positive lens L4. Here, the biconcave negative lens L3 and the biconvex positive lens L4 are cemented.

The second lens unit G2 includes a positive meniscus lens L5 having a convex surface directed toward the object side.

The third lens unit G3 includes a biconvex positive lens L6, a positive meniscus lens L7 having a convex surface directed toward the object side, a negative meniscus lens L8 having a convex surface directed toward the object side, a biconvex positive lens L9, a biconcave negative lens L10, and a biconvex positive lens L11. Here, the positive meniscus lens L7 and the negative meniscus lens L8 are cemented. The biconvex positive lens L9, the biconcave negative lens L10, and the biconvex positive lens L11 are cemented.

The fourth lens unit G4 includes a biconvex positive lens L12 and a negative meniscus lens L13 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L5, both surfaces of the biconvex positive lens L6, and both surfaces of the biconvex positive lens L12.

A zoom lens of an example 3 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, a biconcave negative lens L4, and a biconvex positive lens L5. Here, the biconcave negative lens L4 and the biconvex positive lens L5 are cemented.

The second lens unit G2 includes a positive meniscus lens L6 having a convex surface directed toward the object side.

The third lens unit G3 includes a biconvex positive lens L7, a positive meniscus lens L8 having a convex surface directed toward the object side, a negative meniscus lens L9 having a convex surface directed toward the object side, a biconvex positive lens L10, a biconcave negative lens L11, and a biconvex positive lens L12. Here, the positive meniscus lens L8 and the negative meniscus lens L9 are cemented. The biconvex positive lens L10, the biconcave negative lens L11, and the biconvex positive lens L12 are cemented.

The fourth lens unit G4 includes a biconvex positive lens L13 and a negative meniscus lens L14 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L6, both surfaces of the biconvex positive lens L7, and both surfaces of the biconvex positive lens L13.

A zoom lens of an example 4 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side. Here, the biconcave negative lens L3 and the positive meniscus lens L4 are cemented.

The second lens unit G2 includes a biconvex positive lens L5, a negative meniscus lens L6 having a convex surface directed toward an image side, and a negative meniscus lens L7 having a convex surface directed toward the image side. Here, the biconvex positive lens L5, the negative meniscus lens L6, and the negative meniscus lens L7 are cemented.

The third lens unit G3 includes a positive meniscus lens L8 having a convex surface directed toward the object side, a biconvex positive lens L9, a biconcave negative lens L10, a positive meniscus lens L11 having a convex surface directed toward the object side, and a biconvex positive lens L12. Here, the biconcave negative lens L10 and the positive meniscus lens L11 are cemented.

The fourth lens unit G4 includes a biconvex positive lens L13 and a biconcave negative lens L14.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of six surfaces which are, both surfaces of the negative meniscus lens L2, both surface of the positive meniscus lens L8, and both surfaces of the biconvex positive lens L13.

A zoom lens of an example 5 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, a biconvex positive lens L4, and a biconcave negative lens L5. Here, the biconcave negative lens L3 and the biconvex positive lens L4 are cemented.

The second lens unit G2 includes a biconvex positive lens L6.

The third lens unit G3 includes a biconvex positive lens L7, a positive meniscus lens L8 having a convex surface directed toward the object side, a negative meniscus lens L9 having a convex surface directed toward the object side, a biconvex positive lens L10, a biconcave negative lens L11, and a biconvex positive lens L12. Here, the positive meniscus lens L8 and the negative meniscus lens L9 are cemented. The biconvex positive lens L10, the biconcave negative lens L11, and the biconvex positive lens L12 are cemented.

The fourth lens unit G4 includes a biconvex positive lens L13 and a negative meniscus lens L14 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the biconvex positive lens L6, both surfaces of the biconvex positive lens L7, and both surfaces of the biconvex positive lens L13.

A zoom lens of an example 6 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, a biconvex positive lens L4, and a biconcave negative lens L5. Here, the biconcave negative lens L3 and the biconvex positive lens L4 are cemented.

The second lens unit G2 includes a positive meniscus lens L6 having a convex surface directed toward the object side.

The third lens unit G3 includes a biconvex positive lens L7, a biconvex positive lens L8, a biconcave negative lens L9, a biconvex positive lens L10, a biconcave negative lens L11, and a biconvex positive lens L12. Here, the biconvex positive lens L8 and the biconcave negative lens L9 are cemented. The biconvex positive lens L10, the biconcave negative lens L11, and the biconvex positive lens L12 are cemented.

The fourth lens unit G4 includes a biconvex positive lens L13 and a biconcave negative lens L14.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L6, both surfaces of the biconvex positive lens L7, and both surfaces of the biconvex positive lens L13.

A zoom lens of an example 7 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward the object side, and a biconcave negative lens L4, and a biconvex positive lens L5. Here, the negative meniscus lens L1 and the negative meniscus lens L2 are cemented. The biconcave negative lens L4 and the biconvex positive lens L5 are cemented.

The second lens unit G2 includes a positive meniscus lens L6 having a convex surface directed toward the object side.

The third lens unit G3 includes a biconvex positive lens L7, a biconvex positive lens L8, a biconcave negative lens L9, a biconvex positive lens L10, a biconcave negative lens L11, and a biconvex positive lens L12. Here, the biconvex positive lens L8 and the biconcave negative lens L9 are cemented. The biconvex positive lens L10, the biconcave negative lens L11, and the biconvex positive lens L12 are cemented.

The fourth lens unit G4 includes a biconvex positive lens L13 and a biconcave negative lens L14.

At the time of zooming from a wide angle end to a telephoto end, the first lens unit G1, after moving toward an image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L3, both surfaces of the positive meniscus lens L6, both surfaces of the biconvex positive lens L7, and both surfaces of the biconvex positive lens L13.

A zoom lens of an example 8 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a biconvex positive lens L4. Here, the biconcave negative lens L3 and the biconvex positive lens L4 are cemented.

The second lens unit G2 includes a biconvex positive lens L5, a negative meniscus lens L6 having a convex surface directed toward an image side, and a positive meniscus lens L7 having a convex surface directed toward the image side. Here, the biconvex positive lens L5, the negative meniscus lens L6, and the positive meniscus lens L7 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, and a biconvex positive lens L12. Here, the negative meniscus lens L10 and the positive meniscus lens L11 are cemented.

The fourth lens unit G4 includes a biconvex positive lens L13 and a biconcave negative lens L14.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of six surfaces which are, both surfaces of the negative meniscus lens L2, both surfaces of the biconvex positive lens L8, and both surfaces of the biconvex positive lens L13.

A zoom lens of an example 9 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a biconvex positive lens L4. Here, the biconcave negative lens L3 and the biconvex positive lens L4 are cemented.

The second lens unit G2 includes a positive meniscus lens L5 having a convex surface directed toward the object side.

The third lens unit G3 includes a biconvex positive lens L6, a biconvex positive lens L7, a biconcave negative lens L8, a biconvex positive lens L9, and a negative meniscus lens L10 having a convex surface directed toward the object side. Here, the biconvex positive lens L7, the biconcave negative lens L8, and the biconvex positive lens L9 are cemented.

The fourth lens unit G4 includes a biconvex positive lens L11 and a negative meniscus lens L12 having a convex surface directed toward an image side.

At the time of zooming from a wide angle end to a telephoto end, the first lens unit G1, after moving toward an image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L5, both surfaces of the biconvex positive lens L6, and both surfaces of the biconvex positive lens L11.

A zoom lens of an example 10 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a biconvex positive lens L4. Here, the biconcave negative lens L3 and the biconvex positive lens L4 are cemented.

The second lens unit G2 includes a positive meniscus lens L5 having a convex surface directed toward the object side.

The third lens unit G3 includes a biconvex positive lens L6, a positive meniscus lens L7 having a convex surface directed toward the object side, a negative meniscus lens L8 having a convex surface directed toward the object side, a biconvex positive lens L9, a biconcave negative lens L10, and a biconvex positive lens L11. Here, the positive meniscus lens L7 and the negative meniscus lens L8 are cemented. The biconvex positive lens L9, the biconcave negative lens L10, and the biconvex positive lens L11 are cemented.

The fourth lens unit G4 includes a biconvex positive lens L12 and a negative meniscus lens L13 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L5, both surfaces of the biconvex positive lens L6, and both surfaces of the biconvex positive lens L12.

A zoom lens of an example 11 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a biconvex positive lens L4. Here, the biconcave negative lens L3 and the biconvex positive lens L4 are cemented.

The second lens unit G2 includes a positive meniscus lens L5 having a convex surface directed toward the object side.

The third lens unit G3 includes a biconvex positive lens L6, a positive meniscus lens L7 having a convex surface directed toward the object side, a negative meniscus lens L8 having a convex surface directed toward the object side, a biconvex positive lens L9, a biconcave negative lens L10, and a biconvex positive lens L11. Here, the positive meniscus lens L7 and the negative meniscus lens L8 are cemented. The biconvex positive lens L9, the biconcave negative lens L10, and the biconvex positive lens L11 are cemented.

The fourth lens unit G4 includes a biconvex positive lens L12 and a negative meniscus lens L13 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L5, both surface of the biconvex positive lens L6, and both surfaces of the biconvex positive lens L12.

A zoom lens of an example 12 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a negative meniscus lens L3 having a convex surface directed toward an image side, and a positive meniscus lens L4 having a convex surface directed toward the image side. Here, the negative meniscus lens L3 and the positive meniscus lens L4 are cemented.

The second lens unit G2 includes a positive meniscus lens L5 having a convex surface directed toward the object side.

The third lens unit G3 includes a biconvex positive lens L6, a positive meniscus lens L7 having a convex surface directed toward the object side, a negative meniscus lens L8 having a convex surface directed toward the object side, a biconvex positive lens L9, a biconcave negative lens L10, and a biconvex positive lens L11. Here, the positive meniscus lens L7 and the negative meniscus lens L8 are cemented. The biconvex positive lens L9, the biconcave negative lens L10, and the biconvex positive lens L11 are cemented.

The fourth lens unit G4 includes a biconvex positive lens L12 and a negative meniscus lens L13 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of eight surfaces which are, both surfaces of the negative meniscus lens L2, both surfaces of the positive meniscus lens L5, both surfaces of the biconvex positive lens L6, and both surfaces of the biconvex positive lens L12.

A zoom lens of an example 13 includes in order from an object side, a first lens unit G1 having a negative refractive power, a second lens unit G2 having a positive refractive power, a third lens unit G3 having a positive refractive power, and a fourth lens unit G4 having a positive refractive power. An aperture stop S is disposed between the second lens unit G2 and the third lens unit G3.

The first lens unit G1 includes a negative meniscus lens L1 having a convex surface directed toward the object side, a negative meniscus lens L2 having a convex surface directed toward the object side, a biconcave negative lens L3, and a positive meniscus lens L4 having a convex surface directed toward the object side. Here, the biconcave negative lens L3 and the positive meniscus lens L4 are cemented.

The second lens unit G2 includes a positive meniscus lens L5 having a convex surface directed toward the object side.

The third lens unit G3 includes a biconvex positive lens L6, a positive meniscus lens L7 having a convex surface directed toward the object side, a negative meniscus lens L8 having a convex surface directed toward the object side, a biconvex positive lens L9, a biconcave negative lens L10, a biconvex positive lens L11, and a biconcave negative lens L12. Here, the positive meniscus lens L7 and the negative meniscus lens L8 are cemented. The biconvex positive lens L9, the biconcave negative lens L10, and the biconvex positive lens L11 are cemented.

The fourth lens unit G4 includes a biconvex positive lens L13 and a negative meniscus lens L14 having a convex surface directed toward an image side.

At the time of zooming from a wide angle end to a telephoto end, the first lens unit G1, after moving toward the image side, moves toward the object side. Both the second lens unit G2 and the third lens unit G3 move toward the object side. The fourth lens unit G4 is fixed.

At the time of focusing from an object at infinity to an object at a close distance, the second lens unit G2 moves toward the image side.

An aspheric surface is provided to a total of six surfaces which are, both surfaces of the negative meniscus lens L2, both surfaces of the positive meniscus lens L5, and both surfaces of the biconvex positive lens L6.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspherical surface.

In Zoom data, WE denotes a wide angle end, ST denotes a intermediate focal length state, TE denotes a telephoto end. Moreover, f denotes a focal length of the entire system, FNO. denotes an F number, ω denotes a half angle of view, IH denotes an image height, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus.

Further, in Unit focal length, each of f1, f2 . . . is a focal length of each lens unit.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}_{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 133.324 | 2.40 | 1.77250 | 49.60 |
| 2 | 21.500 | 2.00 | | |
| 3* | 21.782 | 2.50 | 1.74320 | 49.34 |
| 4* | 10.845 | 13.11 | | |
| 5 | −168.644 | 1.80 | 1.43700 | 95.10 |
| 6 | 22.385 | 5.92 | 1.90043 | 37.37 |
| 7 | 58.041 | Variable | | |
| 8* | 32.390 | 3.70 | 1.49700 | 81.54 |
| 9* | 190.525 | Variable | | |
| 10(Stop) | | 1.30 | | |
| 11 | 16.640 | 4.28 | 1.55032 | 75.50 |
| 12 | −178.311 | 0.94 | | |
| 13 | 21.892 | 3.66 | 1.43700 | 95.10 |
| 14 | −38.206 | 1.00 | 1.75500 | 52.32 |
| 15 | 20.718 | 1.50 | | |
| 16* | 39.654 | 3.75 | 1.49700 | 81.61 |
| 17 | −14.487 | 0.90 | 1.81600 | 46.62 |
| 18 | 18.375 | 3.50 | 1.53172 | 48.84 |
| 19 | −16.268 | Variable | | |
| 20* | 83.001 | 5.22 | 1.49710 | 81.56 |
| 21* | −24.439 | 1.00 | | |
| 22 | −24.608 | 0.80 | 2.00100 | 29.13 |
| 23 | −38.147 | 15.98 | | |
| Image plane | ∞ | | | |

Aspherical surface data

3rd surface k = 0.000
A4 = 2.60952e−05, A6 = −5.33431e−08, A8 = −9.21870e−11
4th surface k = −0.721
A4 = 1.53147e−05, A6 = 8.82411e−08, A8 = −1.45622e−09,
A10 = 1.91847e−12
8th surface k = 0.000
A4 = 1.95550e−06, A6 = 2.23755e−07
9th surface k = 0.000
A4 = 1.17203e−05, A6 = 2.46583e−07
16th surface k = 0.000
A4 = −5.12474e−05, A6 = −3.39368e−08, A8 = −5.78608e−11
20th surface k = 0.000
A4 = 1.65430e−05, A6 = −7.13193e−08
21st surface k = 0.000
A4 = 3.54655e−05, A6 = −1.23803e−07

Zoom data
Zoom ratio 3.00

| | WE | ST | TE |
|---|---|---|---|
| f | 8.16 | 14.14 | 24.50 |
| FNO. | 4.08 | 4.08 | 4.08 |
| 2ω | 114.57 | 76.20 | 47.62 |
| IH | 11.15 | 11.15 | 11.15 |
| BF(in air) | 15.98 | 15.98 | 15.97 |
| LTL(in air) | 129.00 | 115.04 | 119.57 |
| d7 | 26.79 | 9.05 | 2.00 |
| d9 | 25.95 | 15.60 | 5.80 |
| d19 | 1.00 | 15.12 | 36.51 |

Unit focal length

| f1 = −16.27 | f2 = 77.91 | f3 = 38.20 | f4 = 81.45 |
|---|---|---|---|

Example 2

| Unit mm | | | | |
|---|---|---|---|---|
| Surface data | | | | |
| Surface no. | r | d | nd | vd |
| Object plane | ∞ | ∞ | | |
| 1 | 96.531 | 2.40 | 1.77250 | 49.60 |
| 2 | 16.780 | 1.91 | | |
| 3* | 16.914 | 2.50 | 1.74320 | 49.34 |
| 4* | 10.682 | 13.53 | | |
| 5 | −27.892 | 1.80 | 1.43700 | 95.10 |
| 6 | 44.851 | 5.42 | 1.90043 | 37.37 |
| 7 | −173.134 | Variable | | |
| 8* | 39.925 | 2.93 | 1.55332 | 71.68 |
| 9* | 186.546 | Variable | | |
| 10(Stop) | ∞ | 1.30 | | |
| 11* | 18.195 | 6.59 | 1.49700 | 81.54 |
| 12* | −59.178 | 2.63 | | |
| 13 | 18.193 | 2.17 | 1.43700 | 95.10 |
| 14 | 163.829 | 1.00 | 1.81600 | 46.62 |
| 15 | 17.343 | 1.34 | | |
| 16 | 56.940 | 5.25 | 1.49700 | 81.61 |
| 17 | −11.704 | 0.90 | 1.81600 | 46.62 |
| 18 | 25.447 | 2.92 | 1.54072 | 47.23 |
| 19 | −15.475 | Variable | | |
| 20* | 56.451 | 4.80 | 1.49710 | 81.56 |
| 21* | −34.288 | 1.00 | | |
| 22 | −39.292 | 1.50 | 2.00100 | 29.13 |
| 23 | −73.259 | 15.57 | | |
| Image plane | ∞ | | | |

Aspherical surface data

3rd surface k = 0.000
A4 = 1.25658e−05, A6 = −2.18345e−07, A8 = 4.95599e−10,
A10 = −7.55349e−13
4th surface k = −0.807
A4 = −1.11768e−06, A6 = −2.32798e−07, A8 = 1.96365e−14,
A10 = 1.86656e−12
8th surface k = 0.000
A4 = −7.63903e−06, A6 = 8.93104e−08, A8 = 2.07003e−12
9th surface k = 0.000
A4 = −1.45480e−07, A6 = 9.23580e−08, A8 = −5.38169e−14
11th surface k = 0.000
A4 = −3.53872e−06, A6 = 2.85781e−08, A8 = −9.97145e−11

-continued

| Unit mm | | | |
|---|---|---|---|
| 12th surface | | | | k = 0.000
A4 = 2.30938e−05, A6 = −8.86219e−09, A8 = −1.56344e−10
20th surface k = 0.000
A4 = 2.45361e−05, A6 = 9.02847e−09, A8 = 7.61620e−12
21st surface k = 0.000
A4 = 5.41154e−05, A6 = −4.72043e−08, A8 = −1.01267e−11

Zoom data
Zoom ratio 3.02

| | WE | ST | TE |
|---|---|---|---|
| f | 8.16 | 14.18 | 24.64 |
| FNO. | 4.08 | 4.08 | 4.08 |
| 2ω | 115.08 | 76.30 | 46.73 |
| IH | 11.15 | 11.15 | 11.15 |
| BF(in air) | 15.57 | 15.57 | 15.57 |
| LTL(in air) | 127.26 | 113.92 | 120.70 |
| d7 | 25.19 | 7.89 | 0.30 |
| d9 | 23.60 | 13.60 | 5.62 |
| d19 | 1.00 | 14.97 | 37.32 |

Unit focal length

| f1 = −16.35 | f2 = 91.15 | f3 = 37.56 | f4 = 85.47 |
|---|---|---|---|

Example 3

Unit mm
Surface data

| Surface no. | r | d | nd | vd |
|---|---|---|---|---|
| Object plane | ∞ | ∞ | | |
| 1 | 72.184 | 2.00 | 1.81600 | 46.62 |
| 2 | 24.522 | 2.21 | | |
| 3* | 26.943 | 2.06 | 1.69680 | 55.46 |
| 4* | 14.294 | 10.84 | | |
| 5 | 98.157 | 2.06 | 1.43700 | 95.10 |
| 6 | 26.568 | 8.58 | | |
| 7 | −28.232 | 0.96 | 1.43700 | 95.10 |
| 8 | 524.943 | 3.97 | 2.00330 | 28.27 |
| 9 | −72.271 | Variable | | |
| 10* | 19.531 | 2.13 | 1.55332 | 71.68 |
| 11* | 26.837 | Variable | | |
| 12(Stop) | ∞ | 1.30 | | |
| 13* | 15.329 | 6.61 | 1.49700 | 81.54 |
| 14* | −97.721 | 3.98 | | |
| 15 | 18.982 | 1.91 | 1.43700 | 95.10 |
| 16 | 256.693 | 1.00 | 1.81600 | 46.62 |
| 17 | 17.092 | 0.96 | | |
| 18 | 39.264 | 4.05 | 1.49700 | 81.61 |
| 19 | −9.544 | 0.90 | 1.81600 | 46.62 |
| 20 | 22.887 | 3.00 | 1.54072 | 47.23 |
| 21 | −14.758 | Variable | | |
| 22* | 34.698 | 4.80 | 1.49710 | 81.56 |
| 23* | −224.249 | 1.87 | | |
| 24 | −28.924 | 1.50 | 2.00100 | 29.13 |
| 25 | −36.179 | 15.60 | | |
| Image plane | ∞ | | | |

-continued

Unit mm
Aspherical surface data

3rd surface k = 0.000
A4 = −4.28180e−06, A6 = −1.90319e−09
4th surface k = −0.913
A4 = −8.67631e−06, A6 = −9.78077e−09
10th surface k = 0.000
A4 = −1.50190e−05, A6 = −2.02268e−08
11th surface k = 0.000
A4 = −4.83256e−06, A6 = 1.48086e−08
13th surface A4 = −9.32952e−06, A6 = 2.52688e−08, A8 = −1.96681e−10
14th surface k = 0.000
A4 = 1.94094e−05, A6 = −1.35639e−08, A8 = −5.15177e−10
22nd surface k = 0.000
A4 = 9.53741e−07, A6 = −8.54316e−09
23rd surface k = 0.000
A4 = −2.35450e−06, A6 = −5.04363e−08

Zoom data
Zoom ratio 3.00

| | WE | ST | TE |
|---|---|---|---|
| f | 8.16 | 14.14 | 24.51 |
| FNO. | 4.08 | 4.08 | 4.08 |
| 2ω | 115.62 | 79.28 | 49.91 |
| IH | 11.15 | 11.15 | 11.15 |
| BF(in air) | 15.60 | 15.60 | 15.60 |
| LTL(in air) | 134.41 | 121.83 | 129.15 |
| d9 | 25.82 | 9.46 | 2.74 |
| d11 | 25.29 | 14.84 | 5.89 |
| d21 | 1.00 | 15.23 | 38.22 |

Unit focal length

| f1 = −16.25 | f2 = 117.44 | f3 = 36.92 | f4 = 96.57 |
|---|---|---|---|

Example 4

Unit mm
Surface data

| Surface no. | r | d | nd | vd |
|---|---|---|---|---|
| Object plane | ∞ | ∞ | | |
| 1 | 141.440 | 2.40 | 1.62041 | 60.29 |
| 2 | 19.413 | 4.75 | | |
| 3* | 23.802 | 2.50 | 1.74320 | 49.34 |
| 4* | 11.339 | 10.59 | | |
| 5 | −42.096 | 1.80 | 1.43700 | 95.10 |
| 6 | 32.639 | 3.50 | 1.90043 | 37.37 |
| 7 | 553.332 | Variable | | |
| 8 | 40.290 | 5.20 | 1.51742 | 52.43 |
| 9 | −24.934 | 0.79 | 1.88300 | 40.76 |
| 10 | −53.561 | 2.48 | 1.67270 | 32.10 |
| 11 | −66.276 | Variable | | |

-continued

Unit mm

| | | | | |
|---|---|---|---|---|
| 12(Stop) | ∞ | 1.30 | | |
| 13* | 15.943 | 6.42 | 1.49700 | 81.54 |
| 14* | 74.951 | 1.34 | | |
| 15 | 63.454 | 4.46 | 1.43875 | 94.66 |
| 16 | −35.059 | 2.10 | | |
| 17 | −133.251 | 0.90 | 1.80610 | 40.92 |
| 18 | 12.685 | 3.51 | 1.49700 | 81.61 |
| 19 | 39.061 | 0.37 | | |
| 20 | 74.973 | 1.89 | 1.54072 | 47.23 |
| 21* | −34.464 | Variable | | |
| 22* | 127.093 | 4.80 | 1.49710 | 81.56 |
| 23* | −24.428 | 1.00 | | |
| 24 | −221.454 | 1.50 | 2.00100 | 29.13 |
| 25 | 132.974 | 15.18 | | |
| Image plane | ∞ | | | |

Aspherical surface data

3rd surface k = 0.000
A4 = −2.13045e−05, A6 = 1.44917e−09, A8 = −4.08669e−11
4th surface k = −0.807
A4 = −3.51603e−05, A6 = −8.26694e−08, A8 = −1.63473e−12
13th surface k = 0.000
A4 = 1.56311e−06, A6 = 5.54635e−08, A8 = −2.04426e−13
14th surface k = 0.000
A4 = 5.55568e−05, A6 = 1.28892e−07, A8 = 3.47776e−10
22tnd surface k = 0.000
A4 = −2.50000e−05, A6 = 4.77304e−09
23rd surface k = 0.000
A4 = 1.12361e−05, A6 = −1.38080e−08

Zoom data
Zoom ratio 3.07

| | WE | ST | TE |
|---|---|---|---|
| f | 8.16 | 14.31 | 25.10 |
| FNO. | 4.08 | 4.08 | 4.08 |
| 2ω | 115.51 | 76.88 | 46.43 |
| IH | 11.15 | 11.15 | 11.15 |
| BF(in air) | 15.18 | 15.18 | 15.18 |
| LTL(in air) | 129.65 | 112.79 | 119.52 |
| d7 | 25.70 | 8.88 | 1.00 |
| d11 | 24.17 | 10.63 | 3.16 |
| d21 | 1.00 | 14.50 | 36.59 |

Unit focal length

| f1 = −16.64 | f2 = 81.63 | f3 = 37.71 | f4 = 79.94 |
|---|---|---|---|

Example 5

Unit mm
Surface data

| Surface no. | r | d | nd | vd |
|---|---|---|---|---|
| Object plane | ∞ | ∞ | | |
| 1 | 98.251 | 2.40 | 1.77250 | 49.60 |
| 2 | 19.683 | 1.82 | | |

-continued

Unit mm

| | | | | |
|---|---|---|---|---|
| 3* | 19.397 | 2.03 | 1.74320 | 49.34 |
| 4* | 11.656 | 12.98 | | |
| 5 | −50.990 | 1.80 | 1.43700 | 95.10 |
| 6 | 44.992 | 4.80 | 1.90043 | 37.37 |
| 7 | −66.245 | 1.50 | | |
| 8 | −33.708 | 1.00 | 1.59522 | 67.74 |
| 9 | 155.837 | Variable | | |
| 10* | 34.594 | 2.50 | 1.55332 | 71.68 |
| 11* | −2616.250 | Variable | | |
| 12(Stop) | ∞ | 1.30 | | |
| 13* | 16.181 | 5.73 | 1.49700 | 81.54 |
| 14* | −54.737 | 2.07 | | |
| 15 | 26.845 | 1.45 | 1.43700 | 95.10 |
| 16 | 122.794 | 1.00 | 1.81600 | 46.62 |
| 17 | 15.549 | 0.79 | | |
| 18 | 37.655 | 3.94 | 1.49700 | 81.61 |
| 19 | −11.558 | 0.90 | 1.81600 | 46.62 |
| 20 | 40.500 | 4.41 | 1.54072 | 47.23 |
| 21 | −15.125 | Variable | | |
| 22* | 63.681 | 4.80 | 1.49710 | 81.56 |
| 23* | −32.121 | 1.00 | | |
| 24 | −26.300 | 1.50 | 2.00100 | 29.13 |
| 25 | −41.916 | 15.95 | | |
| Image plane | ∞ | | | |

Aspherical surface data

3rd surface k = 0.000
A4 = 1.15752e−05, A6 = −5.74948e−08, A8 = 6.26669e−11,
A10 = −3.53264e−13
4th surface k = −0.763
A4 = −9.34634e−06, A6 = 3.69675e−08, A8 = −7.49656e−10,
A10 = 1.01367e−12
10th surface k = 0.000
A4 = −7.98686e−06, A6 = 9.90871e−08
11th surface k = 0.000
A4 = −1.45480e−07, A6 = 9.23580e−08
13th surface k = 0.000
A4 = −1.69409e−05, A6 = −1.73022e−08, A8 = −2.80686e−10
14th surface k = 0.000
A4 = 2.09498e−05, A6 = −5.10466e−08, A8 = 6.19485e−12
22nd surface k = 0.000
A4 = 3.73317e−05, A6 = −8.88133e−08
23rd surface k = 0.000
A4 = 6.43976e−05, A6 = −1.82148e−07

Zoom data
Zoom ratio 3.01

| | WE | ST | TE |
|---|---|---|---|
| f | 8.15 | 14.14 | 24.51 |
| FNO. | 4.08 | 4.08 | 4.08 |
| 2ω | 114.14 | 75.27 | 46.86 |
| IH | 11.15 | 11.15 | 11.15 |
| BF(in air) | 15.95 | 15.95 | 15.95 |
| LTL(in air) | 125.81 | 114.67 | 120.05 |
| d9 | 25.83 | 8.69 | 2.00 |

-continued

| Unit mm | | | |
|---|---|---|---|
| d11 | 23.30 | 14.36 | 4.72 |
| d21 | 1.00 | 15.95 | 37.65 |

| Unit focal length | | | |
|---|---|---|---|
| f1 = −14.36 | f2 = 61.73 | f3 = 38.43 | f4 = 103.80 |

Example 6

| Unit mm | | | | |
|---|---|---|---|---|
| Surface data | | | | |
| Surface no. | r | d | nd | vd |
| Object plane | ∞ | ∞ | | |
| 1 | 212.452 | 2.40 | 1.77250 | 49.60 |
| 2 | 22.170 | 0.20 | | |
| 3* | 19.826 | 2.00 | 1.74320 | 49.34 |
| 4* | 11.685 | 13.30 | | |
| 5 | −54.599 | 1.80 | 1.43700 | 95.10 |
| 6 | 50.861 | 4.80 | 1.90043 | 37.37 |
| 7 | −56.165 | 1.50 | | |
| 8 | −33.708 | 1.00 | 1.59522 | 67.74 |
| 9 | 148.314 | Variable | | |
| 10* | 33.363 | 2.50 | 1.55332 | 71.68 |
| 11* | 429.831 | Variable | | |
| 12(Stop) | ∞ | 1.30 | | |
| 13* | 16.836 | 12.15 | 1.49700 | 81.54 |
| 14* | −85.176 | 0.30 | | |
| 15 | 52.642 | 1.70 | 1.43700 | 95.10 |
| 16 | −36.823 | 1.00 | 1.81600 | 46.62 |
| 17 | 18.687 | 0.90 | | |
| 18 | 21.198 | 2.50 | 1.49700 | 81.61 |
| 19 | −19.375 | 0.90 | 1.81600 | 46.62 |
| 20 | 51.220 | 3.53 | 1.54072 | 47.23 |
| 21 | −16.466 | Variable | | |
| 22* | 51.776 | 4.00 | 1.49710 | 81.56 |
| 23* | −38.376 | 0.94 | | |
| 24 | −75.943 | 1.50 | 2.00100 | 29.13 |
| 25 | 44368.709 | 16.51 | | |
| Image plane | ∞ | | | |

Aspherical surface data

3rd surface k = 0.000
A4 = 2.00138e−05, A6 = −1.07333e−07, A8 = 1.35454e−10,
A10 = −3.01279e−13
4th surface k = −0.787
A4 = 1.61586e−06, A6 = −7.85133e−08, A8 = −3.61497e−10,
A10 = 7.87373e−13
10th surface k = 0.000
A4 = −7.50671e−06, A6 = 9.04725e−08
11th surface k = 0.000
A4 = −1.45480e−07, A6 = 9.23580e−08
13th surface k = 0.000
A4 = −2.91531e−06, A6 = 2.76021e−08, A8 = −1.27320e−12
14th surface k = 0.000
A4 = 6.00000e−05, A6 = 1.02479e−07, A8 = 5.41004e−11

-continued

| Unit mm |
|---|

22nd surface k = 0.000
A4 = 1.52290e−06, A6 = 1.82822e−07
23rd surface k = 0.000
A4 = 3.00000e−05, A6 = 1.81443e−07

| Zoom data | | | |
|---|---|---|---|
| Zoom ratio 3.00 | | | |
| | WE | ST | TE |
| f | 8.17 | 14.15 | 24.51 |
| FNO. | 4.08 | 4.08 | 4.08 |
| 2ω | 114.41 | 75.00 | 46.58 |
| IH | 11.15 | 11.15 | 11.15 |
| BF(in air) | 16.51 | 16.51 | 16.51 |
| LTL(in air) | 127.84 | 115.31 | 120.60 |
| d9 | 26.87 | 8.80 | 1.65 |
| d11 | 23.23 | 13.75 | 4.19 |
| d21 | 1.00 | 16.03 | 38.02 |

| Unit focal length | | | |
|---|---|---|---|
| f1 = −15.16 | f2 = 65.22 | f3 = 38.89 | f4 = 103.81 |

Example 7

| Unit mm | | | | |
|---|---|---|---|---|
| Surface data | | | | |
| Surface no. | r | d | nd | vd |
| Object plane | ∞ | ∞ | | |
| 1 | 60.399 | 2.40 | 1.77250 | 49.60 |
| 2 | 19.618 | 0.15 | 1.62992 | 35.00 |
| 3 | 15.962 | 2.92 | | |
| 4* | 16.911 | 2.50 | 1.74320 | 49.34 |
| 5* | 9.274 | 11.80 | | |
| 6 | −22.655 | 1.80 | 1.43700 | 95.10 |
| 7 | 36.531 | 4.65 | 1.90043 | 37.37 |
| 8 | −100.510 | Variable | | |
| 9* | 23.184 | 2.00 | 1.55332 | 71.68 |
| 10* | 40.928 | Variable | | |
| 11(Stop) | ∞ | 1.30 | | |
| 12* | 16.910 | 5.94 | 1.49700 | 81.54 |
| 13* | −45.954 | 1.95 | | |
| 14 | 23.231 | 2.00 | 1.43700 | 95.10 |
| 15 | −133.275 | 1.00 | 1.81600 | 46.62 |
| 16 | 22.755 | 0.50 | | |
| 17 | 31.764 | 4.00 | 1.49700 | 81.61 |
| 18 | −11.945 | 0.90 | 1.81600 | 46.62 |
| 19 | 14.153 | 3.00 | 1.54072 | 47.23 |
| 20 | −18.427 | Variable | | |
| 21* | 49.700 | 4.80 | 1.49710 | 81.56 |
| 22* | −43.151 | 1.00 | | |
| 23 | −114.851 | 1.50 | 2.00100 | 29.13 |
| 24 | 1165.189 | 16.05 | | |
| Image plane | ∞ | | | |

Aspherical surface data

4th surface k = 0.000
A4 = −3.43865e−05, A6 = −3.68079e−08, A8 = 2.55895e−10,
A10 = −8.16170e−13

-continued

| Unit mm | | | | |
|---|---|---|---|---|
| 5th surface | | | | |
| k = −0.797 | | | | |
| A4 = −4.95879e−05, A6 = −4.41855e−08, A8 = −5.29346e−12, | | | | |
| A10 = 1.13819e−12 | | | | |
| 9th surface | | | | |
| k = 0.000 | | | | |
| A4 = 3.69569e−06, A6 = 9.04789e−08 | | | | |
| 10th surface | | | | |
| k = 0.000 | | | | |
| A4 = 2.51498e−05, A6 = 9.23580e−08 | | | | |
| 12th surface | | | | |
| k = 0.000 | | | | |
| A4 = 5.82681e−06, A6 = 3.41682e−08, A8 = −7.95438e−12 | | | | |
| 13th surface | | | | |
| k = 0.000 | | | | |
| A4 = 2.15542e−05, A6 = −1.29386e−08, A8 = −2.24696e−10 | | | | |
| 21st surface | | | | |
| k = 0.000 | | | | |
| A4 = 4.58794e−06, A6 = −1.40579e−08 | | | | |
| 22nd surface | | | | |
| k = 0.000 | | | | |
| A4 = 2.55308e−05, A6 = −5.81351e−08 | | | | |

Zoom data
Zoom ratio 3.03

| | WE | ST | TE |
|---|---|---|---|
| f | 8.15 | 14.18 | 24.68 |
| FNO. | 4.08 | 4.08 | 4.08 |
| 2ω | 115.42 | 78.22 | 47.81 |
| IH | 11.15 | 11.15 | 11.15 |
| BF(in air) | 16.05 | 16.05 | 16.05 |
| LTL(in air) | 114.11 | 105.90 | 118.35 |
| d8 | 27.94 | 11.36 | 2.00 |
| d10 | 13.50 | 8.11 | 6.07 |
| d20 | 0.50 | 14.28 | 38.11 |

Unit focal length

| f1 = −16.29 | f2 = 92.91 | f3 = 37.04 | f4 = 82.67 |
|---|---|---|---|

Example 8

| Unit mm | | | | |
|---|---|---|---|---|
| Surface data | | | | |
| Surface no. | r | d | nd | vd |
| Object plane | ∞ | ∞ | | |
| 1 | 154.920 | 2.40 | 1.62041 | 60.29 |
| 2 | 20.605 | 5.00 | | |
| 3* | 27.657 | 2.50 | 1.74320 | 49.34 |
| 4* | 12.005 | 11.13 | | |
| 5 | −31.084 | 1.80 | 1.43700 | 95.10 |
| 6 | 50.401 | 2.93 | 1.90043 | 37.37 |
| 7 | −171.106 | Variable | | |
| 8 | 32.943 | 4.80 | 1.51742 | 52.43 |
| 9 | −25.225 | 0.79 | 1.88300 | 40.76 |
| 10 | −89.573 | 3.30 | 1.67270 | 32.10 |
| 11 | −72.117 | Variable | | |
| 12(Stop) | ∞ | 1.30 | | |
| 13* | 16.258 | 6.27 | 1.49700 | 81.54 |
| 14* | −355.891 | 2.21 | | |
| 15 | 1406.028 | 1.88 | 1.43875 | 94.66 |

-continued

| Unit mm | | | | |
|---|---|---|---|---|
| 16 | −46.077 | 2.74 | | |
| 17 | 362.878 | 0.90 | 1.80610 | 40.92 |
| 18 | 11.398 | 3.09 | 1.49700 | 81.61 |
| 19 | 44.995 | 0.74 | | |
| 20 | 335.744 | 2.31 | 1.54072 | 47.23 |
| 21 | −35.214 | Variable | | |
| 22* | 127.093 | 4.80 | 1.49710 | 81.56 |
| 23* | −21.252 | 1.00 | | |
| 24 | −107.974 | 1.50 | 2.00100 | 29.13 |
| 25 | 203.620 | 14.56 | | |
| Image plane | ∞ | | | |

Aspherical surface data

3rd surface k = 0.000
A4 = −1.15842e−05, A6 = −6.01870e−09, A8 = 2.26869e−15
4th surface k = −0.820
A4 = −2.95216e−05, A6 = −6.23160e−08, A8 = −1.51016e−13
13th surface k = 0.000
A4 = −8.67423e−06, A6 = 3.68045e−08, A8 = −1.97992e−10
14th surface k = 0.000
A4 = 3.93110e−05, A6 = 3.52998e−08, A8 = −3.51650e−12
22nd surface k = 0.000
A4 = −2.50000e−05, A6 = −1.33516e−08
23rd surface k = 0.000
A4 = 2.12952e−05, A6 = −2.60853e−08

Zoom data
Zoom ratio 3.01

| | WE | ST | TE |
|---|---|---|---|
| f | 8.15 | 14.15 | 24.57 |
| FNO. | 4.08 | 4.08 | 4.08 |
| 2ω | 115.45 | 77.05 | 46.92 |
| IH | 11.15 | 11.15 | 11.15 |
| BF(in air) | 14.56 | 14.56 | 14.56 |
| LTL(in air) | 126.43 | 111.18 | 118.51 |
| d7 | 24.47 | 8.60 | 1.00 |
| d11 | 23.01 | 10.12 | 3.12 |
| d21 | 1.00 | 14.51 | 36.43 |

Unit focal length

| f1 = −16.14 | f2 = 77.26 | f3 = 37.87 | f4 = 74.35 |
|---|---|---|---|

Example 9

| Unit mm | | | | |
|---|---|---|---|---|
| Surface data | | | | |
| Surface no. | r | d | nd | vd |
| Object plane | ∞ | ∞ | | |
| 1 | 87.089 | 2.40 | 1.77250 | 49.60 |
| 2 | 17.650 | 5.00 | | |
| 3* | 33.810 | 2.50 | 1.74320 | 49.34 |
| 4* | 13.943 | 10.84 | | |
| 5 | −30.694 | 1.80 | 1.43700 | 95.10 |
| 6 | 37.681 | 4.70 | 1.88300 | 40.76 |

-continued

Unit mm

| Surface no. | r | d | nd | vd |
|---|---|---|---|---|
| 7 | −141.997 | Variable | | |
| 8* | 46.997 | 2.59 | 1.55332 | 71.68 |
| 9* | 978.999 | Variable | | |
| 10(Stop) | ∞ | 1.30 | | |
| 11* | 15.422 | 8.18 | 1.49700 | 81.54 |
| 12* | −36.365 | 1.53 | | |
| 13 | 145.373 | 3.81 | 1.54072 | 47.23 |
| 14 | −11.160 | 0.90 | 1.81600 | 46.62 |
| 15 | 13.886 | 6.36 | 1.49700 | 81.61 |
| 16 | −16.582 | 0.30 | | |
| 17 | 37.219 | 0.80 | 1.81600 | 46.62 |
| 18 | 23.131 | Variable | | |
| 19* | 124.447 | 4.80 | 1.49710 | 81.56 |
| 20* | −22.240 | 1.00 | | |
| 21 | −24.187 | 1.50 | 1.90366 | 31.32 |
| 22 | −38.662 | 15.24 | | |
| Image plane | ∞ | | | |

Aspherical surface data

3rd surface k = 0.000
A4 = 3.09903e−05, A6 = −3.99054e−08, A8 = −7.62653e−16,
A10 = −1.63243e−13
4th surface k = −0.822
A4 = 1.11404e−05, A6 = 7.80828e−08, A8 = −1.13114e−09,
A10 = 1.23370e−12
8th surface k = 0.000
A4 = −6.44544e−06, A6 = 9.32720e−08
9th surface k = 0.000
A4 = −1.45480e−07, A6 = 9.23580e−08
11th surface k = 0.000
A4 = −4.96485e−06, A6 = 6.59692e−08, A8 = −5.99620e−10
12th surface k = 0.000
A4 = 3.23390e−05, A6 = −9.37876e−08, A8 = −1.87194e−09
19th surface k = 0.000
A4 = −4.98509e−06
20th surface k = 0.000
A4 = 1.48360e−05

Zoom data
Zoom ratio 3.00

| | WE | ST | TE |
|---|---|---|---|
| f | 8.16 | 14.14 | 24.50 |
| FNO. | 4.08 | 4.08 | 4.08 |
| 2ω | 114.42 | 77.43 | 47.72 |
| IH | 11.15 | 11.15 | 11.15 |
| BF(in air) | 15.24 | 15.24 | 15.24 |
| LTL(in air) | 132.01 | 115.44 | 118.24 |
| d7 | 25.74 | 8.67 | 2.00 |
| d9 | 28.73 | 15.86 | 4.79 |
| d18 | 2.00 | 15.37 | 35.91 |

Unit focal length

| f1 = −16.51 | f2 = 89.13 | f3 = 38.24 | f4 = 78.14 |

Example 10

Unit mm

Surface data

| Surface no. | r | d | nd | vd |
|---|---|---|---|---|
| Object plane | ∞ | ∞ | | |
| 1 | 95.655 | 2.40 | 1.77250 | 49.60 |
| 2 | 18.253 | 1.55 | | |
| 3* | 20.505 | 2.50 | 1.74320 | 49.34 |
| 4* | 10.549 | 12.80 | | |
| 5 | −33.462 | 1.80 | 1.43700 | 95.10 |
| 6 | 35.220 | 4.91 | 1.90043 | 37.37 |
| 7 | −327.767 | Variable | | |
| 8* | 39.857 | 2.10 | 1.55332 | 71.68 |
| 9* | 177.985 | Variable | | |
| 10(Stop) | ∞ | 1.30 | | |
| 11* | 15.005 | 6.27 | 1.49700 | 81.54 |
| 12* | −92.931 | 2.41 | | |
| 13 | 35.061 | 2.08 | 1.43700 | 95.10 |
| 14 | 260.524 | 1.00 | 1.81600 | 46.62 |
| 15 | 21.619 | 0.60 | | |
| 16 | 30.355 | 4.53 | 1.49700 | 81.61 |
| 17 | −9.731 | 0.90 | 1.81600 | 46.62 |
| 18 | 17.803 | 3.74 | 1.54072 | 47.23 |
| 19 | −15.828 | Variable | | |
| 20* | 31.573 | 4.80 | 1.49710 | 81.56 |
| 21* | −59.560 | 1.00 | | |
| 22 | −67.926 | 1.50 | 2.00100 | 29.13 |
| 23 | −261.754 | Variable | | |
| Image plane | ∞ | | | |

Aspherical surface data

3rd surface k = 0.000
A4 = 2.92584e−05, A6 = −8.39791e−08, A8 = 5.75328e−11,
A10 = −4.27366e−13
4th surface k = −0.781
A4 = 1.70583e−05, A6 = 5.38913e−08, A8 = −1.73871e−09,
A10 = 2.42852e−12
8th surface k = 0.000
A4 = −7.75250e−06, A6 = 9.15822e−08
9th surface k = 0.000
A4 = −1.45480e−07, A6 = 9.23580e−08
11th surface k = 0.000
A4 = −4.31833e−06, A6 = 4.17580e−08, A8 = −4.15153e−10
12th surface k = 0.000
A4 = 1.64697e−05, A6 = −3.69696e−08, A8 = −9.62939e−10
20th surface k = 0.000
A4 = 1.48594e−06, A6 = 3.10005e−08
21st surface k = 0.000
A4 = 1.01577e−05, A6 = 1.29864e−08

Zoom data
Zoom ratio 3.02

| | WE | ST | TE |
|---|---|---|---|
| f | 8.12 | 14.11 | 24.50 |
| FNO. | 4.08 | 4.08 | 4.08 |
| 2ω | 114.67 | 78.19 | 49.11 |

-continued

| Unit mm | | | |
|---|---|---|---|
| IH | 11.15 | 11.15 | 11.15 |
| BF(in air) | 15.78 | 16.98 | 20.05 |
| LTL(in air) | 125.84 | 113.52 | 121.94 |
| d7 | 25.55 | 9.00 | 2.00 |
| d9 | 25.31 | 14.52 | 4.93 |
| d19 | 1.00 | 14.84 | 36.77 |
| d23 | 15.78 | 16.98 | 20.05 |

| Unit focal length | | | |
|---|---|---|---|
| f1 = −16.34 | f2 = 92.32 | f3 = 39.83 | f4 = 73.87 |

Example 11

| Unit mm | | | | |
|---|---|---|---|---|
| Surface data | | | | |
| Surface no. | r | d | nd | vd |
| Object plane | ∞ | ∞ | | |
| 1 | 87.040 | 2.40 | 1.77250 | 49.60 |
| 2 | 17.951 | 2.00 | | |
| 3* | 19.797 | 2.50 | 1.74320 | 49.34 |
| 4* | 10.828 | 13.59 | | |
| 5 | −34.342 | 1.80 | 1.43700 | 95.10 |
| 6 | 36.679 | 5.37 | 1.90043 | 37.37 |
| 7 | −612.823 | Variable | | |
| 8* | 45.801 | 3.61 | 1.55332 | 71.68 |
| 9* | 747.899 | Variable | | |
| 10(Stop) | ∞ | 1.30 | | |
| 11* | 15.578 | 6.42 | 1.49700 | 81.54 |
| 12* | −56.178 | 2.26 | | |
| 13 | 32.341 | 1.84 | 1.43700 | 95.10 |
| 14 | 307.297 | 1.00 | 1.81600 | 46.62 |
| 15 | 18.998 | 1.00 | | |
| 16 | 31.418 | 4.78 | 1.49700 | 81.61 |
| 17 | −10.524 | 0.90 | 1.81600 | 46.62 |
| 18 | 19.769 | 4.31 | 1.54072 | 47.23 |
| 19 | −15.373 | Variable | | |
| 20* | 44.567 | 4.80 | 1.49710 | 81.56 |
| 21* | −42.028 | 1.00 | | |
| 22 | −36.214 | 1.50 | 2.00100 | 29.13 |
| 23 | −65.843 | 15.66 | | |
| Image plane | ∞ | | | |

Aspherical surface data

3rd surface k = 0.000
A4 = 3.70203e−05, A6 = −1.33830e−07, A8 = 2.49245e−10,
A10 = −7.95655e−13
4th surface k = −0.791
A4 = 3.20127e−05, A6 = 9.74838e−09, A8 = −1.47651e−09,
A10 = 1.84576e−12
8th surface k = 0.000
A4 = −5.06749e−06, A6 = 8.63869e−08
9th surface k = 0.000
A4 = −1.45480e−07, A6 = 9.23580e−08
11th surface k = 0.000
A4 = −1.21921e−05, A6 = 2.46107e−08, A8 = −3.03320e−10

-continued

| Unit mm |
|---|

12th surface k = 0.000
A4 = 1.96033e−05, A6 = −3.19540e−08, A8 = −3.28292e−10
20th surface k = 0.000
A4 = 7.22172e−06, A6 = 2.58208e−08
21st surface k = 0.000
A4 = 1.66799e−05, A6 = −6.75995e−09

| Zoom data Zoom ratio 3.02 | | | |
|---|---|---|---|
| | WE | ST | TE |
| f | 8.16 | 14.18 | 24.63 |
| FNO. | 4.08 | 4.08 | 4.08 |
| 2ω | 114.43 | 76.95 | 48.05 |
| IH | 11.15 | 11.15 | 11.15 |
| BF(in air) | 15.66 | 15.66 | 15.66 |
| LTL(in air) | 130.71 | 114.96 | 121.23 |
| d7 | 25.50 | 8.11 | 0.30 |
| d9 | 26.19 | 13.88 | 5.60 |
| d19 | 1.00 | 14.95 | 37.30 |

| Unit focal length | | | |
|---|---|---|---|
| f1 = −16.31 | f2 = 88.01 | f3 = 38.35 | f4 = 91.87 |

Example 12

| Unit mm | | | | |
|---|---|---|---|---|
| Surface data | | | | |
| Surface no. | r | d | nd | vd |
| Object plane | ∞ | ∞ | | |
| 1 | 83.605 | 2.40 | 1.77250 | 49.60 |
| 2 | 17.301 | 4.60 | | |
| 3* | 22.128 | 2.50 | 1.74320 | 49.34 |
| 4* | 11.670 | 11.73 | | |
| 5 | −21.896 | 1.80 | 1.43700 | 95.10 |
| 6 | −378.606 | 5.31 | 1.90043 | 37.37 |
| 7 | −39.979 | Variable | | |
| 8* | 18.418 | 1.81 | 1.55332 | 71.68 |
| 9* | 23.267 | Variable | | |
| 10(Stop) | ∞ | 1.30 | | |
| 11* | 14.287 | 6.52 | 1.49700 | 81.54 |
| 12* | −57.203 | 2.46 | | |
| 13 | 53.169 | 2.02 | 1.43700 | 95.10 |
| 14 | 263.283 | 1.00 | 1.81600 | 46.62 |
| 15 | 21.983 | 1.32 | | |
| 16 | 24.381 | 4.94 | 1.49700 | 81.61 |
| 17 | −11.089 | 0.90 | 1.81600 | 46.62 |
| 18 | 15.047 | 4.68 | 1.54072 | 47.23 |
| 19 | −17.884 | Variable | | |
| 20* | 59.389 | 4.80 | 1.49710 | 81.56 |
| 21* | −25.563 | 1.00 | | |
| 22 | −38.631 | 1.50 | 2.00100 | 29.13 |
| 23 | −113.853 | 15.46 | | |
| Image plane | ∞ | | | |

Aspherical surface data

3rd surface k = 0.000
A4 = −4.17562e−05, A6 = 5.05060e−08, A8 = −1.43082e−14,
A10 = −2.77994e−13

-continued

| Unit mm |
|---|
| 4th surface | k = −0.806
A4 = −8.72078e−05, A6 = 7.49510e−08, A8 = −1.05384e−10,
A10 = −6.10678e−13, A12 = −3.00000e−17

8th surface k = 0.000
A4 = −1.01247e−05, A6 = 4.96396e−08

9th surface k = 0.000
A4 = −1.45480e−07, A6 = 9.23580e−08

11th surface k = 0.000
A4 = −1.68944e−05, A6 = 1.11512e−08, A8 = −9.48580e−11

12th surface k = 0.000
A4 = 2.56298e−05, A6 = 2.06034e−09, A8 = 1.57289e−12

20th surface k = 0.000
A4 = 1.31551e−05, A6 = −1.80123e−08

21st surface k = 0.000
A4 = 4.82435e−05, A6 = −7.82303e−08

| Zoom data |
| Zoom ratio 3.10 |

|  | WE | ST | TE |
|---|---|---|---|
| f | 8.16 | 14.37 | 25.29 |
| FNO. | 4.08 | 4.08 | 4.08 |
| 2ω | 115.73 | 76.48 | 46.03 |
| IH | 11.15 | 11.15 | 11.15 |
| BF(in air) | 15.46 | 15.46 | 15.46 |
| LTL(in air) | 129.93 | 114.78 | 121.00 |
| d7 | 24.72 | 7.28 | 0.30 |
| d9 | 26.17 | 14.79 | 5.35 |
| d19 | 1.00 | 14.65 | 37.30 |

| Unit focal length |
|---|

| f1 = −17.66 | f2 = 140.96 | f3 = 35.81 | f4 = 90.22 |
|---|---|---|---|

Example 13

| Unit mm |
| Surface data |

| Surface no. | r | d | nd | vd |
|---|---|---|---|---|
| Object plane | ∞ | ∞ |  |  |
| 1 | 47.989 | 2.40 | 1.77250 | 49.60 |
| 2 | 18.795 | 2.20 |  |  |
| 3* | 19.677 | 2.50 | 1.74320 | 49.34 |
| 4* | 10.381 | 16.20 |  |  |
| 5 | −30.883 | 1.80 | 1.43700 | 95.10 |
| 6 | 40.724 | 5.33 | 1.90043 | 37.37 |
| 7 | 13917.619 | Variable |  |  |
| 8* | 48.676 | 3.68 | 1.55332 | 71.68 |
| 9* | 4059.220 | Variable |  |  |
| 10(Stop) | ∞ | 0.50 |  |  |
| 11* | 15.485 | 6.28 | 1.55332 | 71.68 |
| 12* | −85.231 | 1.73 |  |  |
| 13 | 22.227 | 1.73 | 1.43700 | 95.10 |
| 14 | 81.222 | 1.00 | 1.81600 | 46.62 |
| 15 | 14.604 | 1.00 |  |  |
| 16 | 44.621 | 4.34 | 1.49700 | 81.61 |
| 17 | −9.129 | 0.90 | 1.81600 | 46.62 |
| 18 | 25.766 | 3.95 | 1.54072 | 47.23 |
| 19 | −12.983 | Variable |  |  |
| 20 | −321.762 | 0.80 | 1.74339 | 40.17 |
| 21 | 94.155 | 0.30 |  |  |
| 22 | 24.287 | 5.00 | 1.53775 | 74.70 |
| 23 | −60.967 | 1.00 |  |  |
| 24 | −78.174 | 1.00 | 2.00357 | 29.02 |
| 25 | −684.923 | 16.21 |  |  |
| Image plane | ∞ |  |  |  |

| Aspherical surface data |
|---|

3rd surface k = 0.000
A4 = 4.16407e−05, A6 = −1.33564e−07, A8 = −1.67225e−10,
A10 = 3.17284e−13

4th surface k = −0.788
A4 = 7.15666e−05, A6 = 5.64282e−08, A8 = −3.46771e−09,
A10 = 8.19242e−12

8th surface k = 0.000
A4 = −5.61126e−06, A6 = −2.72213e−07, A8 = 6.46605e−10

9th surface k = 0.000
A4 = −4.01083e−06, A6 = −2.79305e−07, A8 = 8.07850e−10

11th surface k = 0.000
A4 = −1.14534e−05, A6 = −2.35138e−08, A8 = −1.98849e−11

12th surface k = 0.000
A4 = 1.91802e−05, A6 = −5.17539e−08, A8 = −6.42213e−10

| Zoom data |
| Zoom ratio 3.05 |

|  | WE | ST | TE |
|---|---|---|---|
| f | 8.14 | 14.21 | 24.79 |
| FNO. | 4.08 | 4.08 | 4.08 |
| 2ω | 111.54 | 78.27 | 50.58 |
| IH | 11.15 | 11.15 | 11.15 |
| BF(in air) | 16.21 | 16.21 | 16.21 |
| LTL(in air) | 132.04 | 116.79 | 123.06 |
| d7 | 25.37 | 7.91 | 0.30 |
| d9 | 25.81 | 14.08 | 5.60 |
| d19 | 1.00 | 14.95 | 37.30 |

| Unit focal length |
|---|

| f1 = −16.19 | f2 = 89.01 | f3 = 37.74 | f4 = 102.21 |
|---|---|---|---|

Next, values of conditional expressions in each example are given below. '-' (hyphen) indicates that there is no corresponding arrangement.

|  | Example1 | Example2 | Example3 | Example4 |
| --- | --- | --- | --- | --- |
| (1)D23W/D23T | 3.84 | 3.60 | 3.70 | 5.72 |
| (2)DL23/DL12 | 6.56 | 7.08 | 4.91 | 2.23 |
| (3)(R13a + R13b)/(R13a − R13b) | 0.49 | −1.38 | — | −0.86 |
| (4)(R11a + R11b)/(R11a − R11b) | 1.38 | 1.42 | 2.03 | 1.32 |
| (5)D31/fw | 0.52 | 0.81 | 0.81 | 0.79 |
| (6)(D31 + D32)/fw | 0.97 | 1.07 | 1.04 | 1.33 |
| (7)f11/f12 | 1.04 | 0.57 | 0.99 | 1.15 |
| (8)(R12b + R13a)/(R12b − R13a) | −0.88 | −0.45 | −1.34 | −0.58 |
| (9)(R2a + R2b)/(R2a − R2b) | −1.41 | −1.54 | −6.35 | −0.24 |
| (10)β2w × β3w | −0.66 | −0.65 | −0.65 | −0.65 |
| (11)β2t × β3t | −1.98 | −1.96 | −1.95 | −1.99 |
| (12)β3w | −0.15 | −0.21 | −0.31 | −0.16 |
| (13)β3t/β3w | 7.19 | 5.53 | 4.23 | 6.72 |
| (14)nd2 − nd1 | 0.32 | 0.32 | 0.32 | — |
| (15)nd2 − nd3 | 0.28 | 0.28 | 0.28 | — |
| (16)fw/R3ca | −0.56 | −0.70 | −0.86 | — |
| (17)fw/R3cb | 0.44 | 0.32 | 0.36 | — |
| (18)(R3ca + R3cb)/(R3ca − R3cb) | −0.12 | −0.37 | −0.41 | — |
| (19)(R4a + R4b)/(R4a − R4b) | 0.37 | −0.13 | −0.02 | −44.22 |
| (20)D12W/D12T | 13.39 | 83.98 | 9.42 | 25.70 |
| (21)β2t | 1.83 | 1.66 | 1.48 | 1.79 |
| (22)(β2w/β2t)/z | 0.80 | 0.61 | 0.47 | 0.71 |
| (23)Skw/fw | 1.96 | 1.91 | 1.91 | 1.86 |

|  | Example5 | Example6 | Example7 | Example8 |
| --- | --- | --- | --- | --- |
| (1)D23W/D23T | 4.09 | 4.47 | 2.01 | 5.50 |
| (2)DL23/DL12 | 7.12 | 66.50 | 4.04 | 2.23 |
| (3)(R13a + R13b)/(R13a − R13b) | −7.69 | −70.75 | −1.58 | −1.44 |
| (4)(R11a + R11b)/(R11a − R11b) | 1.50 | 1.23 | 1.72 | 1.31 |
| (5)D31/fw | 0.70 | 1.49 | 0.73 | 0.77 |
| (6)(D31 + D32)/fw | 0.88 | 1.70 | 0.97 | 1.00 |
| (7)f11/f12 | 0.73 | 0.75 | 0.94 | 1.26 |
| (8)(R12b + R13a)/(R12b − R13a) | −0.63 | −0.65 | −0.42 | −0.44 |
| (9)(R2a + R2b)/(R2a − R2b) | −0.97 | −1.17 | −3.61 | −0.37 |
| (10)β2w × β3w | −0.70 | −0.68 | −0.67 | −0.67 |
| (11)β2t × β3t | −2.11 | −2.05 | −2.04 | −2.03 |
| (12)β3w | −0.07 | −0.08 | −0.22 | −0.16 |
| (13)β3t/β3w | 14.81 | 13.04 | 5.62 | 6.89 |
| (14)nd2 − nd1 | 0.32 | 0.32 | 0.32 | — |
| (15)nd2 − nd3 | 0.28 | 0.28 | 0.28 | — |
| (16)fw/R3ca | −0.71 | −0.42 | −0.68 | — |
| (17)fw/R3cb | 0.20 | 0.16 | 0.58 | — |
| (18)(R3ca + R3cb)/(R3ca − R3cb) | −0.56 | −0.45 | −0.08 | — |
| (19)(R4a + R4b)/(R4a − R4b) | 0.21 | −1.00 | −1.09 | −4.32 |
| (20)D12W/D12T | 12.92 | 16.25 | 13.97 | 24.47 |
| (21)β2t | 2.06 | 1.99 | 1.65 | 1.85 |
| (22)(β2w/β2t)/z | 1.64 | 1.45 | 0.61 | 0.76 |
| (23)Skw/fw | 1.96 | 2.02 | 1.97 | 1.79 |

|  | Example9 | Example10 | Example11 | Example12 |
| --- | --- | --- | --- | --- |
| (1)D23W/D23T | 4.93 | 4.28 | 3.98 | 4.13 |
| (2)DL23/DL12 | 2.17 | 8.24 | 6.79 | 2.55 |
| (3)(R13a + R13b)/(R13a − R13b) | −1.55 | −1.23 | −1.12 | −3.42 |
| (4)(R11a + R11b)/(R11a − R11b) | 1.51 | 1.47 | 1.52 | 1.52 |
| (5)D31/fw | 1.00 | 0.77 | 0.79 | 0.80 |
| (6)(D31 + D32)/fw | 1.47 | 1.03 | 1.01 | 1.05 |
| (7)f11/f12 | 0.86 | 0.90 | 0.81 | 0.78 |
| (8)(R12b + R13a)/(R12b − R13a) | −0.38 | −0.52 | −0.52 | −0.30 |
| (9)(R2a + R2b)/(R2a − R2b) | −1.10 | −1.58 | −1.13 | −8.60 |
| (10)β2w × β3w | −0.64 | −0.71 | −0.65 | −0.60 |
| (11)β2t × β3t | −1.92 | −2.32 | −1.95 | −1.85 |
| (12)β3w | −0.19 | −0.24 | −0.19 | −0.33 |
| (13)β3t/β3w | 5.72 | 5.78 | 5.92 | 4.07 |
| (14)nd2 − nd1 | 0.28 | 0.32 | 0.32 | 0.32 |
| (15)nd2 − nd3 | 0.32 | 0.28 | 0.28 | 0.28 |
| (16)fw/R3ca | −0.73 | −0.83 | −0.78 | −0.74 |
| (17)fw/R3cb | 0.59 | 0.46 | 0.41 | 0.54 |
| (18)(R3ca + R3cb)/(R3ca − R3cb) | −0.11 | −0.29 | −0.31 | −0.15 |
| (19)(R4a + R4b)/(R4a − R4b) | 0.53 | −0.78 | −0.19 | −0.31 |
| (20)D12W/D12T | 12.87 | 12.78 | 84.99 | 82.40 |
| (21)β2t | 1.78 | 1.69 | 1.71 | 1.38 |
| (22)(β2w/β2t)/z | 0.63 | 0.58 | 0.65 | 0.42 |
| (23)Skw/fw | 1.87 | 1.94 | 1.92 | 1.89 |

-continued

|  | Example13 |
|---|---|
| (1)D23W/D23T | 4.31 |
| (2)DL23/DL12 | 7.36 |
| (3)(R13a + R13b)/(R13a − R13b) | −1.00 |
| (4)(R11a + R11b)/(R11a − R11b) | 2.29 |
| (5)D31/fw | 0.77 |
| (6)(D31 + D32)/fw | 0.98 |
| (7)f11/f12 | 1.24 |
| (8)(R12b + R13a)/(R12b − R13a) | −0.50 |
| (9)(R2a + R2b)/(R2a − R2b) | −1.02 |
| (10)β2w × β3w | −0.64 |
| (11)β2t × β3t | −1.96 |
| (12)β3w | −0.20 |
| (13)β3t/β3w | 5.80 |
| (14)nd2 − nd1 | 0.32 |
| (15)nd2 − nd3 | 0.28 |
| (16)fw/R3ca | −0.89 |
| (17)fw/R3cb | 0.32 |
| (18)(R3ca + R3cb)/(R3ca − R3cb) | −0.48 |
| (19)(R4a + R4b)/(R4a − R4b) | −2.77 |
| (20)D12W/D12T | 84.57 |
| (21)β2t | 1.69 |
| (22)(β2w/β2t)/z | 0.63 |
| (23)Skw/fw | 1.99 |

Figure 27:
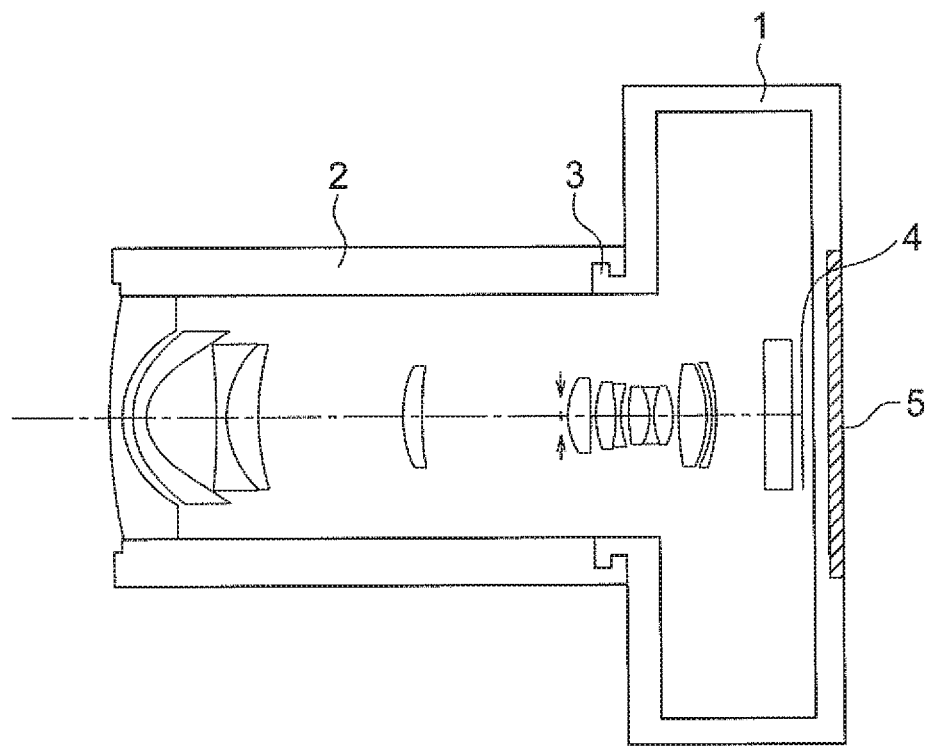
FIG. 27 is a cross-sectional view of an image pickup apparatus.

FIG. 27 is a cross-sectional view of a single-lens mirrorless camera as an electronic image pickup apparatus. In FIG. 27, a photographic optical system 2 is disposed inside a lens barrel of a single-lens mirrorless camera 1. A mount portion 3 enables the photographic optical system 2 to be detachable from a body of the single-lens mirrorless camera 1.

As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens of the examples described above is to be used.

Figure 28:
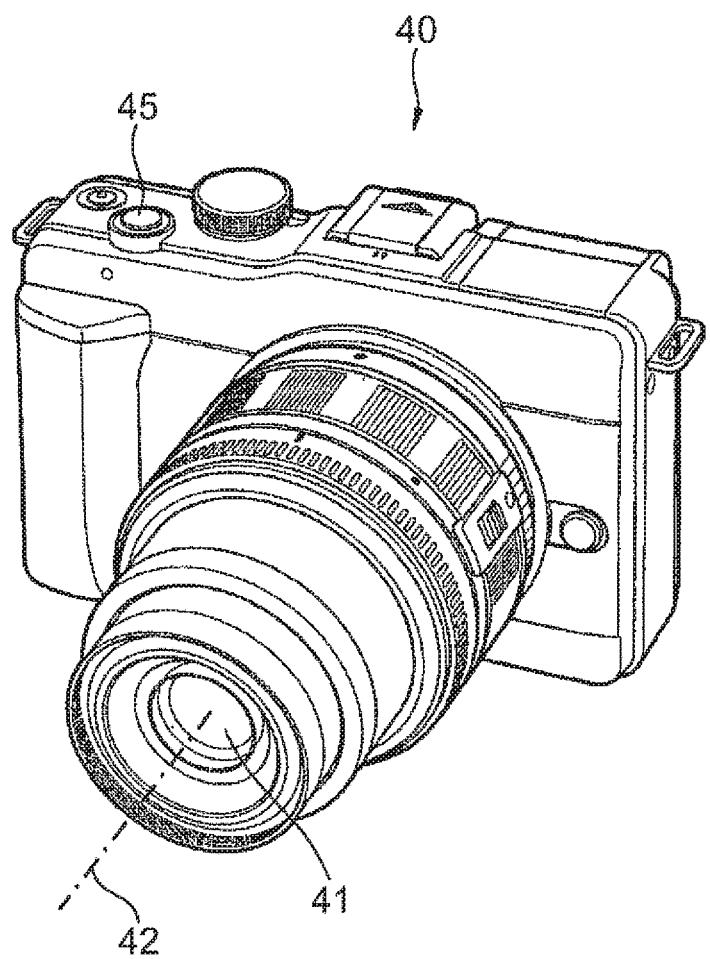
FIG. 28 is a front perspective view of the image pickup apparatus.
Figure 29:
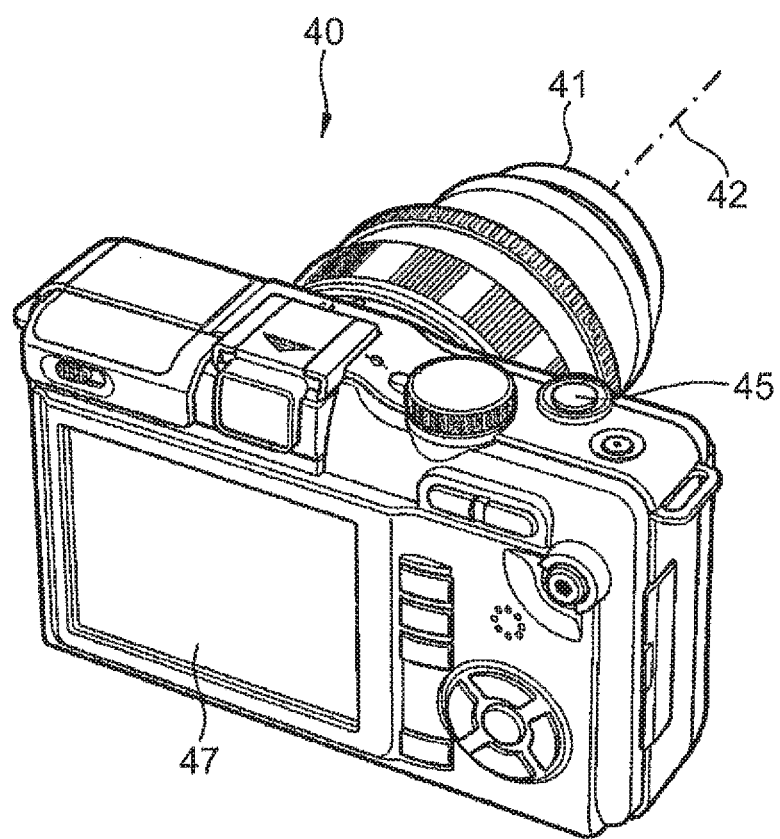
FIG. 29 is a rear perspective view of the image pickup apparatus.

FIG. 28 and FIG. 29 are conceptual diagrams of an arrangement of the image pickup apparatus. FIG. 28 is a front perspective view of a digital camera 40 as the image pickup apparatus, and FIG. 29 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 30:
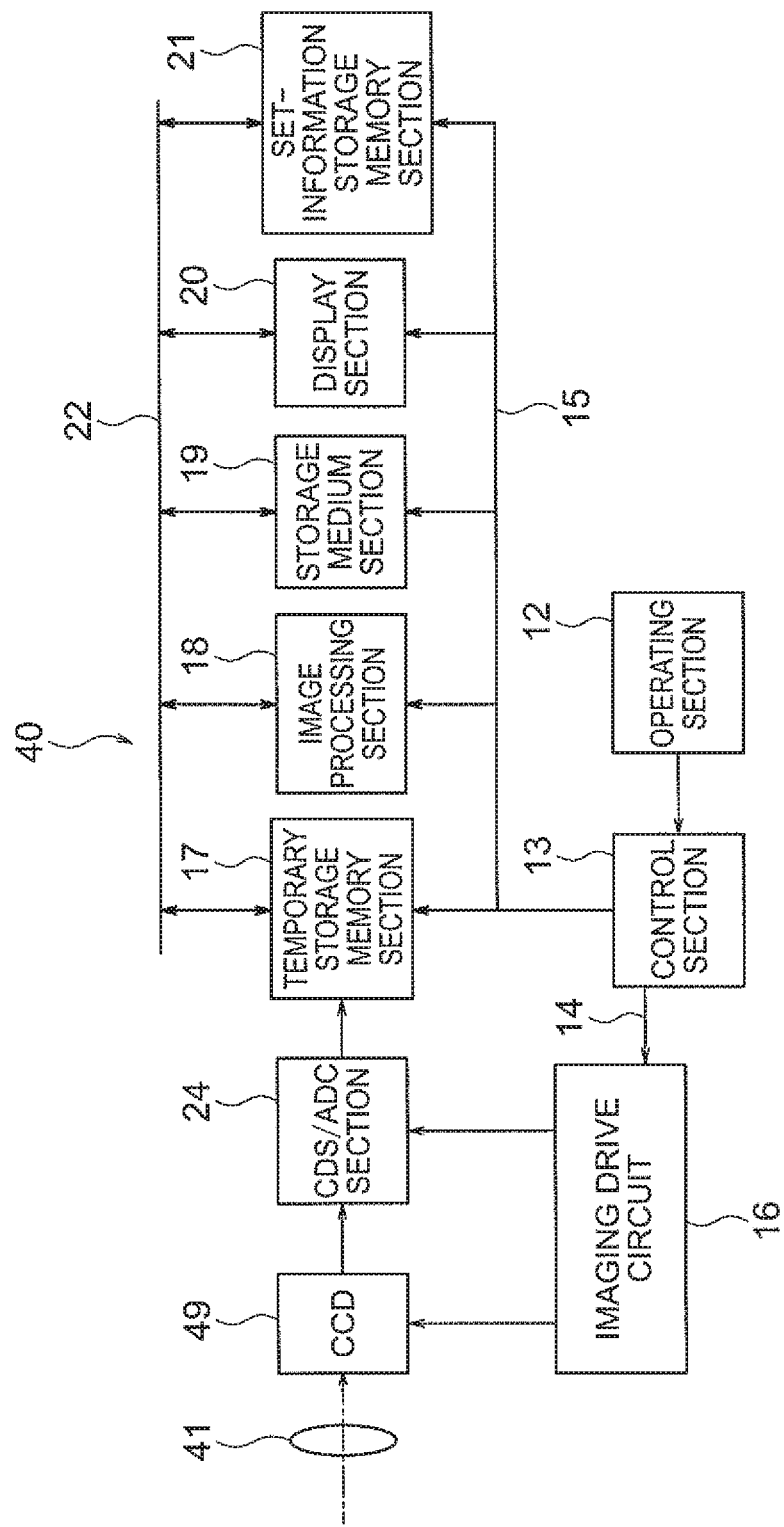
FIG. 30 is a structural block diagram of an internal circuit of main components of the image pickup apparatus.

FIG. 30 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 30, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present embodiment, it is possible to provide a zoom lens which has a wide angle of view and a high zoom ratio, and in which the total length of the optical system is short and various aberrations are corrected favorably, and an image pickup apparatus using the zoom lens.

As described heretofore, the present invention is suitable for a zoom lens which has a wide angle of view and a high zoom ratio, and in which the total length of the optical system is short and various aberrations are corrected favorably, and an image pickup apparatus using the zoom lens.

What is claimed is:

1. A zoom lens consisting of in order from an object side:
a first lens unit having a negative refractive power;
a second lens unit having a positive refractive power;
a third lens unit having a positive refractive power; and
a fourth lens unit having a positive refractive power, wherein:
each lens unit has a lens component,
the first lens unit includes at least two lens components,
a number of lenses in the third lens unit is larger than a number of lenses in the second lens unit,
at a time of zooming from a wide angle end to a telephoto end, distances between lens units change, and the first lens unit, after moving toward an image side, moves toward the object side,
in zooming in a state of being focused to an object at infinity, a distance between the second lens unit and the third lens unit becomes widest at the wide angle end,
the lens component is a single lens or a cemented lens, and is a lens with two optically effective surfaces that are in contact with air,
the first lens unit includes a first lens component having a negative refractive power and a second lens component having a negative refractive power,
the first lens component is disposed nearest to an object,
the second lens component is disposed adjacent to the first lens component, and
the following conditional expression (7) is satisfied:

$$0 < f11/f12 < 2 \tag{7}$$

where,
f11 denotes a focal length of the first lens component, and
f12 denotes a focal length of the second lens component.

2. The zoom lens according to claim 1, wherein the following conditional expression (1) is satisfied:

$$1.5 < D23W/D23T < 100 \tag{1}$$

where:
D23W denotes a distance between the second lens unit and the third lens unit at the wide angle end at a time of focusing to the object at infinity, and
D23T denotes a distance between the second lens unit and the third lens unit at the telephoto end at the time of focusing to the object at infinity.

3. The zoom lens according to claim 1, wherein the number of lenses in the third lens unit is at least two more than the number of lenses in the second lens unit.

4. The zoom lens according to claim 1, wherein:
the first lens unit includes, in order from the object side, the first lens component having the negative refractive power, the second lens component having the negative refractive power, and a third lens component, and
the following conditional expression (2) is satisfied:

$$1.7 < DL23/DL12 < 100 \tag{2}$$

where:
DL12 denotes a distance between the first lens component and the second lens component, and
DL23 denotes a distance between the second lens component and the third lens component.

5. The zoom lens according to claim 1, wherein:
the first lens unit includes, in order from the object side, the first lens component having the negative refractive power, the second lens component having the negative refractive power, and a third lens component, and
the third lens component consists of a cemented lens.

6. The zoom lens according to claim 5, wherein:
the third lens component consists of in order from the object side, a negative lens and a positive lens, and
the following conditional expression (3) is satisfied:

$$-100 < (R13a+R13b)/(R13a-R13b) < 2 \tag{3}$$

where:
R13a denotes a paraxial radius of curvature of a surface of the third lens component nearest to the object, and
R13b denotes a paraxial radius of curvature of a surface of the third lens component nearest to an image.

7. The zoom lens according to claim 1, wherein the following conditional expression (4) is satisfied:

$$1 < (R11a+R11b)/(R11a-R11b) < 3 \tag{4}$$

where:
R11a denotes a paraxial radius of curvature of a surface of the first lens component nearest to the object, and
R11b denotes a paraxial radius of curvature of a surface of the first lens component nearest to an image.

8. The zoom lens according to claim 1, wherein:
a number of positive lenses in the third lens unit is not more than four, and
the following conditional expression (5) is satisfied:

$$0.4 < D31/fw < 2 \quad (5)$$

where:
D31 denotes a thickness on an optical axis of a lens component nearest to the object in the third lens unit, and
fw denotes a focal length of the zoom lens at the wide angle end at a time of focusing to the object at infinity.

9. The zoom lens according to claim 1, wherein:
a number of positive lenses in the third lens unit is not more than five,
the third lens unit includes an object-side lens component having a positive refractive power and an image-side lens component having a positive refractive power,
the object-side lens component is disposed nearest to the object,
the image-side lens component is disposed adjacent to the object-side lens component, and
the following conditional expression (6) is satisfied:

$$0.5 < (D31+D32)/fw < 2.5 \quad (6)$$

where:
D31 denotes a thickness on an optical axis of the object-side lens component,
D32 denotes a thickness on the optical axis of the image-side lens component, and
fw denotes a focal length of the zoom lens at the wide angle end at a time of focusing to the object at infinity.

10. The zoom lens according to claim 1, wherein the fourth lens unit is fixed at the time of zooming.

11. The zoom lens according to claim 1, wherein:
the first lens unit includes in order from the object side, the first lens component having the negative refractive power, the second lens component having the negative refractive power, and a third lens component,
the third lens component is disposed adjacent to the second lens component, and
the following conditional expression (8) is satisfied:

$$-5 < (R12b+R13a)/(R12b-R13a) < 0 \quad (8)$$

where:
R12b denotes a paraxial radius of curvature of a surface of the second lens component nearest to an image, and
R13a denotes a paraxial radius of curvature of a surface of the third lens component nearest to the object.

12. The zoom lens according to claim 1, wherein at a time of focusing from the object at infinity to an object at a close distance, the second lens unit moves toward the image side along an optical axis.

13. The zoom lens according to claim 1, wherein the following conditional expression (9) is satisfied:

$$-100 < (R2a+R2b)/(R2a-R2b) < 1 \quad (9)$$

where:
R2a denotes a paraxial radius of curvature of a surface of the second lens unit nearest to the object, and
R2b denotes a paraxial radius of curvature of a surface of the second lens unit nearest to an image.

14. The zoom lens according to claim 1, wherein the following conditional expression (10) is satisfied:

$$-1 < \beta 2w \times \beta 3w < -0.5 \quad (10)$$

Where:
$\beta 2w$ denotes a lateral magnification of the second lens unit at the wide angle end at a time of focusing to the object at infinity, and
$\beta 3w$ denotes a lateral magnification of the third lens unit at the wide angle end at the time of focusing to the object at infinity.

15. The zoom lens according to claim 1, wherein the following conditional expression (11) is satisfied:

$$-3 < \beta 2t \times \beta 3t < -1.5 \quad (11)$$

where:
$\beta 2t$ denotes a lateral magnification of the second lens unit at the telephoto end at a time of focusing to the object at infinity, and
$\beta 3t$ denotes a lateral magnification of the third lens unit at the telephoto end at the time of focusing to the object at infinity.

16. The zoom lens according to claim 1, wherein the following conditional expression (12) is satisfied:

$$-0.4 < \beta 3w < 0 \quad (12)$$

where:
$\beta 3w$ denotes a lateral magnification of the third lens unit at the wide angle at a time of focusing to the object at infinity.

17. The zoom lens according to claim 1, wherein the following conditional expression (13) is satisfied:

$$2 < \beta 3t/\beta 3w < 20 \quad (13)$$

where:
$\beta 3w$ denotes a lateral magnification of the third lens unit at the wide angle end at a time of focusing to the object at infinity, and
$\beta 3t$ denotes a lateral magnification of the third lens unit at the telephoto end at the time of focusing to the object at infinity.

18. The zoom lens according to claim 1, wherein at least one lens unit includes a cemented lens which consists of three lenses.

19. The zoom lens according to claim 18, wherein:
the third lens unit includes one predetermined cemented lens, and
the predetermined cemented lens consists of in order from the object side, a positive lens, a negative lens, and a positive lens.

20. The zoom lens according to claim 18, wherein:
the predetermined cemented lens includes a first lens and a second lens,
the first lens is positioned nearest to the object,
the second lens is adjacent to the first lens, and
the following conditional expression (14) is satisfied:

$$0.05 < nd2-nd1 < 1 \quad (14)$$

where:
nd1 denotes a refractive index for a d-line of the first lens, and
nd2 denotes a refractive index for the d-line of the second lens.

21. The zoom lens according to claim 19, wherein:
the predetermined cemented lens includes a second lens and a third lens,
the third lens is adjacent to the second lens, and
the following conditional expression (15) is satisfied:

$$0.05 < nd2-nd3 < 1 \quad (15):$$

where:

nd2 denotes a refractive index for a d-line of the second lens, and nd3 denotes a refractive index for the d-line of the third lens.

22. The zoom lens according to claim 18, wherein:

the cemented lens has in order from the object side, a cemented surface on the object side and a cemented surface on the image side, and the following conditional expression (16) is satisfied:

$$-2 < fw/R3ca < 0 \qquad (16)$$

where:

R3ca denotes a paraxial radius of curvature of the cemented surface on the object side, and fw denotes a focal length of the zoom lens at the wide angle end at a time of focusing to the object at infinity.

23. The zoom lens according to claim 18, wherein:

the cemented lens has in order from the object side, a cemented surface on the object side and a cemented surface on the image side, and the following conditional expression (17) is satisfied:

$$0 < fw/R3cb < 1 \qquad (17)$$

where:

R3cb denotes a paraxial radius of curvature of the cemented surface on the image side, and fw denotes a focal length of the zoom lens at the wide angle end at a time of focusing to the object at infinity.

24. The zoom lens according to claim 18, wherein:

the cemented lens has in order from the object side, a cemented surface on the object side and a cemented surface on the image side, and the following conditional expression (18) is satisfied:

$$-1 < (R3ca+R3cb)/(R3ca-R3cb) < 0.5 \qquad (18)$$

where:

R3ca denotes a paraxial radius of curvature of the cemented surface on the object side, and R3cb denotes a paraxial radius of curvature of the cemented surface on the image side.

25. The zoom lens according to claim 1, wherein the following conditional expression (19) is satisfied:

$$-100 < (R4a+R4b)/(R4a-R4b) < 100 \qquad (19)$$

where:

R4a denotes a paraxial radius of curvature of a surface of the fourth lens unit nearest to the object, and R4b denotes a paraxial radius of curvature of a surface of the fourth lens unit nearest to an image.

26. The zoom lens according to claim 25, wherein:

a lens nearest to the image in the third lens unit has a positive refractive power, and the fourth lens unit consists of not less than two lenses.

27. The zoom lens according to claim 1, wherein the following conditional expression (20) is satisfied:

$$1.1 < D12W/D12T < 100 \qquad (20)$$

where:

D12W denotes a distance between the first lens unit and the second lens unit at the wide angle end at a time of focusing to the object at infinity, and D12T denotes a distance between the first lens unit and the second lens unit at the telephoto end at the time of focusing to the object at infinity.

28. The zoom lens according to claim 1, wherein:

the first lens unit includes a predetermined lens of which a concave surface is directed toward the object side, and there is one lens having a positive refractive power which is disposed on an image side of the predetermined lens.

29. The zoom lens according to claim 1, wherein the following conditional expression (21) is satisfied:

$$1.1 < \beta 2t < 100 \qquad (21)$$

where:

$\beta 2t$ denotes a lateral magnification of the second lens unit at the telephoto end at a time of focusing to the object at infinity.

30. The zoom lens according to claim 1, wherein the following conditional expression (22) is satisfied:

$$0.1 < (\beta 2w/(\beta 2t)/z < 1.7 \qquad (22)$$

where:

$\beta 2w$ denotes a lateral magnification of the second lens unit at the wide angle end at a time of focusing to the object at infinity, $\beta 2t$ denotes a lateral magnification of the second lens unit at the telephoto end at the time of focusing to the object at infinity, and z denotes a zoom ratio.

31. The zoom lens according to claim 1, wherein the first lens unit includes not less than three negative lenses.

32. The zoom lens according to claim 1, wherein the following conditional expression (23) is satisfied:

$$1 < Skw/fw < 3 \qquad (23)$$

where:

Skw denotes a back focus of the zoom lens at the wide angle end, and fw denotes a focal length of the zoom lens at the wide angle end at a time of focusing to the object at infinity.

33. An image pickup apparatus, comprising:

an optical system; and an image pickup element which has an image pickup surface, and which converts an image formed on the image pickup surface by the optical system to an electric signal, wherein the optical system is the zoom lens according to claim 1.

* * * * *